United States Patent [19]

Shikama et al.

[11] Patent Number: 5,613,749
[45] Date of Patent: Mar. 25, 1997

[54] CONDENSER LENS, POLARIZING ELEMENT, LIGHT SOURCE APPARATUS, AND PROJECTION DISPLAY APPARATUS

[75] Inventors: Shinsuke Shikama; Hiroshi Kida; Akira Daijogo, all of Nagaokakyo, Japan

[73] Assignee: Mitsubishi Denki Kabushiki Kaisha, Tokyo, Japan

[21] Appl. No.: 312,770

[22] Filed: Sep. 27, 1994

Related U.S. Application Data

[62] Division of Ser. No. 47,504, Apr. 16, 1993, Pat. No. 5,384,659.

[30] Foreign Application Priority Data

| Apr. 20, 1992 | [JP] | Japan | 4-99653 |
| May 6, 1992 | [JP] | Japan | 4-113475 |
| Oct. 26, 1992 | [JP] | Japan | 4-287671 |
| Nov. 24, 1992 | [JP] | Japan | 4-313261 |

[51] Int. Cl.$^6$ .................................................. G03B 21/00
[52] U.S. Cl. ............................................. 353/102; 362/309
[58] Field of Search .................................. 353/102, 55, 56, 353/38; 362/326, 332, 308, 307, 336

[56] References Cited

U.S. PATENT DOCUMENTS

| 3,915,568 | 10/1975 | Yamada et al. | 353/38 |
| 4,571,034 | 2/1986 | Nakamura | 359/719 |
| 4,641,929 | 2/1987 | Braat | 359/719 |
| 4,671,623 | 6/1987 | Chikuma | 359/719 |
| 4,729,645 | 3/1988 | Suda | 359/719 |
| 4,743,093 | 5/1988 | Oinen | 359/719 |
| 4,842,388 | 6/1989 | Tanaka et al. | 359/718 |
| 5,087,115 | 2/1992 | Ishibai et al. | 359/719 |
| 5,123,729 | 6/1992 | Kondo et al. | 353/102 |
| 5,162,949 | 11/1992 | Kubota | 359/718 |
| 5,313,234 | 5/1994 | Edmonson et al. | 353/61 |

FOREIGN PATENT DOCUMENTS

| 142687 | 2/1989 | Japan. | |
| 4427 | 1/1992 | Japan. | |
| 0361939 | 11/1931 | United Kingdom | 353/102 |

OTHER PUBLICATIONS

"Laser and Optics Guide II" Japan Melles Griot Inc., pp. 122–124, Jun. 1989.

*Primary Examiner*—William Dowling

[57] ABSTRACT

A light source apparatus using a condenser lens satisfying either condition (1) or (2).

$$0.42 < r1/nf < 0.45 \quad (1)$$
$$18 < |r2/nf|$$
$$-0.39 < K1 < -0.25$$
$$0.11 < \Delta 2/f < 0.14$$

$$0.4 < r1/nf < 0.6 \quad (2)$$
$$-0.5 < r2/nf < -0.3$$
$$-0.6 < K1 < -0.2$$
$$-0.1 < SG2/f < 0.1$$

where f:
- f: focal length of the whole lens system
- n: refractive index of the lens
- r1: radius of center curvature of the first surface
- r2: radius of center curvature of the second surface
- K1: conic constant of the first surface
- Δ2: axial difference between the aspherical face of the outermost circular zone within the effective diameter of the second surface and a reference spherical face having the radius of center curvature of r2
- SG2: axial difference of the aspherical face of the outermost circular zone within the effective diameter of the second surface with respect to the center of the second surface.

24 Claims, 52 Drawing Sheets

Fig. 6
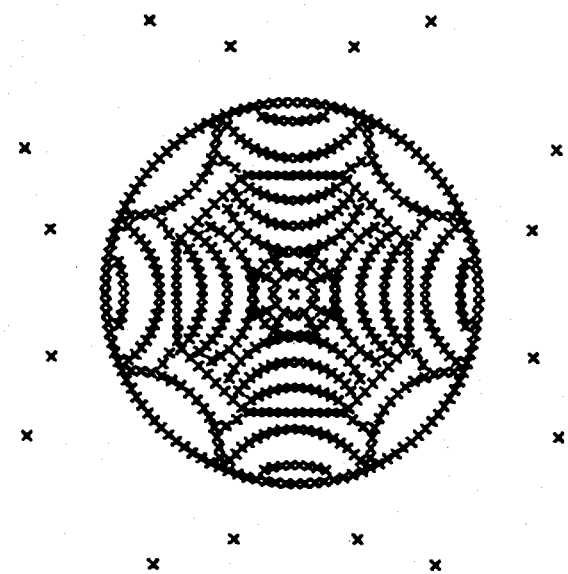
0.25400mm

LONGITUDINAL SPHERICAL ABER.

ASTIGMATIC FIELD CURVES (DEG)

Fig. 19
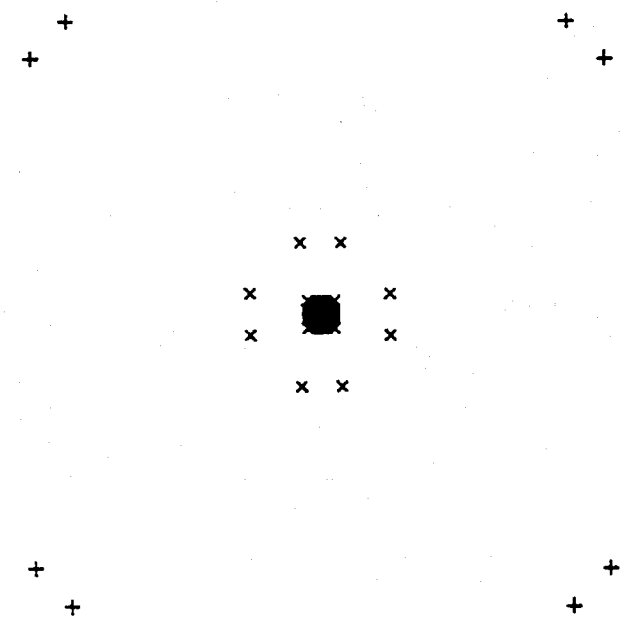
0.19050mm

Fig. 21
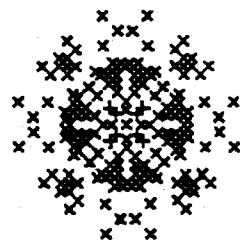
0.05000mm
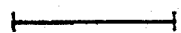

0.19050mm

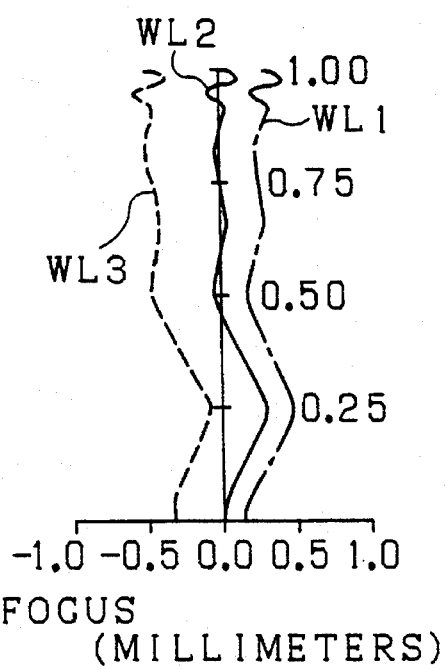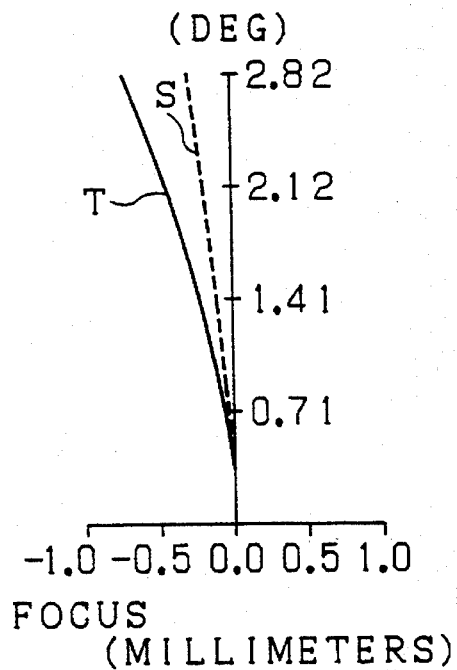

LONGITUDINAL SPHERICAL ABER.

ASTIGMATIC FIELD CURVES

LONGITUDINAL SPHERICAL ABER.

ASTIGMATIC FIELD CURVES
(DEG)

CONDENSER LENS, POLARIZING ELEMENT, LIGHT SOURCE APPARATUS, AND PROJECTION DISPLAY APPARATUS

This application is a divisional of application Ser. No. 08/047,504 filed on Apr. 16, 1993, now U. S. Pat. No. 5,384,689, the entire contents of which are hereby incorporated by reference.

BACKGROUND OF THE INVENTION

1. Field of the Invention

The present invention relates to a condenser lens with large aperture capable of converging with high efficiency the light emitted from a light source, to a high-efficiency light source apparatus using such a condenser lens, to a projection display apparatus using such a light source apparatus, and to a polarizing element for converting natural light with randomly oriented polarization into partially polarized light whose polarization is greater in one particular direction.

2. Description of Related Art

As a prior art example of an apparatus that requires a high-efficiency light source, a projection display apparatus using liquid-crystal panels will be described below with reference to FIG. 1. The apparatus shown is disclosed, for example, in Japanese Patent Application Laid-Open No. 1-42687. In FIG. 1, indicated at 1 is a light-source apparatus having a lamp 120, a reflecting mirror 130, and a condenser lens 131. The numeral 2 indicates a beam of light radiated from the light source apparatus 1; 14B and 14R are dichroic mirrors; 11a, 11b, 11c, and 11d are mirrors; 3R, 3G, and 3B are liquid-crystal panels; 15 is a dichroic prism; 4 is a projection lens, and 5 is a screen.

Next, the operation of this apparatus will be described below. For the lamp 120 used in the light source apparatus 1, a white light source, such as a metal halide lamp, xenon lamp, or halogen lamp, is used. The lamp 120 is placed at a focal point of the condenser lens 131 which produces a parallel beam of light indicated at 2 in FIG. 1. The reflecting mirror 130 has, typically, a spherical reflecting surface, and it is known that when the reflecting mirror 130 is placed with its center of curvature positioned near the focal point of the condenser lens 131 (i.e. the position of the lamp 120), the power of the emergent light beam 2 increases by a factor of 2 or so as compared with an arrangement without the reflecting mirror 130.

The emergent light beam 2 is directed at the dichroic mirror 14B which reflects blue light and allows green and red lights to pass through and the dichroic mirror 14R which reflects red light and allows green and blue lights to pass through. The emergent light beam 2 is thus separated into three primary colors, red, green, and blue. The red light is reflected by the mirrors 11b and 11c and is directed to the liquid-crystal panel 3R, while the blue light is reflected by the mirrors 11a and 11d and is directed to the liquid-crystal panel 3B. The green light is directed to the liquid-crystal panel 3G. The liquid-crystal panels 3R, 3G, and 3B display color images corresponding to the three primary colors, red, green, and blue, respectively. The driving-circuits used to display the images are not shown here. The beams of light modulated by the images formed on liquid-crystal panels are reunited into a single beam of light by being passed through the dichroic prism 15 of a known structure that selectively reflects the red and blue lights and selectively transmits the green light. The reunited light beam is converted by the projection lens 4 into a projection light 110 which is projected as an enlarged image onto the screen 5.

In the prior art, the converging angle θ (see FIG. 1) has had to be enlarged as much as possible in order to increase the illumination efficiency. A known lens arrangement that can achieve a large angle of θ has been such that the lens has a spherical surface, either concave, plane, or convex, on the side facing the lamp 120, and an aspherical surface of convex form on the side from which the parallel beam of light 2 emerges. This arrangement, however, has only been able to attain a maximum converging angle θ of the order of 40° at most. An example of such a condenser lens is disclosed in "Laser and Optics Guide II," a publication by Japan Melles Griot Inc., pp. 122–124, June 1989. There has also been an attempt to construct the condenser lens 131 by combining two or three lens elements to achieve an increased converging angle θ, but this construction has had such problems as increasing the size of the light source apparatus due to the increase in the overall length of the lens and present an obstacle to cost reduction because of increased complexity of lens fabrication.

When the condenser lens 131 that converts the light emitted from the lamp 120 into collimated light is constructed from a single lens, the degree of collimation of the light beam 2 emerging from the condenser lens 131 varies with the wavelength of the light. This is due to the aberration (chromatic aberration) that is caused because of the variation of refractive index of the lens material with light wavelength. If the condenser lens 131 is designed to provide an optimum degree of collimation for green light that lies in the central wavelength region in the visible spectrum, blue light on the shorter wavelength side will become a converging light while red light on the longer wavelength side will become a diverging light, resulting in different degrees of illumination for the three liquid-crystal light valves (liquid-crystal panels 3R, 3G, 3B). In the projection display apparatus of the prior art, the optical path length from the condenser lens 131 to the corresponding liquid-crystal light valves is about three times as long for the red and blue lights as for the green light. Since the red light is a diverging light and its light path length is long, the decrease in illuminance is particularly noticeable on the liquid-crystal light-valve for the red light as compared to that for the green light. On the other hand, since the blue light is a converging light, color tinging will occur at the center area of the projected image on the screen 5 and the center area will appear bluish.

One known method for correcting such chromatic aberration of a single lens is to combine a convex lens, which has a small refractive index dispersion (a large Abbe number), with a concave lens which has a large refractive index dispersion (a small Abbe number). However, this lens combination has the following shortcomings.

(1) The converging angle θ is small because of the use of the concave lens.

(2) Since the material of low refractive index dispersion used for the convex lens generally has a low refractive index, it is difficult to design a lens that can provide a large converging angle θ.

(3) The lens length increases, which also increases the complexity of fabrication.

Furthermore, the prior art projection display apparatus of the above construction has such problems as formation of a shadow because of the intersection of the dichroic mirrors 14R and 14B and cracking of the condenser lens 131 because of the heat of the lamp 120.

Twisted nematic (TN) liquid-crystal light valves include polarizers arranged on the front and back of a liquid-crystal layer. Polarizers have the function of allowing light vibrations in one plane to pass through, while absorbing light vibrations at right angles to this plane. Generally, plastic materials are used to form the polarizers; that is, polyvinyl alcohol films impregnated with dichroic materials such as iodine compounds or dyestuffs are oriented in one direction so as to absorb polarization component in a given direction only.

When natural light with randomly oriented polarization is incident on a liquid-crystal light valve, half of the incident light power is absorbed by the polarizers. In projection display apparatus using liquid-crystal light valves, the liquid-crystal light valves are illuminated with a high-intensity light source, so that the absorption of light by the polarizers results in the generation of heat. If the polarizers are used above their heat resisting temperature, the polarizers will be deformed and deteriorated, decreasing the degree of polarization and thus greatly degrading the resulting image quality. In particular, when plastic polarizers are used with the liquid-crystal light valves, such polarizers can only withstand heat up to 80° to 90° C., which presents a problem when using high-intensity light to produce images of high brightness.

An approach to resolving this problem is to remove components of light polarized in unwanted directions before the light is input to the polarizers. A prior art configuration utilizing this approach will be described with reference to FIG. 2 which shows an optical system in a projection display apparatus using liquid-crystal light valves, which is disclosed in "JAPAN DISPLAY '89 DIGEST," pp. 646–649. A lamp 120 produces a parallel beam of light by making use of a parabolic mirror 13 or the like. Ultraviolet and infrared components are removed using a filter 12, and natural light with randomly oriented polarization, collimated into a light beam 2, is converted by a polarizing element 6, called a prepolarizer, into partially polarized light whose polarization is greater in one particular direction.

The light is then separated by dichroic mirrors 7a and 7b into three color lights, red (R), green (G), and blue (B); the respective color lights are converged by condenser lenses 8r, 8g, and 8b, and then light-modulated by liquid-crystal light valves 3r, 3g, and 3b, each sandwiched by a pair of polarizers 17r/18r, 17g/18g, 17b/18b, to produce images of the three primary colors. Next, the three-primary colored images are combined by color combining dichroic mirrors 9a and 9b, and the combined color image is enlarged through a projection lens 4 for projection onto a screen (not shown).

FIG. 3 shows the structure of the polarizing element 6. As shown, the polarizing element 6 is a layered structure consisting of a plurality of glass plates 61. The arrangement of the glass plates 61 is so set as to provide the angle of incidence (the Brewster angle) at which, at the interface between the layers of air and glass having different refractive indices, all of one linearly polarized light (P polarization) 22 is transmitted while the other linearly polarized light (S polarization) 21 is partially reflected. The stacked structure of the glass plates 61 acts to produce a beam of light having the necessary direction of polarization for the liquid-crystal light valves 3r, 3g, and 3b, that is, the polarization whose direction is aligned with the polarizing axes of the incident side polarizers 17r, 17g, and 17b of the liquid-crystal light valves.

As described, in the above prior art construction, the polarizing element 6 removes the components of polarization (S polarization in FIG. 3) orthogonal to the polarizing axes of the incident side polarizers 17r, 17g, and 17b of the liquid-crystal light valves; this construction minimizes deterioration of the incident side polarizers 17r, 17g, and 17b due to heat caused by light absorption.

The polarizing element 6 of the prior art is constructed from glass plates set at the Brewster angle, typically at about 57°, with respect to the optical axis If the polarizing element were constructed from a single glass plate, it would require a depth D about 1.5 times the cross sectional area of the light beam. With the one-bend construction as shown in FIG. 3, the depth D can be reduced by half. In order to increase the image brightness the projection display apparatus can produce, the lamp 120 should be placed as near to the liquid-crystal light valves 3r, 3g, and 3b as possible. In the prior art, however, the large size of the polarizing element 6 poses an obstacle to achieving this goal. Furthermore, from the viewpoint of reducing the overall size of the projection display apparatus, there is a demand for a polarizing element with reduced thickness.

SUMMARY OF THE INVENTION

It is an object of the invention to provide a condenser lens with large aperture that achieves a greater converging angle θ than any prior known condenser lens, a light source apparatus using such a condenser lens, and a projection display apparatus using such a light source apparatus.

It is another object of the invention to provide a projection display apparatus that achieves high image brightness with good color uniformity, and a light source apparatus of the construction that prevents breakage of a condenser lens due to heat.

It is a further object of the invention to provide a polarizing element with reduced thickness and achieving reduced loss.

Since light is radiated in all directions from the lamp, if the converging angle θ is enlarged while maintaining the diameter of a produced light beam constant, the liquid-crystal panels can be illuminated with increased illuminance, contributing to increasing the brightness of a projected image. The present invention provides a condenser lens of the construction that allows a greater converging angle θ than any prior known condenser lens. More specifically, the invention provides a condenser lens with large aperture having a numerical aperture of NA≧0.9 (θ≧64.2°) when the numerical aperture (NA) is defined by NA=sin(θ), a light source apparatus using such a condenser lens, and a projection display apparatus using such a light source apparatus.

The condenser lens of the invention consists of a bi-aspherical single lens having a first surface of convex form facing the larger conjugate side and a second surface facing the smaller conjugate side and whose outermost circular zone is formed concave, and satisfies the following conditions [1] or [2], the numerical aperture being 0.9 or larger.

0.42<r1/nf<0.45      [1]

18<|r2/nf|

−0.39<K1<−0.25

0.11<A2/f<0.14

0.4<r1/nf<0.6 [2]

−0.5<r2/nf<−0.3

−0.6<K1<−0.2

−0.1<SG2/f<0.1 where f: focal length of the whole lens system n: refractive index of the lens r1: radius of center curvature of the first surface r2: radius of center curvature of the second surface K1: conic constant of the first surface Δ2: axial difference between the aspherical face of the outermost circular zone within the effective diameter of the second surface and a reference spherical face having the radius of center curvature of r2

SG2: axial difference of the aspherical face of the outermost circular zone within the effective diameter of the second surface with respect to the center of the second surface.

Furthermore, in the condenser lens of the invention, a larger diameter portion outside the effective diameter of the second face is formed as a plane face perpendicular to the optical axis of the lens, and also, a larger diameter portion outside the effective diameter of the first surface is formed as a plane face perpendicular to the optical axis, thereby ensuring the ease of lens mounting.

The condenser lens of the invention provides the following advantages.

[a] With a large converging angle of 64.2° at minimum and reduced spherical aberration, high-efficiency illumination light with small aberration can be obtained.

[b] A relatively long back focal length can be obtained for its focal length.

[c] Since the outermost circular zone of the lamp side surface (the second surface) can be formed concave, the angle of incidence on the condenser lens can be reduced and the transmittance of the outermost zone of the lens can be increased. Furthermore, by treating the light source side surface with a multilayered coating, the dependence of transmittance on the angle of incidence can be reduced.

[d] When the area outside the effective diameter of the lamp side surface (the second surface) is formed as a plane face, a large work distance can be secured. When the area outside the effective diameter of the first surface is also formed as a plane race, the plane faces of the first and second surfaces together form a flange for holding the lens, thus facilitating the mounting of the lens.

The light source apparatus of the invention has a discharge lamp, a spherical mirror, and the above-described condenser lens (NA≧0.9), wherein the center of curvature of the spherical mirror and the focal point on the second surface side of the condenser lens are made to coincide with each other, and the discharge lamp is installed with its center of emission placed at the coinciding point. Furthermore, the first surface of the condenser lens is treated with an antireflective coating of single layer, and the second surface is treated with an infrared/ultraviolet reflective coating or an infrared reflective coating.

According to the light source apparatus of the invention, a high-efficiency illumination light source can be achieved which uses a condenser lens having a converging angle of 64.2° or larger. Furthermore, since the condenser lens is of a single-lens construction, the light source apparatus is compact in size.

The projection display apparatus of the invention has an image display device, a light source for illuminating the image display device, and a projection lens for enlarging and projecting an image formed on the image display device.

The above-described light source apparatus is used as the light source for the projection display apparatus. Furthermore, the discharge lamp electrodes and an exhaust vent formed in the burner section of the discharge lamp are arranged in respectively prescribed directions with respect to the image display device to attain a uniform distribution of the projected image brightness.

According to the projection display apparatus of the invention, the image display device can be illuminated with high illuminance, and also, the aberration of the illumination beam is small, as a result of which a projected image of high brightness can be obtained. Furthermore, the high efficiency of the light source contributes to reducing the consumption power of the apparatus.

Another projection display apparatus of the invention has: a light source apparatus having a white light lamp, a spherical mirror, and a condenser lens; color separating means for separating the white light into three primary colors of red, green, and blue; an image display device having a rectangular aperture; color combining means for combining images of red, green, and blue colors; and a projection lens for enlarging and projecting an image formed on the image display device. In this projection display apparatus, the variation of the degree of collimation of the illumination light with wavelength, which is caused by the chromatic aberration of the condenser lens, is corrected by using a concave lens inserted in an optical path for a converging color light and a convex lens inserted in an optical path for a diverging color light.

According to the above projection display apparatus, since the degree of collimation of the illumination light is corrected using lenses, the decrease of illuminance on the surfaces of the liquid-crystal light valves due to differing optical path lengths, and variations in illuminance between the three liquid-crystal light valves are prevented.

According to a still another projection display apparatus of the invention, the color separating means as used in the above-described projection display apparatus is constructed from two crossed dichroic mirrors, and the intersection of the two dichroic mirrors is oriented in a prescribed direction with respect to the direction of the linear emission of the lamp, minimizing the formation of a shadow by the intersection and thus producing a uniform projected image free from unevenness in brightness.

Another light source apparatus of the invention has a lamp, a spherical mirror, and a condenser lens, wherein the condenser lens is constructed from a plurality of separate parts combined together, thereby preventing the cracking of the lens due to thermal expansion.

A still another light source apparatus of the invention has a lamp, a spherical mirror, and a condenser lens, wherein in the light incident surface of the condenser lens is treated with an infrared and/or ultraviolet reflective coating for eliminating unwanted light spectral components such as heat radiation, thereby minimizing deterioration of characteristics of the condenser lens and other optical components due to heat.

The polarizing element of the invention consists of a series of columnar component elements of rhomboidal cross section which are connected together, incident and emergent surfaces thereof being formed in periodic folds with each fold forming such an angle as to allow P-polarized light to pass through with little loss. Furthermore, the angle of incidence is set equal to or greater than the Brewster angle, and the thickness and the folding cycle of the polarizing element are optimized. Thus, the polarizer of the invention achieves a drastic reduction in thickness, and when the angle of incidence is set at the Brewster angle, P-polarized light is transmitted without loss. The transmittance for P-polarized light increases because of the optimization of the thickness of the polarizing element. When the angle of incidence is set at a value greater than the Brewster angle, P-polarized light suffers a slight loss, but instead, the transmittance for S-polarized light decreases, thus increasing the extinction ratio.

By using a plastic material to Form the polarizing element, a single layer of complicated shape can be formed in one-piece construction easily and inexpensively. Furthermore, by using an ultraviolet/infrared radiation cut-off filter, and by employing forced cooling, the thermal deformation and deterioration of the polarizing element can be prevented. Moreover, the extinction ratio is increased by employing a multilayered structure. Preferably, spacers are inserted between polarizing elements to provide an air layer therebetween, thus preventing a decrease in the extinction ratio due to multiple reflections.

According to another polarizing element of the invention, the incident and emergent surfaces are designed to transmit P-polarized light with little loss, and the polarizing element has a triangular-wavelike cross section that provides a uniform layer thickness and a high mechanical strength. Furthermore, the transmittance for P-polarized light is increased by optimizing the thickness and the folding cycle of the polarizing element to set the angle of incidence equal to or greater than the Brewster angle.

By employing such polarizing elements in a projection display device using liquid-crystal light valves, the heat problem of the incident side polarizers of the liquid-crystal light valves can be alleviated, and a compact projection display apparatus of higher brightness can be achieved.

The above and further objects and features of the invention will more fully be apparent from the following detailed description with accompanying drawings.

BRIEF DESCRIPTION OF THE DRAWINGS

FIG. 6 is a spot diagram for a condenser lens of the invention as viewed on the smaller conjugate side thereof.

FIG. 19 is a spot diagram for a condenser lens of the invention as viewed on the smaller conjugate side thereof.

FIG. 21 is a spot diagram for a condenser lens of the invention as viewed on the smaller conjugate side thereof.

FIG. 26 is a diagram illustrating aberrations of a condenser lens of the invention as viewed on the smaller conjugate side thereof.

FIG. 37(*b*) is a cross sectional view for explaining the projection display apparatus of the invention.

FIG. 40(*b*) is a diagram showing the structure of a polarizing element according to the invention.

FIG. 43(*b*) is a diagram for explaining light rays passing through the polarizing element.

FIGS. 47(*b*) is a diagram showing the structure of a polarizing element according to the invention.

FIGS. 48(*b*) is a diagram showing the structure of a polarizing element according to the invention.

DESCRIPTION OF THE PREFERRED EMBODIMENTS

The preferred embodiments of the invention will now be described in detail below with reference to the accompanying drawings.

Embodiment 1 (Condenser lens with large aperture)

The following are the major requirements, other than the converging angle (or NA), that should be considered in designing the characteristics of a condenser lens with large aperture used with a short-arc, long-discharge lamp.

(a) Sufficient back focal length and work distance (WD) must be secured.

(b) Required light beam diameter for illumination must be achieved.

(c) Spherical aberration must be small and an object about the size of the arc length must be sufficiently resolved.

(d) The lens must be easy to mount.

The condenser lens of this embodiment assumes as an example of its application the liquid-crystal projection display apparatus described in connection with the prior art. The present embodiment will be explained by giving examples of numerical values, assuming that the arc length of the discharge lamp is 1 to 5 mm and the illumination beam diameter is 48 to 50 mm. The lens described below has an NA of 0.9 or larger, but it will be appreciated that the NA can be easily reduced at will by using a known diaphragm or the like.

Figure 4:
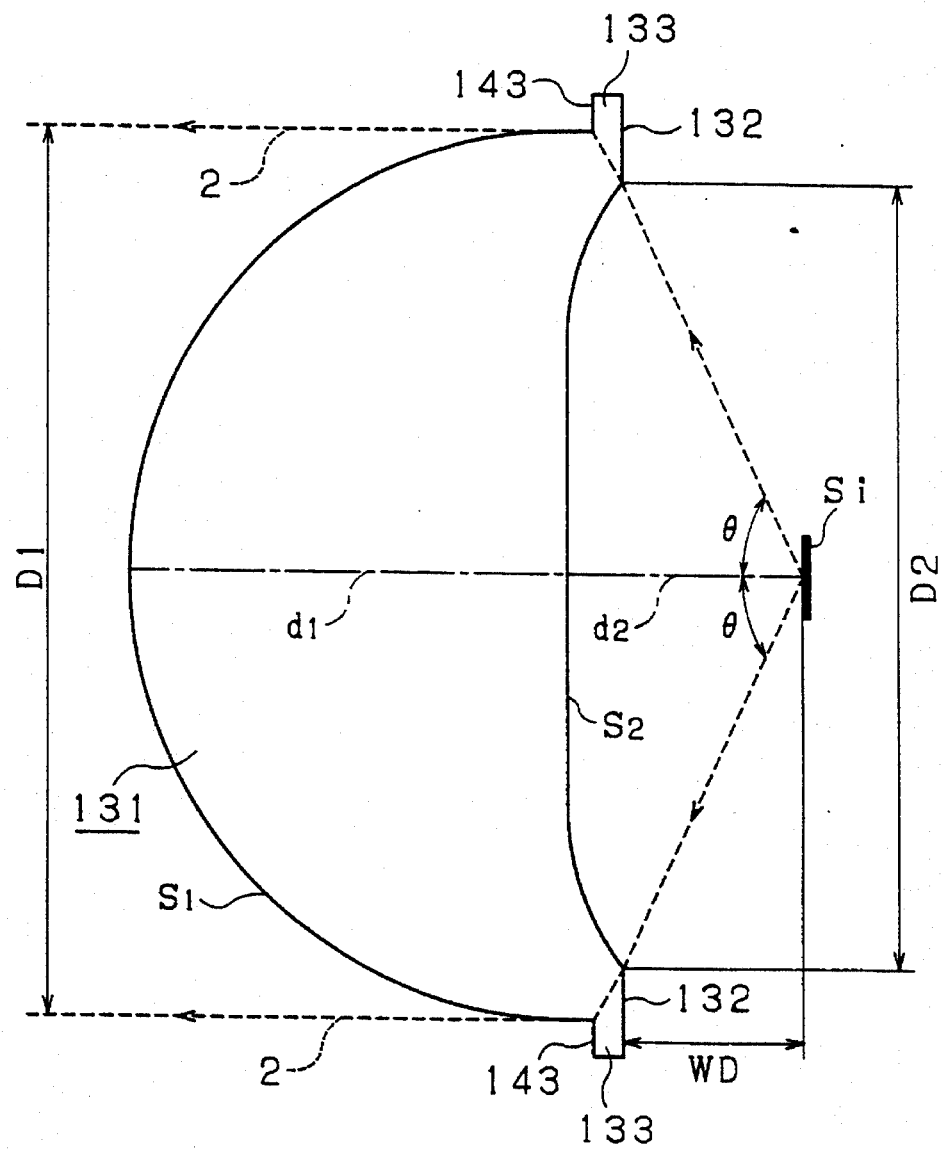
FIG. 4 is a cross sectional view of a condenser lens according to the invention.
Figure 5:
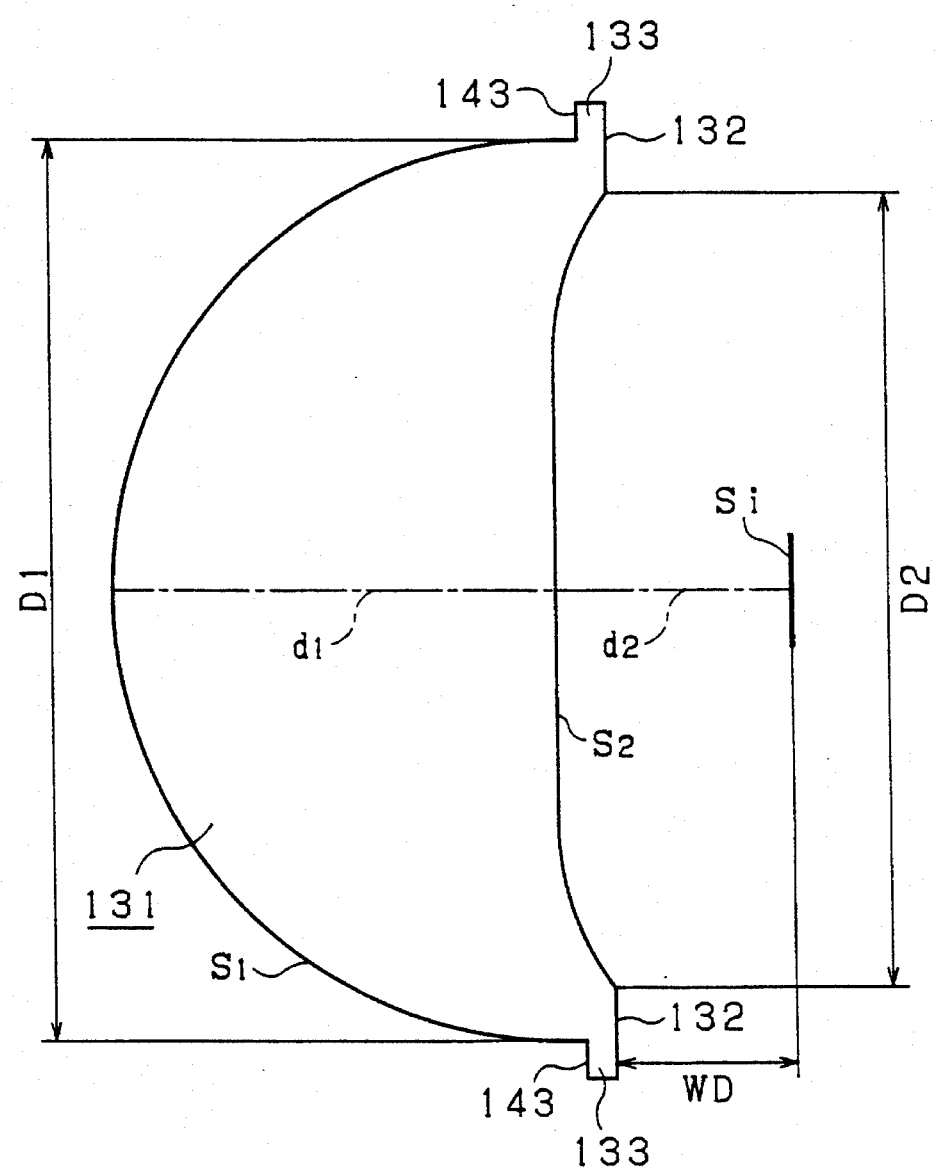
FIG. 5 is a cross sectional view of a condenser lens according to the invention.
Figure 7A:
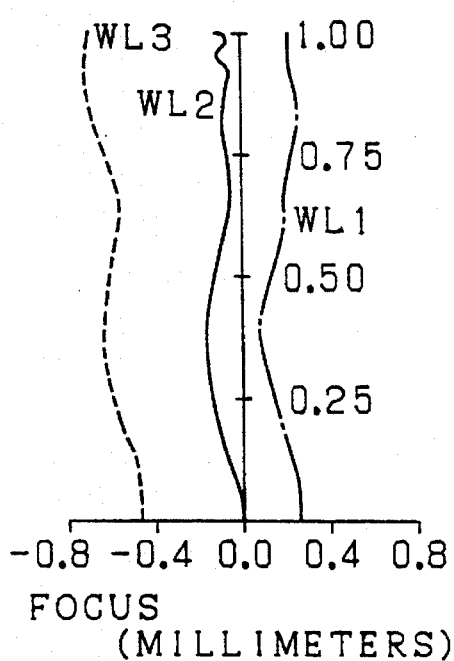
FIG. 7 is a diagram illustrating aberrations of a condenser lens of the invention as viewed on the smaller conjugate side thereof.
Figure 7B:
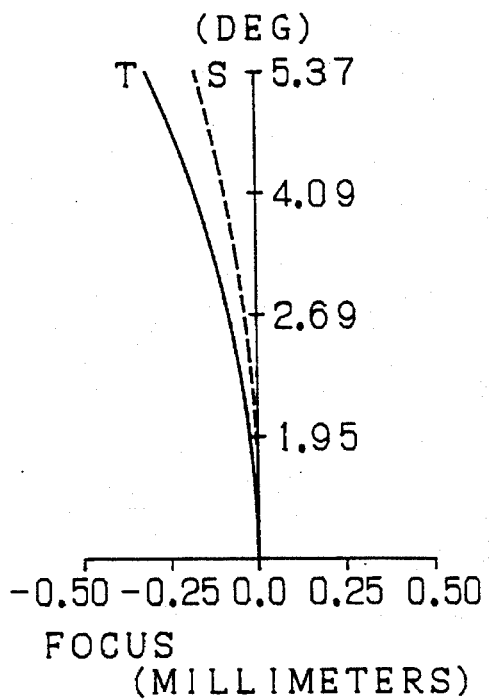
Figure 8A:
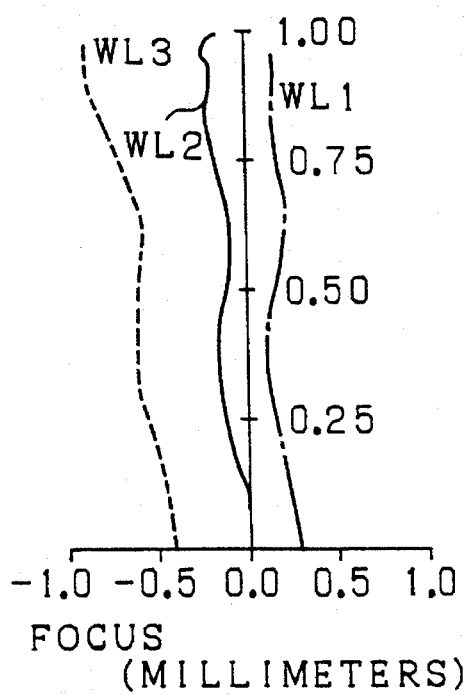
FIG. 8 is a diagram illustrating aberrations of a condenser lens of the invention as viewed on the smaller conjugate side thereof.
Figure 8B:
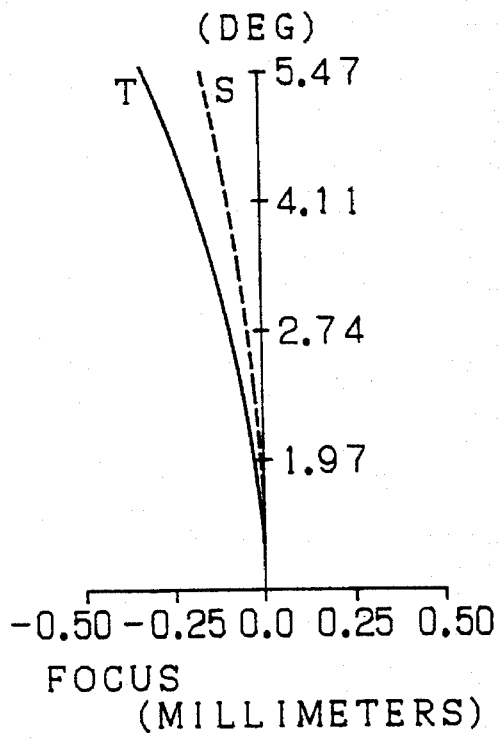
Figure 9A:
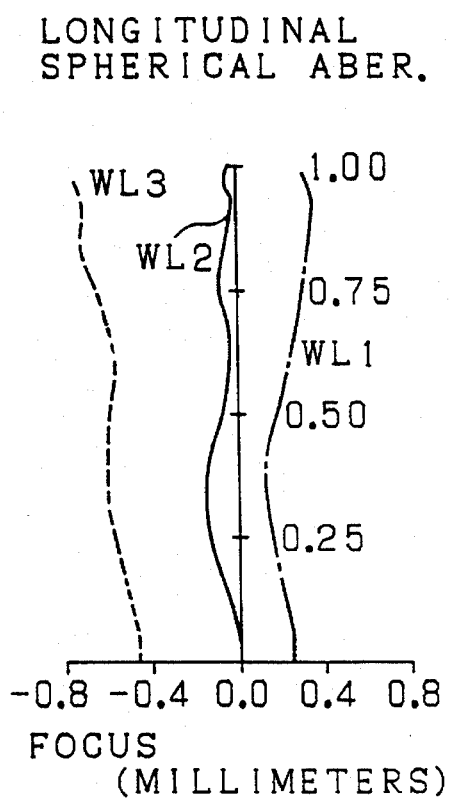
FIG. 9 is a diagram illustrating aberrations of a condenser lens of the invention as viewed on the smaller conjugate side thereof.
Figure 9B:
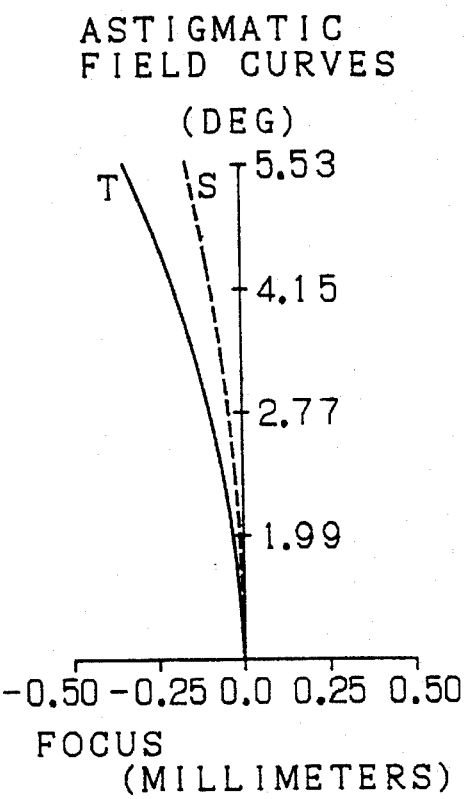
Figure 10A:
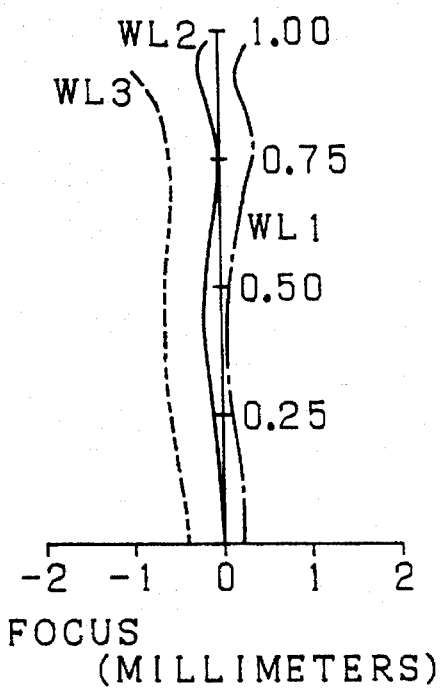
FIG. 10 is a diagram illustrating aberrations of a condenser lens of the invention as viewed on the smaller conjugate side thereof.
Figure 10B:
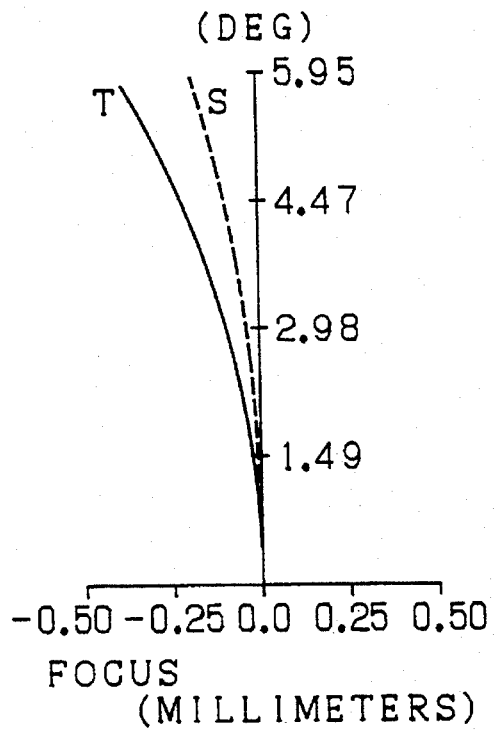
Figure 11A:
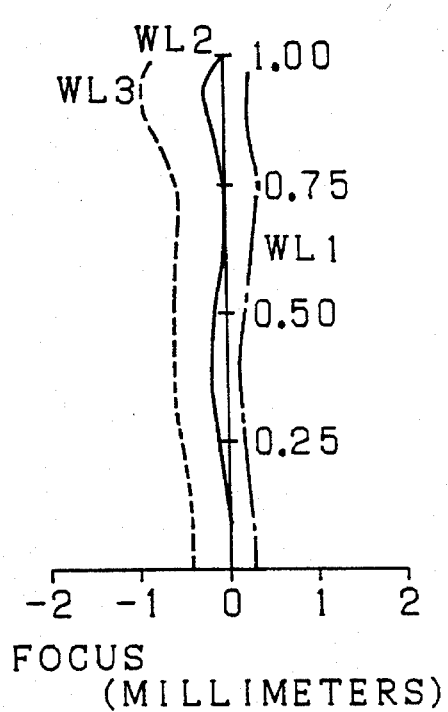
FIG. 11 is a diagram illustrating aberrations of a condenser lens of the invention as viewed on the smaller conjugate side thereof.
Figure 11B:
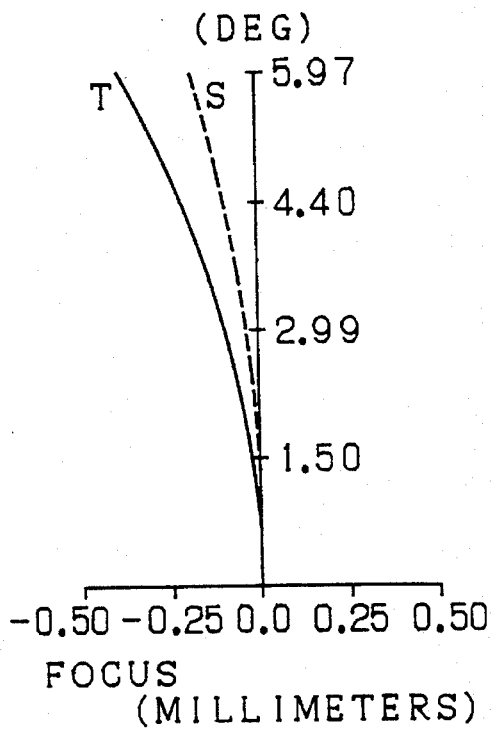
Figure 12A:
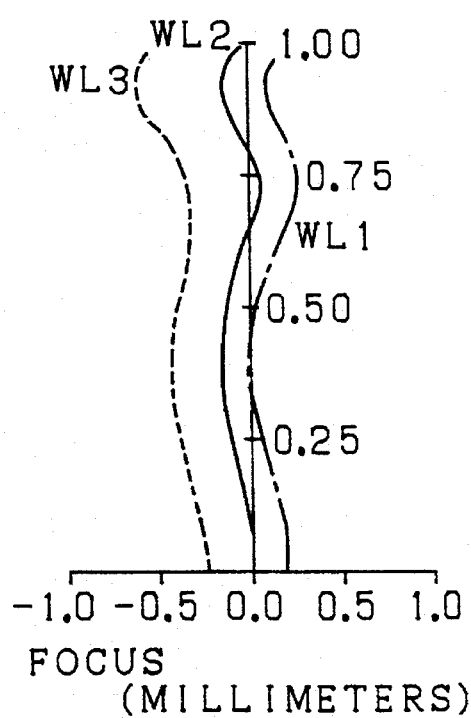
FIG. 12 is a diagram illustrating aberrations of a condenser lens of the invention as viewed on the smaller conjugate side thereof.
Figure 12B:
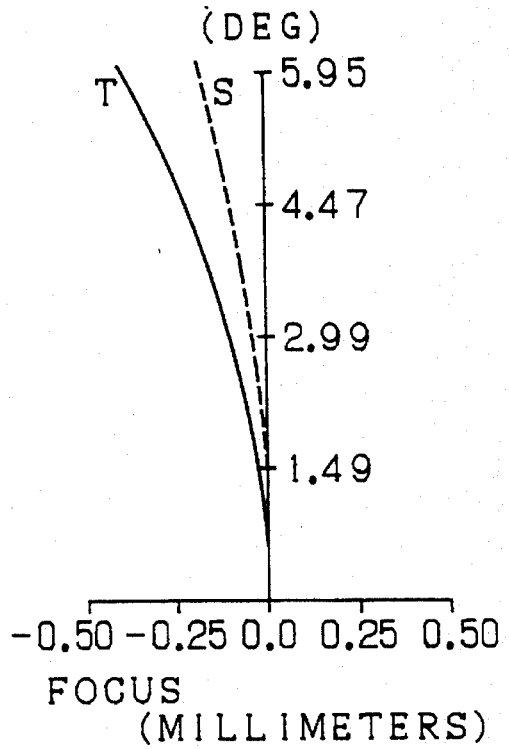

The condenser lens of the present embodiment will now be described with reference to pertinent drawings. FIGS. 4 and 5 are cross-sectional views of lenses corresponding to Examples 1 and 4 of Embodiment 1 which will be described hereinafter. FIG. 4 also contains various signs necessary for the explanation of this embodiment. In FIG. 4, S1 indicates the surface (the first surface) on the larger conjugate side and S2 designates the surface (the second surface) on the smaller conjugate side (the discharge lamp side). The reference sign d1 denotes the thickness across the condenser lens 131. The sign Si represents the arc of the discharge lamp; in FIG. 4, the arc Si is assumed to be 5 mm in length measured along a direction perpendicular to the optical axis of the lens. D1 and D2 are the effective diameters of the first surface S1 and second surface S2, respectively. As shown by dotted lines, light rays, radiated from an axial point on the smaller conjugate side and incident on the zone of diameter D2 on the surface S2, emerges as parallel rays 2 from the zone of diameter D1 on the surface S1. In the figure, θ denotes the maximum converging angle, and using θ, the numerical aperture (NA) of the condenser lens is defined by Expression (1) below.

$$NA = \sin(\theta) \quad (1)$$

The reference numeral 132 indicates a plane face formed around the periphery of the second surface S2 outside the effective diameter D2. A similar plane face 143 is also provided around the periphery of the first surface S1 outside the effective diameter D1. The plane faces 132 and 143 together form a flange 133 in integral fashion with the condenser lens 131. The flange 133 is used to hold the condenser lens 131 in position, as will be described later in connection with Embodiments 2 and 3. The sign d2 denotes the distance (back focal length) from the center of the second surface S2 to the center of the arc Si, and WD refers to the distance (work distance) from the plane face 132 to the arc Si. The numeral 2 indicates a parallel beam of light which was emitted from the center of the arc Si with the maximum converging angle θ and collimated by the condenser lens 131. The plane faces 132 and 143 need not necessarily be specular, but may be finished to a ground-glass-like surface or may be coated with black paint for prevention of unwanted light rays.

The first surface S1 is of aspherical form having a convex curvature, while the second surface S2 is also of aspherical form having a strongly concave curvature on the outermost circular zone thereof. As an alternative lens configuration, the outermost circular zone may be formed convex, but it should be appreciated that the outermost zone of concave curvature has the effect of reducing the angle of incidence of the rays entering the same zone of the surface S2, which produces increased transmittance and thus enhances the efficiency. As shown in the examples using specific values, since the absolute value of the radius of curvature at the center of the second surface S2 is extremely large compared with that of the first surface S1, the center zone appears almost flat.

To achieve the aforementioned requirements (a) to (c), the above-described bi-aspherical angle lens configuration employed in the lens system of the present embodiment satisfies the following conditional expressions.

$$0.42 < r1/nf < 0.45 \quad (2)$$

$$18 < |r2/nf| \quad (3)$$

$$-0.39 < K1 < -0.25 \quad (4)$$

$$0.11 < \Delta 2/f < 0.14 \quad (5)$$

where f: focal length of the whole lens system
n: refractive index of the lens
r1: radius of center curvature of the first surface S1
r2: radius of center curvature of the second surface S2
K1: conic constant of the first surface S1
$\Delta 2$: axial difference between the aspherical face at the edge of the effective diameter of the second surface S2 and a reference spherical face having the radius of center curvature r2; the direction in which the outermost circular zone of the second surface S2 is curving toward the smaller conjugate side is taken as positive.

The meanings of the upper and lower limits given by the above conditional expressions will be explained below. Referring first to Expression (2) that limits the ratio of the radius of center curvature r1 of the first surface S1 to the product of refractive index n and focal length f, if the ratio is smaller than the lower limit, the refracting power becomes greater on the first surface S1, and as a result, the required work distance (WD) and back focal length cannot be obtained. Conversely, if the ratio is greater than the upper limit, in correcting a large spherical aberration occurring a, the second surface S2 an attempt to correct the spherical aberration near the axis would result in an increased zonal aberration, producing an intolerable negative spherical aberration at the maximum zonal portion. If it is attempted to correct the spherical aberration at the maximum zonal portion, a spherical aberration of intolerable magnitude will result at the intermediate zone.

Expression (3) defines the condition that limits the absolute value of the ratio of the radius of center curvature r2 of the second surface S2 to the product of refractive index n and focal length f. If the ratio is smaller than the lower limit, the third-order spherical aberration near the axis becomes negative. The condition given by Expression (3) determines the nearly flat shape of the center zone of the second surface S2.

Expression (4) defines the condition for proper correction of higher-order spherical aberrations. If the value is smaller than the lower limit, correcting the spherical aberration near the axis would result in a positive spherical aberration of intolerable magnitude at and around the maximum zone. Conversely, if the value is greater than the upper limit given by Expression (4), correcting the spherical aberration near the axis would cause a negative high-order aberration at and around the maximum zone.

Expression (5) defines the condition that limits the ratio of the amount of asphericity $\Delta 2$ at the edge of the effective diameter of the second surface S2 (the side facing the discharge lamp) to focal length f. If the ratio is greater than the upper limit given by Expression (5), the concave curvature at the edge of the effective diameter of the second surface S2 becomes so great that the required NA cannot be obtained. Moreover, the required work distance (WD) cannot be obtained. Conversely, if the ratio is smaller than the lower limit given by Expression (5), the converging angle can be made larger, but in turn, a large high-order spherical aberration will occur at the zonal area, which is difficult to correct.

Tables 1 to 6 show specific examples of numerical values according to Embodiment 1. The signs contained in Tables 1 to 6 are explained below.

f: focal length of the whole condenser lens system
NA: numerical aperture of the second surface S2 (on the smaller conjugate side)
$\beta$: reference magnification of image when light enters from the larger conjugate side
WD: work distance (see FIG. 4)
D1: effective diameter of the first surface S1
D2: effective diameter of the second surface S2
n: refractive index of the lens (n1)
$\Delta 2$: amount of asphericity at the edge of the effective diameter of the second surface S2
m: surface number sequentially counted from the larger conjugate side
ri: radius of center curvature of the i-th lens surface counted from the larger conjugate side
di: thickness and air gap of the i-th lens component counted from the larger conjugate side
ni: refractive index, for wavelength 546.1 nm (e line), of the i-th lens component counted from the larger conjugate side
vi: Abbe number of the i-th lens component counted from the larger conjugate side It is understood that, in a rectangular coordinate system (X, Y, Z) taking the center of the surface as the origin and plotting the optical axis direction along the Z-axis, the aspherical shape of each surface is expressed by Expression (6) below.

$$Z = \frac{\phi^2/r}{1 + [1 - (1+K)\phi^2/r^2]^{1/2}} + \sum_{i=2}^{5} A_{2i}\phi^{2i} \quad (6)$$

$$\phi = (X^2 + Y^2)^{1/2}$$

where r is the radius of center curvature, K is the conic constant, and A4, A6, A8, and A10 are the fourth-, sixth-, eigth-, and tenth-order polynomial deformation terms, respectively.

At this time, $\Delta 2$ is expressed by Expression (7) below.

$$\Delta 2 = Zas - Zsp \quad (7)$$

where Zas and Zsp are given by the following expressions (8) and (9), using the effective diameter D2 of the second surface S2.

$$Zas = \frac{(D_2/2)^2/r_2}{1 + [1 - (1+K)(D_2/2)^2/r_2^2]^{1/2}} + \sum_{i=2}^{5} A_{2i}(D_2/2)^{2i} \quad (8)$$

$$Zsp = \frac{(D_2/2)^2/r_2}{1 + [1 - (D_2/2)^2/r_2^2]^{1/2}} \quad (9)$$

Example 1

FIG. 4 is a cross sectional view illustrating Example 1 of Embodiment 1. Numerical data for Example 1 of Embodiment 1 are shown in Table 1.

FD13 (manufactured by Hoya Corporation) was used as the glass material. FIG. 6 shows a spot diagram for wavelength 546.1 nm (e line) on a paraxial image plane on the smaller conjugate side, each mark "x" corresponding to one ray of light. For calculations, 312 rays were traced.

In Example 1, since the spherical aberration is sufficiently corrected, it can be seen that a spot diameter of about 0.5 mm is obtained despite the large aperture NA=0.917 (θ=66.5°). This means sufficient resolution for objects of 1 to 5 mm in size (arc length); therefore, when rays of light enter from the second surface, S2, side, a parallel beam of light 2 with low aberration close to the limit determined by the arc length can be obtained.

Example 2

Numerical data for Example 2 of Embodiment 1 are shown in Table 2.

FD4 (manufactured by Hoya Corporation) was used as the glass material. In Example 2, the beam diameter (D1) obtained is approximately the same as that obtained in Example 1, but a larger NA can be obtained.

Example 3

Numerical data for Example 3 of Embodiment 1 are shown in Table 3.

FD14 (manufactured by Hoya Corporation) was used as the glass material. In Example 3, a larger NA can be obtained than in Example 1.

Example 4

FIG. 5 is a cross sectional view illustrating Example 4 of Embodiment 1. Numerical data for Example 4 of Embodiment 1 are shown in Table 4.

FD6 (manufactured by Hoya Corporation) was used as the glass material. In Example 4, the beam diameter (D1) is about 1 mm smaller than that obtained in Example 1, but a further increase in NA is achieved.

Example 5

Numerical data for Example 5 of Embodiment 1 are shown in Table 5.

FD6 (manufactured by Hoya Corporation) was used as the glass material. In Example 5, the beam diameter (D1) is about 1 mm smaller than that obtained in Example 1, but NA is larger than in Example 4.

Example 6

Numerical data for Example 6 of Embodiment 1 are shown in Table 6.

NbFD13 (manufactured by Hoya Corporation) was used as the glass material. In Example 6, the beam diameter (D1) is about 1 mm smaller than that obtained in Example 1, but a further increase in NA is achieved.

FIGS. 7 to 12 are diagrams illustrating aberrations on the paraxial image plane on the smaller conjugate side for Examples 1 to 6, respectively, of Embodiment 1. Each figure shows spherical aberration for three wavelengths (WL1=610 nm, WL2=546.1 nm, WL3=470 nm) and astigmatism for wavelength 546.1 nm (e line). The astigmatism was calculated based on the maximum image height of 2.5 mm, assuming the use of a lamp of 5 mm arc length. The spherical aberration and astigmatism given in FIGS. 7 to 12 show sufficiently satisfactory values for practical use.

As detailed above, the condenser lens with large aperture according to Embodiment 1 has the following excellent characteristics.

(A) Despite its single lens configuration, the condenser lens has a large aperture of NA>0.9 and yet achieves a construction of small spherical aberration, increased efficiency, and reduced aberration.

(B) The condenser lens is capable of producing a beam of light of a large diameter for its focal length.

(c) A relatively long back focal length can be provided on the second surface side for the focal length of the lens system. When the area outside the effective diameter of the second surface is formed as a plane face, a sufficient work distance (WD) can also be secured. Furthermore, by forming the area outside the first surface as a plane face, a flange for holding the lens in position can be formed from the plane faces on both surfaces, which facilitates the mounting of the lens.

(D) Since the outermost circular zone of the second surface can be formed concave, the angle of incidence on the same zone can be reduced, which improves the transmittance. Furthermore, when a multilayered film coating is applied to the light source side, the construction serves to reduce the dependence of transmittance characteristic on the angle of incidence.

(E) Since the condenser lens is constructed from a single lens, there is no need to consider center alignment between lens components when mounting. Moreover, by forming the flange integrally with the lens using a known glass mold process or the like, the condenser lens can be volume-manufactured at low cost.

(F) The single lens configuration serves to reduce the lens weight as well as the loss due to absorption by the lens material. This configuration also contributes to reducing the overall length of the lens compared to a combination of lenses.

Embodiment 2 (Light source apparatus)

Example 1

Figure 13:
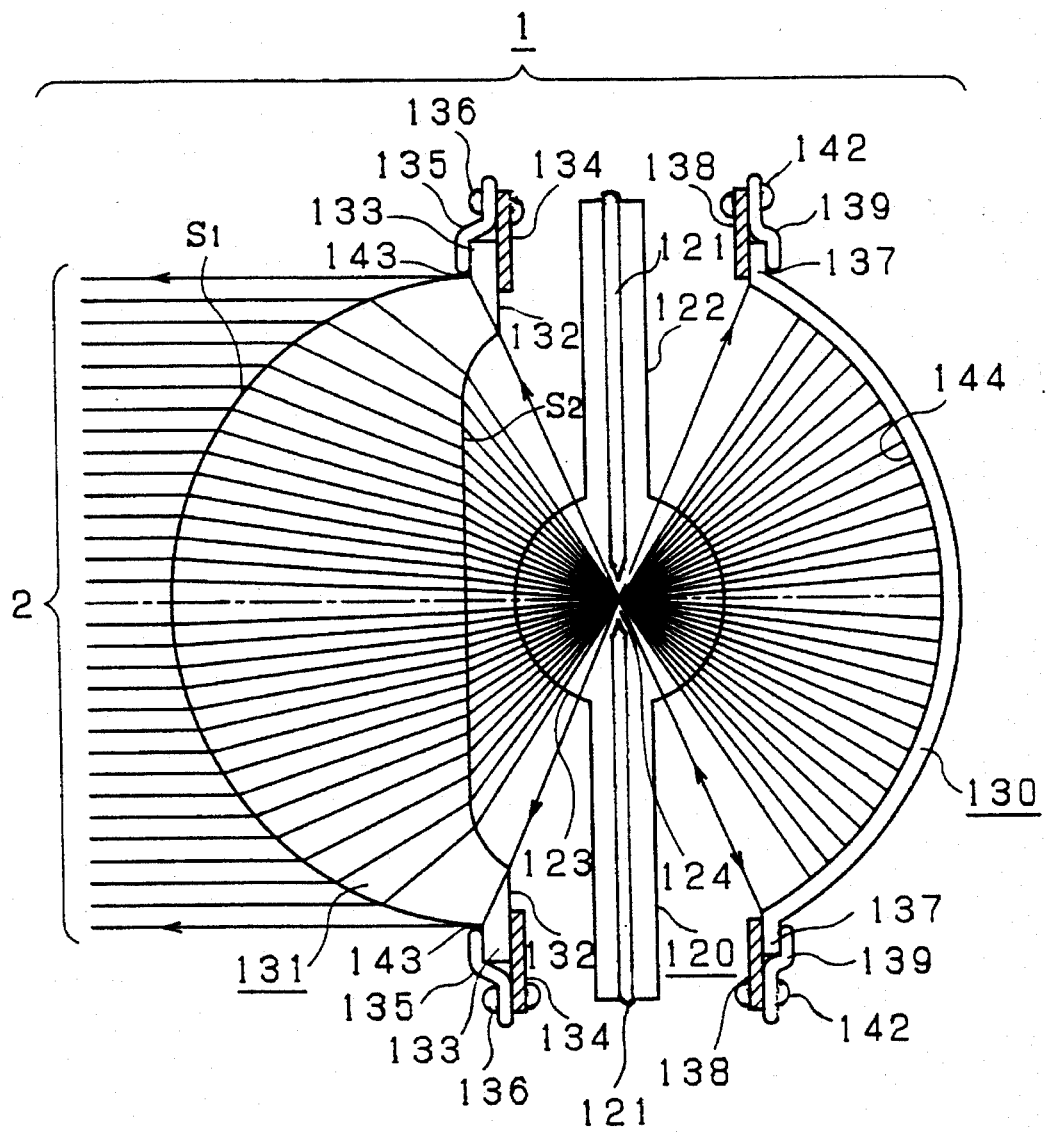
FIG. 13 is a diagram showing the construction of a light source apparatus according to the invention.

Using the condenser lens with large aperture of Embodiment 1, a compact and high-efficiency illumination light source apparatus can be constructed. FIG. 13 shows the construction of a light source apparatus according to Example 1 of Embodiment 2, wherein the reference numeral 131 is a condenser lens, 143 is a first plane face formed around the periphery of the effective diameter of the first surface S1 of the condenser lens 131, 132 is a second plane face formed around the periphery of the second surface S2 of the condenser lens 131, and 133 is a flange consisting of the first and second plane faces 143 and 132 on both sides and formed integrally with the condenser lens 131.

The numeral 120 indicates a discharge lamp; in practical application, a metal halide lamp, a xenon lamp, or the like, is used. Indicated at 121 are electrodes of the lamp 120, and at 122 is shown a shaft, made of a glass material, in which the electrodes 121 are sealed. The reference numeral 123 is a burner section of the lamp 120, which is made of a glass or a light-transmitting ceramic material or the like, and its internal hollow space is filled with various gases and elements necessary for light emission. The required emission spectrum can be obtained by causing discharge across a discharge gap 124 between the pair of electrodes 121. The lamp 120 is mounted facing the second surface S2 of the condenser lens 131 in such a manner that the position of the discharge gap 124 coincides with the image plane Si on the smaller conjugate side in Embodiment 1 (FIGS. 4 and 5) with the shaft 122 being placed perpendicularly to the optical axis (indicated by a dashed line) of the condenser lens 131.

The numeral 130 is a spherical mirror whose concave surface 144 is a mirrored surface finished with a reflective coating. Indicated at 137 is a flange formed around the periphery of the effective diameter of the spherical mirror 130. Typically, the spherical mirror 130 is mounted in such a manner that the center of curvature of the concave surface 144 coincides with the center of the discharge gap 124 (the center of emission). The numeral 134 is a first support plate, 138 is a second support plate, 135 is a first clamping, member, 139 is a second clamping member, 136 is a first screw, and 142 is a second screw.

The operation of Example 1 will be described below. The lamp 120 is driven using a known circuit (not shown) that causes discharge between the pair of electrodes 121, and the arc formed by the discharge heats the interior of the burner section 123 to emit light. When the lamp 120 is driven by alternating current, the arc is formed as a line extending across the discharge gap 124 between the electrodes 121. The center of the discharge gap 124 is positioned at the focal point on the second surface, S2, side of the condenser lens 131, so that the beam of light emitted from the center of the discharge gap 124 and directly incident on the condenser lens 131 is passed through the condenser lens 131 and emerges as a parallel beam of light 2.

On the other hand, since the center of curvature of the concave surface 144 coincides with the center of the discharge gap 124, the beam of light emitted from the center of the discharge gap 124 and incident on the spherical mirror 130 is reflected by the concave surface 144 back into the same path and is converged onto the center of the discharge gap 124 for radiation toward the condenser lens 131. With the concave surface 144 designed to have a reflection factor of nearly 100% for the desired wavelength region, the power of the light emerging from the condenser lens 131 becomes about two times as great as that when the spherical mirror 130 is not provided. In determining the effective diameter of the spherical mirror 130, if the effective reflecting area of the concave surface 144 is made larger than the area defined by the maximum converging angle θ of the condenser lens 131, the largest possible beam of light can be converted into the parallel beam of light 2.

The radius of curvature of the concave surface 144 of the spherical mirror 130 should be made smaller to reduce the overall size of the light source apparatus 1; however, a smaller radius of curvature not only increases astigmatism in focusing the edge portions of the arc length but also is undesirable as it limits the location of the shaft 122 of the lamp 120. The present inventors analyzed the aberration characteristic of the entire light source apparatus 1 by tracing rays of light and found that the radius of curvature of the concave surface 144, when used in combination with the condenser lens of Embodiment 1, should be made equal to or greater than ½ of the effective diameter D1 of the first surface S1 of the condenser lens 131.

The condenser lens 131 is fixed in position by making use of the flange 133 integrally formed around the periphery of the effective diameter thereof. In the example of FIG. 13, the condenser lens 131 is first positioned by pressing the plane face 132 against the support plate 134 installed on the second surface, S2, side, and then fixed in position by pressing the clamping member 135 against the plane face 143 and fixing it to the support plate 134 with the screw 136.

To fix the spherical mirror 130 in position, first the flange 137 integrally formed around the periphery is pressed against the support plate 138, and then, the clamping member 139 is pressed against the opposite side of the flange 137 and is fixed to the support plate 138 with the screw 142.

The first support plate 134 has a circular opening at its center through which the light emitted from the lamp 120 is allowed to enter the second surface S2 of the condenser lens 131. Likewise, the second support plate 138 has a circular opening at its center through which the light emitted from the lamp 120 is allowed to illuminate the concave surface 144.

The first and second surfaces S1 and S2 of the condenser lens 131 are treated, as necessary, with an antireflective coating (e.g., to transmit wavelength range of 380–780 nm), an ultraviolet/infrared reflective coating (e.g., to reflect wavelength ranges below 400 nm and above 700 nm), or an infrared reflective coating (e.g., to reflect wavelength range above 700 nm). The type of coating and the selection of the surface, S1 or S2, to be coated are determined according to the purpose of lighting, but in some applications, coating is not necessarily needed. As an example, we will describe the coating applied to the condenser lens 131 when it is used in the light source apparatus 1 for the liquid-crystal projection display apparatus shown in FIG. 1.

Figure 1:
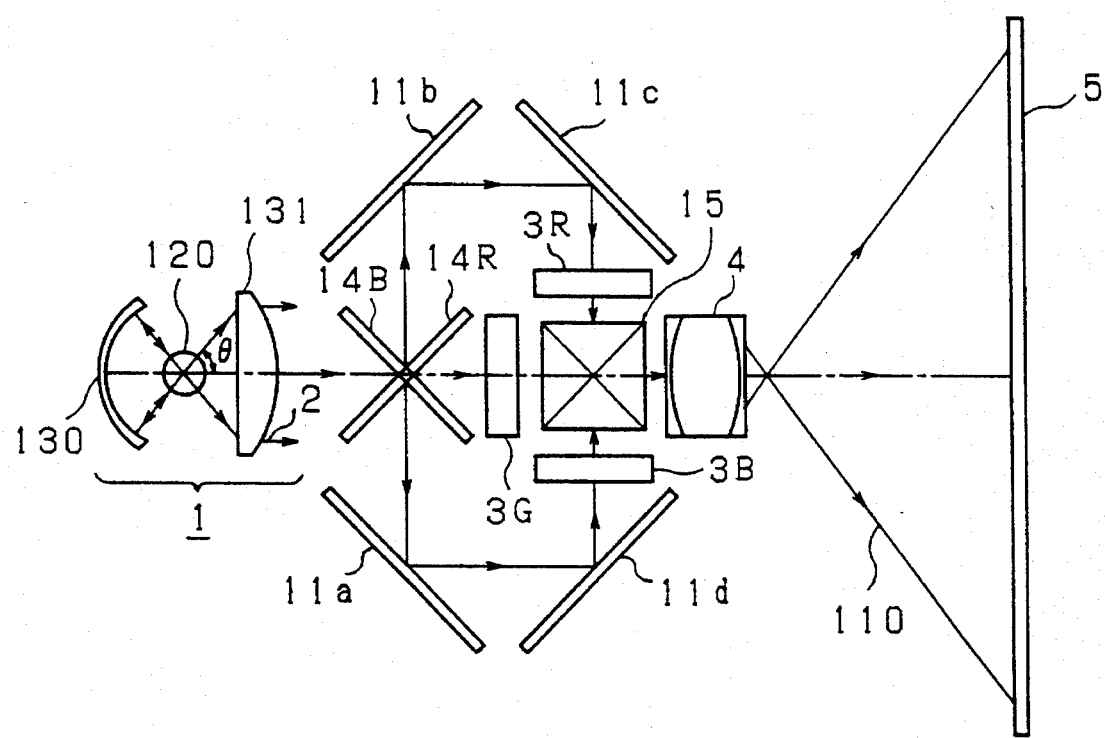
FIG. 1 is a diagram showing the construction of a prior art projection display apparatus.

For the liquid-crystal projection display apparatus, the light source apparatus 1 is required to emit white light over the entire visible spectrum. Furthermore, since the characteristics of the liquid-crystal panels 3R, 3G, and 3B tend to deteriorate by exposure to infrared radiation (heat radiation) as well as ultraviolet radiation, radiation outside the visible spectrum must be removed as much as possible from the light used for illumination. If a surface of the condenser lens 131 is treated with an ultraviolet/infrared reflective coating or an infrared reflective coating, heat radiation contained in the beam of light 2 can be effectively reduced. As is well known, such coating should be formed from a multilayered film, but the problem here is the dependence of the transmittance characteristic on the angle of incidence. However, in the case of the condenser lens 131, the outermost circular zone of the second surface S2 is formed concave to suppress the increase in the angle of incidence. This construction serves to improve the uniformity of the transmittance characteristic as compared with the prior art condenser lens construction having a plane surface on the incident side (FIG. 1). Therefore, it is useful to apply an ultraviolet/infrared reflective coating or infrared reflective coating to the second surface S2.

In the case of the first surface S1, the angle of incidence tends to increase toward its periphery; therefore, by treating the first surface S1 with a single-layer antire-flective coating, the dependence of the spectral transmission on the angle of incidence can be reduced to a minimum. Further, when the concave surface 144 is coated with a highly reflective metal thin film such as Al or Au or treated with a coating that transmits both infrared and ultraviolet lights or with a coating that transmits infrared light, unwanted spectral components contained in the beam of light 2 can be reduced.

Example 2

Figure 15:
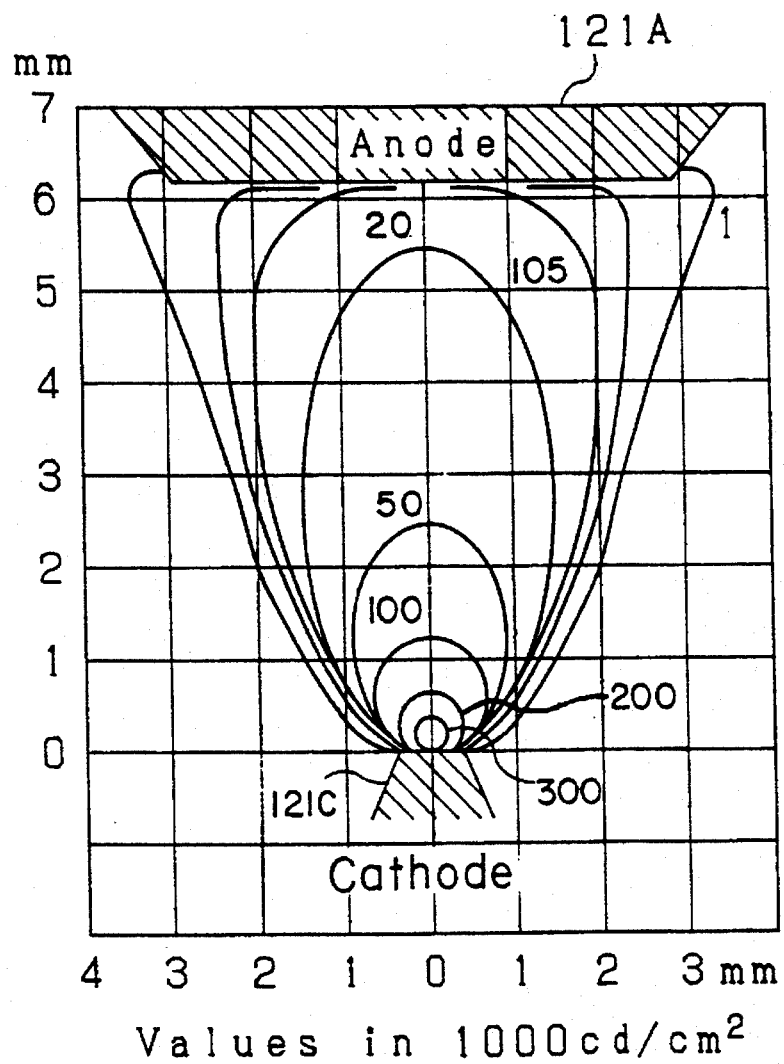
FIG. 15 is a diagram showing an example of a luminous intensity distribution in a DC-operated xenon discharge lamp.

Example 1 described above is concerned with an arrangement in which the focal point of the condenser lens 131 and the center of curvature of the concave surface 144 are made to coincide with the center of the discharge gap 124. However, when a xenon lamp which is built for directcurrent operation is used as the lamp 120, the configuration described below will be more appropriate. As is well known, a DC-operated xenon lamp has an asymmetric electrode construction; generally, the cathode is thin and the anode is thick. It is also known that the cathode produces a very small spot light near its tip. As an example, a luminous intensity distribution between the electrodes in a XBO2500W type xenon lamp made by OSRAM GmbH (Germany) is shown in FIG. 15. In the example shown, it can be seen that, although the electrodes are spaced apart by about 6 mm, most of the light energy is concentrated within an area of diameter 0.5 mm or less from the tip of the cathode 121C.

Figure 14:
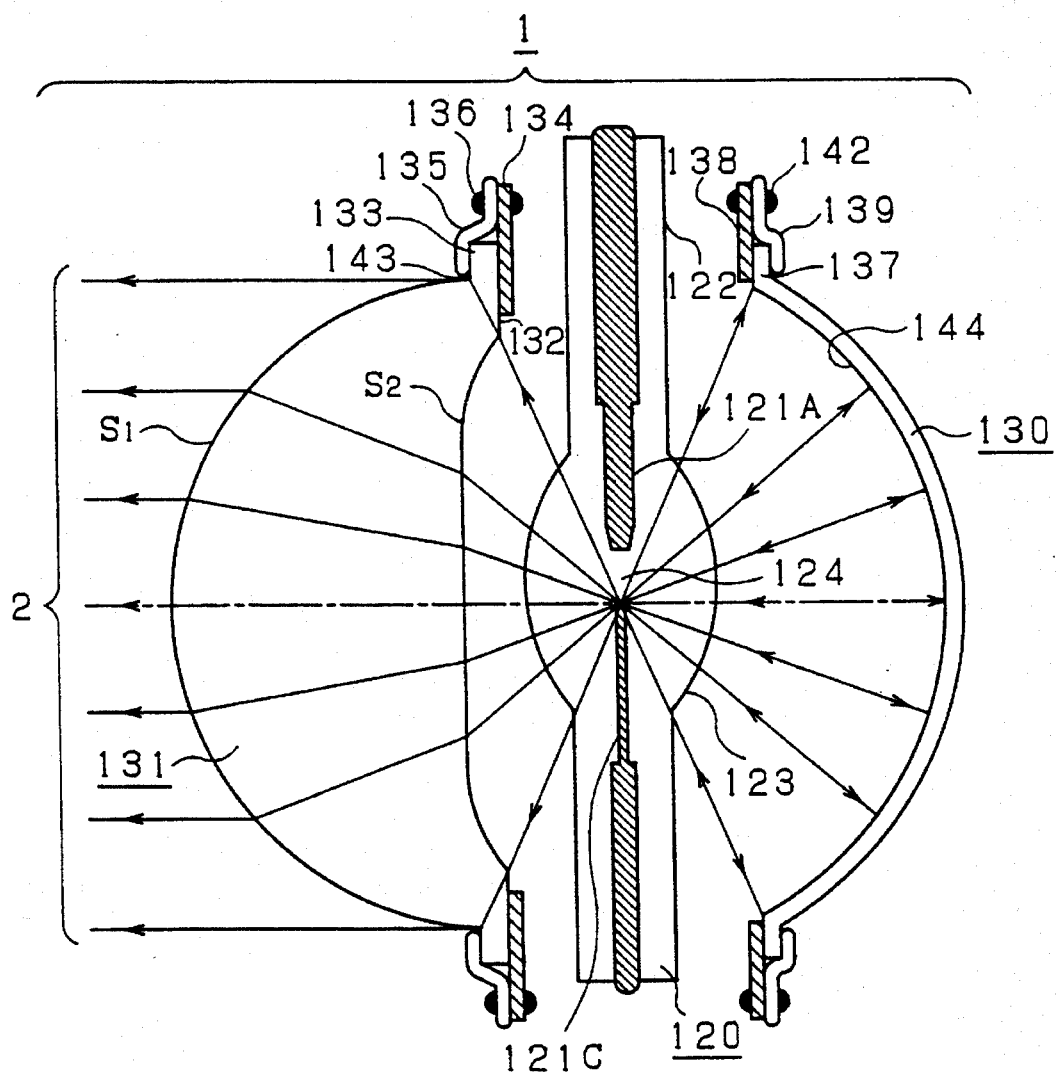
FIG. 14 is a diagram showing the construction of a light source apparatus according to the invention.

Since the luminous region is localized on the tip of the cathode in the DC-operated xenon lamp, as described above, the travelling direction of the emergent light can be aligned parallel to the optical axis by aligning the spot-like luminous region with the optical axis of the light source apparatus. FIG. 14 shows the construction of the light source apparatus of Example 2 whose components are arranged taking the above point into consideration. In FIG. 14, the numeral 120 is the xenon lamp as a discharge lamp, and 121A and 121C indicate respectively the anode and cathode of the xenon lamp 120. The other components are the same as those shown in FIG. 13.

In FIG. 14, the tip of the cathode 121C is located at the focal point on the optical axis (shown by a dashed line) of the condenser lens 131. The center of curvature of the concave surface 144 is also made to coincide with the tip of the cathode 121C. With this arrangement, the travelling direction of the emergent beam of light 2 can be precisely aligned parallel to the optical axis of the condenser lens 131. This arrangement, therefore, facilitates the installation when the light source apparatus of this example is used as the light source apparatus 1 for the liquid-crystal projection display apparatus of FIG. 1. The apparatus of FIG. 14 is identical to that shown in FIG. 13, except that in FIG. 14 the xenon lamp 120 having the cathode 121C and anode 121A is used as the discharge lamp; therefore, the operational description of this example is omitted herein.

Thus, Embodiment 2 realizes a compact and high-efficiency illumination light source apparatus using the condenser lens of Embodiment 1 and 4 (described later as Embodiment 5). Since the condenser lens is of single lens configuration, the light source apparatus can be reduced in size, and also, the lens can be mounted easily by making use of the flange integrally formed therewith. Furthermore, since the radius of curvature of the spherical mirror, a component of the light source apparatus, is made equal to or greater than ½ of the effective diameter of the first surface of the condenser lens, astigmatism for the illumination light can be reduced while securing the required freedom for the location of the discharge lamp. Moreover, since the second surface is treated with an infrared/ultraviolet reflective coating or an infrared reflective coating, a large transmittance is ensured while successfully removing unwanted spectral components. When a DC-operated xenon discharge lamp is used in the light source apparatus, the arrangement is such that the focal point of the condenser lens and the center of curvature of the spherical mirror coincide with the tip of the cathode of the discharge lamp. This arrangement ensures that the illumination light emerges from the condenser lens in a direction parallel to the optical axis thereof.

Embodiment 3 (Projection display apparatus)

Using the light source apparatus of Embodiment 2 in place of the prior art light source apparatus 1 for the liquid-crystal projection display apparatus shown in FIG. 1, a high-brightness liquid-crystal projection display apparatus can be constructed. A first reason is that the light emitted from the light source can be beamed efficiently through the condenser lens with large aperture of $NA \geq 0.9$. A second reason is that the aberration of the illumination light is extremely small so that the beam of light can be input with high efficiency to the projection lens 4.

Conventionally, since a nontelecentric lens with small aperture is used as the projection lens 4, a technique has been employed wherein a converging lens (not shown) is mounted in the vicinity of the liquid-crystal panels 3R, 3G, and 3B to improve the efficiency of the incident light beam entering though the entrance pupil (not shown) of the projection lens 4. A highly bright projected image can be obtained with the light source apparatus of Embodiment 2 even when the light source apparatus is used for the projection display apparatus employing the above arrangement having a converging lens mounted near the liquid-crystal panels. This is because the aberration of the illumination light beam 2 is extremely small so that a very small light source image can be focused by the converging lens onto the entrance pupil of the projection lens, thereby maximizing the transmitted light beam through the projection lens.

Figure 16A:
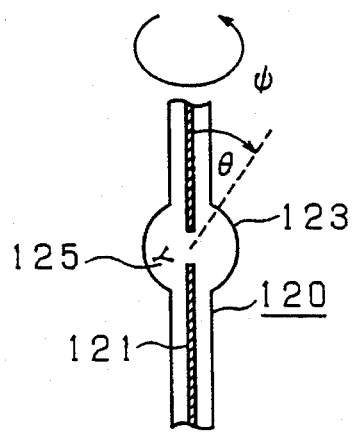
FIG. 16(a) is a diagram for explaining the light distribution characteristics of a discharge lamp.
Figure 16B:
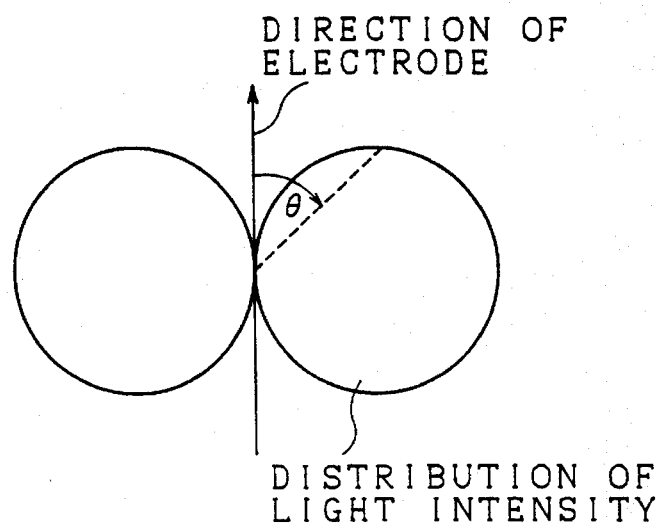
FIG. 16(b) is a diagram for explaining the light distribution characteristics of a discharge lamp.
Figure 16C:
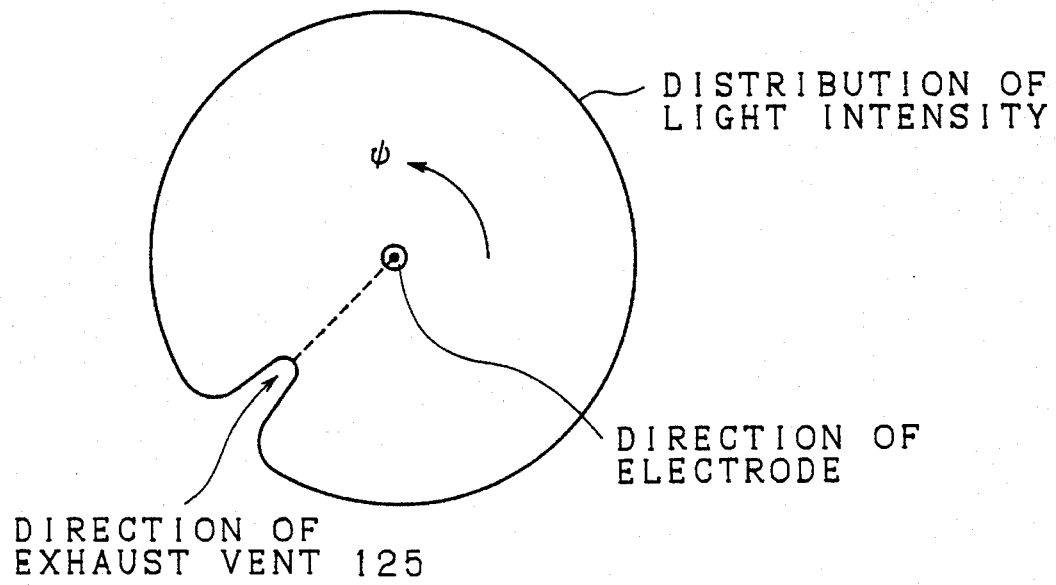
FIG. 16(c) is a diagram for explaining the light distribution characteristics of a discharge lamp.

Because of the light distribution characteristic of the lamp 120, uniformity of projected image brightness varies with the orientation of liquid-crystal panel screens and the posture of the lamp. This variation of brightness will be explained with reference to FIG. 16, and an optimum lamp arrangement will be considered with reference to FIG. 17. FIG. 16(*a*) is a diagram defining the angle of rotation $\psi$ of the lamp 120 about the electrode 121 and the angle of deviation $\theta$ from the electrode 121. With these two angles $\theta$ and $\psi$, the light distribution characteristic of the lamp 120 varies as shown in FIGS. 16(*b*) and 16(*c*). That is, for the variation of the angle $\theta$, the luminous intensity is the smallest for directions parallel to the electrode and the largest for directions perpendicular to the electrode.

On the other hand, for the variation of the angle $\psi$, the luminous intensity remains substantially unchanged. However, in the manufacturing process of the lamp 120, an exhaust vent 125 is formed in the burner section 123 (air inside the burner section is evacuated through the exhaust vent which is then closed by fusing glass thereon), so that the luminous intensity tends to decrease in the direction of $\psi$ that corresponds to the exhaust vent 125.

By considering the above light distribution characteristic of the lamp 120, the lamp arrangement can be optimized from the viewpoint of a uniform distribution of projected image brightness when the light source apparatus of Embodiment 2 is used for the projection display apparatus of FIG. 1. Optimizing the lamp arrangement will be described below with reference to FIG. 17.

Figure 17:
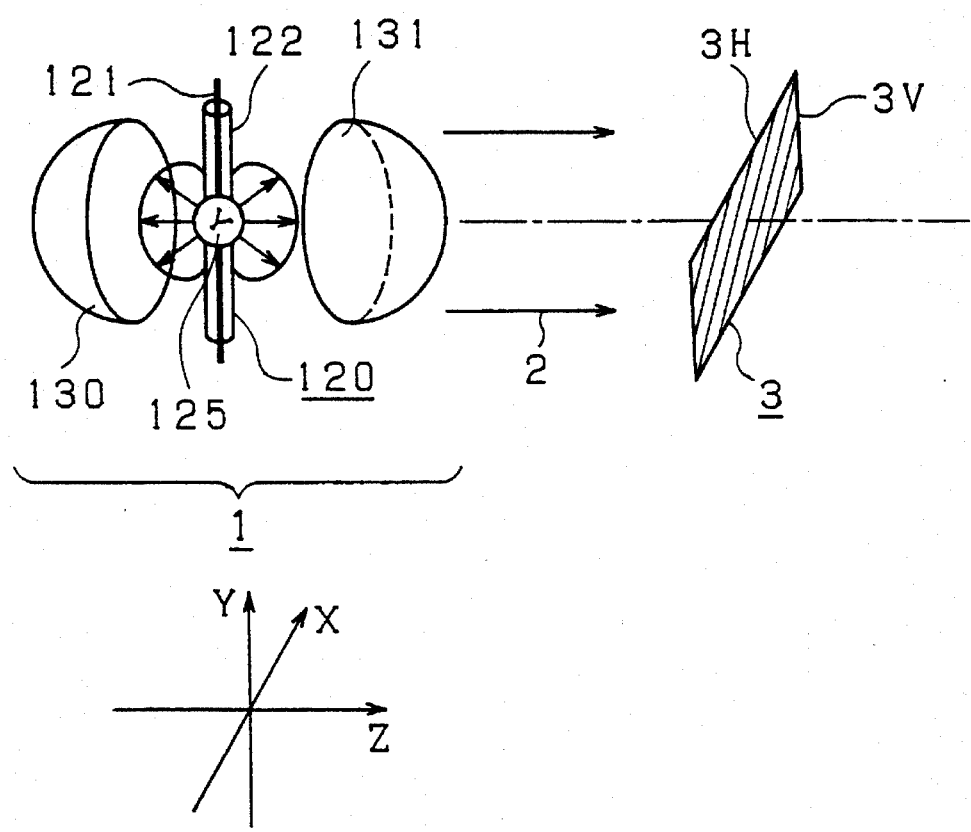
FIG. 17 is a diagram showing an arrangement of a discharge lamp relative to a liquid-crystal panel, for reducing the unevenness in projected image brightness.

The reference numeral 3 indicates a liquid-crystal panel display screen in the projection display apparatus. In FIG. 17, only one screen is shown for simplicity of explanation. The reference signs 3H and 3V designate the longer and shorter sides, respectively, of the rectangular screen 3. The designation (X, Y, Z) shows a rectangular coordinate system wherein Z indicates the direction of the optical axis and X and Y indicate the extending directions of the longer side 3H and the shorter side 3V, respectively. By aligning the electrode 121 and the shorter sides 3V with the direction of Y, the direction (the direction defined by $\theta$ in FIG. 16) in which unevenness is caused in the luminous intensity because of the light distribution characteristic of the lamp 120 can be aligned with the extending direction of the shorter sides of the screen 3. As a result, unevenness of brightness is reduced along the direction of the longer sides of the screen 3 which direction corresponds to the direction defined by ψ through which the luminous intensity is substantially constant. This reduces the unevenness of projected image brightness.

Conversely, if the electrode 121 is aligned with the direction of the longer sides 3H (direction of X), the direction defined by θ that causes a greater variation in the luminous intensity will become aligned with the direction of the longer sides 3H; in this case, unevenness of illuminance of the liquid-crystal panel 3, and hence unevenness of projected image brightness, will increase as compared to the above-described optimum arrangement. Furthermore, the posture of the lamp 120 about the electrode 121 should preferably be set in such a manner that the exhaust vent 125 is situated in the direction of X (or −X). This arrangement is useful in minimizing the decrease in luminance due to the presence of the exhaust vent 125, and thus contributes to reducing unevenness in the projected image brightness.

The above embodiment has been described taking as an example the case in which the light source apparatus of Embodiment 2 is applied to the liquid-crystal projection display apparatus. Other known uses of illumination light source apparatus of this kind are in slide projectors, microfilm reading devices, searchlights, automobile headlights, etc. It will be appreciated that the light source apparatus of Embodiment 2 can be used in any of these devices to construct a high-efficiency, low-power-consuming apparatus.

According to Embodiment 3, since the light source apparatus of Embodiment 2 is applied to the liquid-crystal projection display apparatus, the liquid-crystal panels can be illuminated with high-intensity, low-aberration light. The liquid-crystal projection display apparatus constructed with the light source apparatus of Embodiment 2, therefore, is capable of producing high-brightness images with low power consumption. Furthermore, the electrode of the discharge lamp is aligned with the extending direction of the shorter sides of the liquid-crystal panel display screen, and the lamp posture about the electrode is so determined that the exhaust vent in the burner section is situated in a direction parallel to the extending direction of the longer sides of the display screen. This arrangement serves to minimize unevenness in the luminance on the projection screen. Embodiment 4 (Condenser lens with large aperture)

Embodiment 1 disclosed a condenser lens with large aperture of NA≧0.9 formed from a glass material having a relatively high refractive index (n>1.7). However, as a result of experiments conducted by the inventors, it was found that the lens may crack depending on cooling conditions if the light source apparatus is constructed using a discharge lamp of large power (more than 200 W). To avoid this problem, a lens was designed using a glass material (Corning 7740) having good heat resistance. Since this glass material has a low refractive index, i.e. 1.47, for the d line, it is much more difficult to achieve NA≧0.9 than the material used in Embodiment 1. Notwithstanding the difficulty, we found conditions that can achieve an increased aperture. Furthermore, since the Abbe number of the glass material of this embodiment is 1.6 to 2.6 times greater than that of the material of Embodiment 1, the axial chromatic aberration is smaller because of the governing principle, so that color deviation of the illumination light can be reduced.

In Embodiment 4, the following requirement (e) is also considered in addition to the requirements (a) to (d) given in Embodiment 1.

(e) The lens material must have good heat resistance, and the lens must not crack even if it is mounted in close proximity to the discharge lamp that is heated to high temperature when producing light.

The condenser lens of Embodiment 4 assumes as an example of its application the liquid-crystal projection display apparatus described in connection with the prior art. The present embodiment will be explained by giving examples of numerical values, assuming that the arc length of the discharge lamp is 1 to 5 mm and the illumination beam diameter is 91 to 94 mm (or 48 to 51 mm). The lens described below has an NA of 0.9 or larger, but it will be appreciated that the NA can be easily reduced at will by using a known diaphragm or the like.

Figure 18:
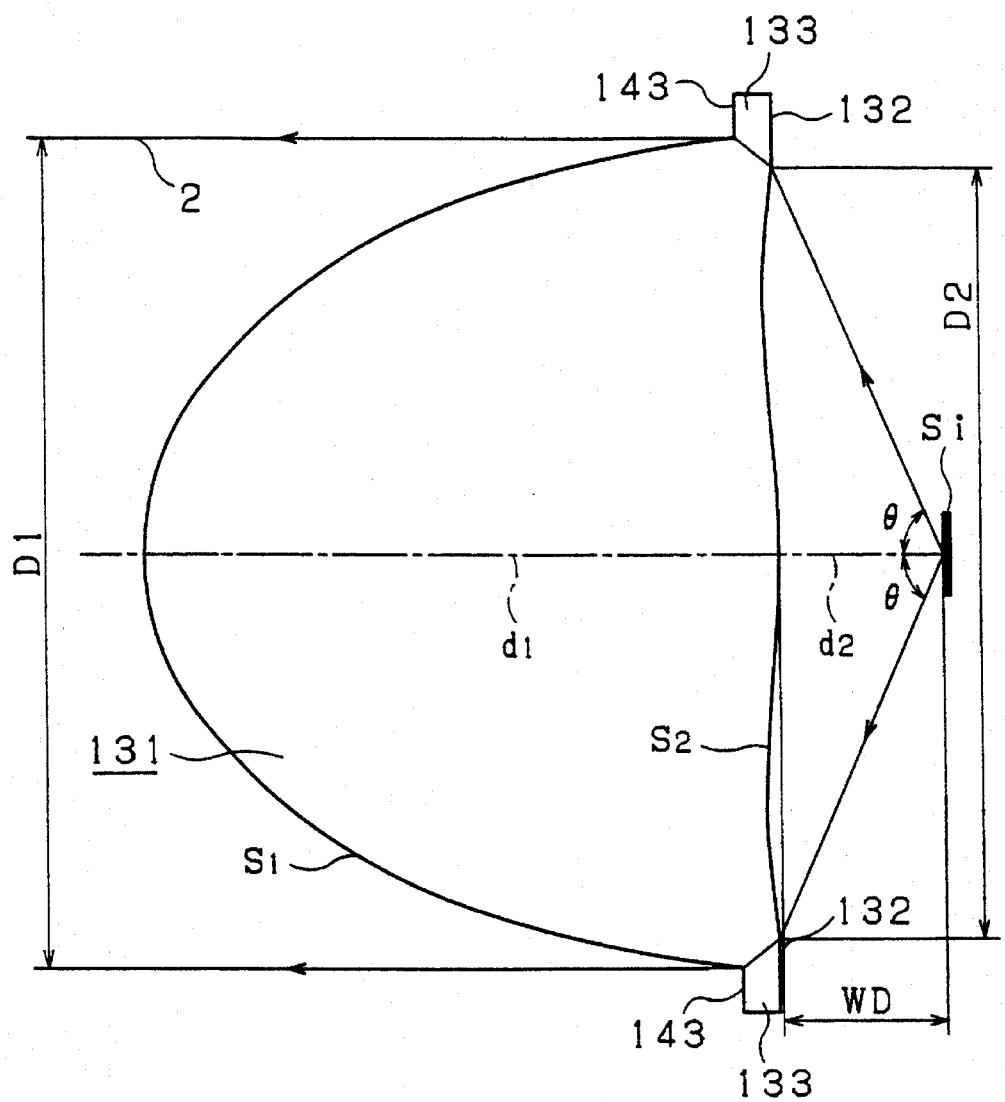
FIG. 18 is a cross sectional view of a condenser lens according to the invention.

The condenser lens of the present embodiment will now be described with reference to pertinent drawings. FIGS. 18, 20, 22, and 24 are cross-sectional views of lenses corresponding to Examples 1, 4, 6, and 7 of Embodiment 4 which will be described hereinafter. FIG. 18 also contains various signs necessary for the explanation of this embodiment. The various signs shown in FIG. 18 are the same as those shown in FIG. 4 (Embodiment 1), except that WD in FIG. 18 indicates the axial distance (work distance) from the most projecting point of the second surface S2 on the smaller conjugate side to the arc Si. The numerical aperture (NA) is defined by the same equation (1) as given in Embodiment 1.

The first surface S1 is of aspherical form having a convex curvature, while the second surface S2 is also of aspherical form having a concave curvature on the outermost circular zone thereof. As an alternative lens configuration, the outermost circular zone may be formed convex, but it should be appreciated that the outermost circular zone of concave form has the effect of reducing the angle of incidence of the rays entering the same of the surface S2, which produces increased transmittance and thus enhances the efficiency. As shown in the examples using specific values, since the lens is formed from a material of a relatively low refractive index, the absolute value of the radius of center curvature of the second surface S2 should be approximately equal to or smaller than the radius of curvature of the first surface S1, and therefore, the center zone of the second surface S2 is formed convex.

To achieve the aforementioned requirements (a) to (c), the above-described bi-aspherical single lens configuration employed in the lens system of the present embodiment satisfies the following conditional expressions.

$$0.4 < r1/nf < 0.6 \tag{10}$$

$$-0.5 \leq r2/nf < -0.3 \tag{11}$$

$$-0.6 < K1 < -0.2 \tag{12}$$

$$-0.1 < SG2/f < 0.1 \tag{13}$$

where f:
  focal length of the entire lens system
  n: refractive index of the lens
  r1: radius of center curvature of the first surface S1
  r2: radius of center curvature of the second surface S2
  K1: conic constant of the first surface S1
  SG2: axial difference between the aspherical face of the outermost zone within the effective diameter of the second surface and the center of the second surface; the direction in which the outermost zone of the second surface S2 is curving toward the smaller conjugate side is taken as positive.

The meanings of the upper and lower limits given by the above conditional expressions will be explained below. The meanings for Expressions (10) and (12) are the same as those for Expressions (2) and (4) in Embodiment 1, and therefore, their explanation is omitted.

Referring to Expression (11), if the ratio exceeds the upper limit, the third-order spherical aberration near the axis will become negative. On the other hand, if the ratio is smaller than the lower limit, the third-order spherical aberration near the axis will become positive, and the aberration cannot be controlled by the aspherical term.

Expression (13) defines the condition that limits the ratio of the axial difference SG2 to the focal length f, the axial difference SG2 representing the distance from the outermost aspherical face within the effective diameter of the second surface S2 (facing the lamp) to the reference center of the second surface S2. If the ratio is greater than the upper limit given by Expression (13), the concave curvature at the edge of the effective diameter of the second surface S2 becomes so great that the required NA cannot be obtained. Moreover, the required work distance (WD) cannot be obtained. Conversely, if the ratio is smaller than the lower limit given by Expression (13), the converging angle can be made larger, but in turn, a large high-order spherical aberration will occur at the zonal area, which is difficult to correct.

Tables 7 to 15 show specific examples of numerical values according to Embodiment 4. The signs contained in Tables 7 to 15 are explained below.

WD: work distance (see FIG. 18)

SG2: axial difference between the aspherical edge portion of the effective diameter of the second surface and the center of the second surface.

The meanings of the other signs are the same as those explained in Embodiment 1. Also, the aspherical shape of each surface is expressed by the same expression (6) as given in Embodiment 1. SG2 is expressed by the following expression (14).

$$SG2 = Zas \qquad (14)$$

where Zas is given by the previously given expression (8).

Example 1

FIG. 18 shows a cross sectional view of a condenser lens according to Example 1 of Embodiment 4. Numerical data for Example 1 are shown in Table 7. FIG. 19 shows a spot diagram for wavelength 546.1 nm (e line) on a paraxial image plane on the smaller conjugate side, each mark "x" corresponding to one ray of light. For calculations, about 300 rays were traced. Since the spherical aberration is sufficiently corrected, it can be seen that a spot diameter of less than 0.5 mm is obtained despite the large aperture NA=0.917 ($\theta$=66.5°). This means sufficient resolution for objects of 1 to 5 mm in size (arc length); therefore, when rays of light enter from the second surface, S2, side, a parallel beam of light 2 with low aberration close to the limit determined by the arc length can be obtained.

Example 2

Numerical data for Example 2 of Embodiment 4 are shown in Table 8.

In this example, NA is substantially the same as obtained in Example 1, but the beam diameter (D1) obtained is a little larger than that obtained in Example 1.

Example 3

Numerical data for Example 3 of Embodiment 4 are shown in Table 9.

Example 4

Figure 20:
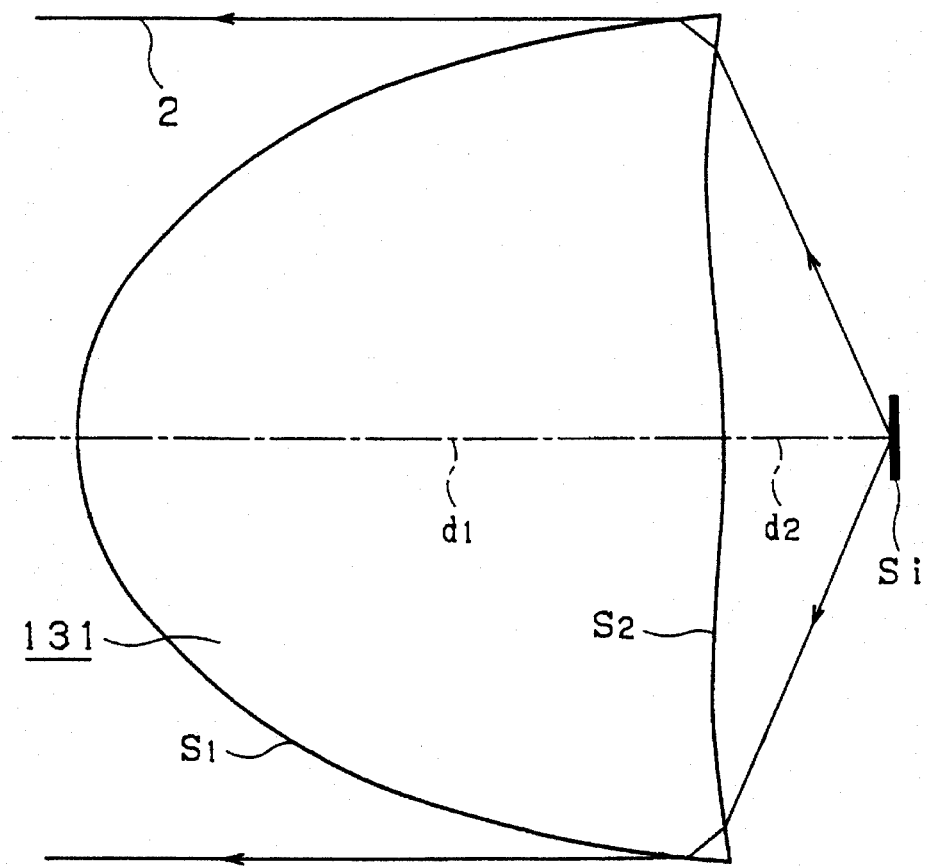
FIG. 20 is a cross sectional view of a condenser lens according to the invention.

FIG. 20 shows a cross sectional view of a condenser lens according to Example 4 of Embodiment 4. Numerical data for Example 4 are shown in Table 10. FIG. 21 shows a spot diagram for wavelength 546.1 nm (e line) on a paraxial image plane on the smaller conjugate side, each mark "x" corresponding to one ray of light. For calculations, about 300 rays were traced. Since the spherical aberration is sufficiently corrected, it can be seen that a spot diameter of about 0.05 mm is obtained despite the large aperture NA=0.917 ($\theta$=66.5°). This means sufficient resolution for objects of 1 to 5 mm in size (arc length); therefore, when rays of light enter from the second surface, S2, side, a parallel beam of light 2 with low aberration close to the limit determined by the arc length can be obtained. In this example, the focal length is shorter than that in any of Examples 1 to 3, and the beam diameter D1 is reduced to 50 mm.

Example 5

Numerical data for Example 5 of Embodiment 4 are shown in Table 11. The specifications of this example are the same as those of Example 4.

Example 6

Figure 22:
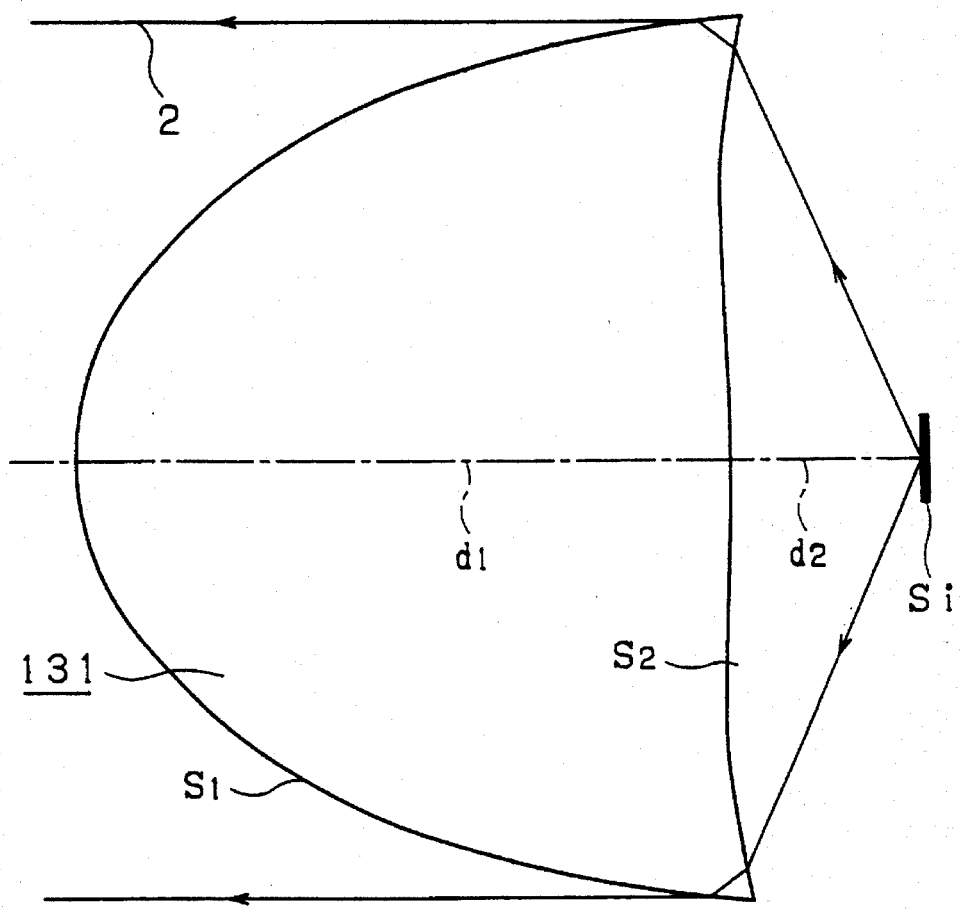
FIG. 22 is a cross sectional view of a condenser lens according to the invention.
Figure 23:
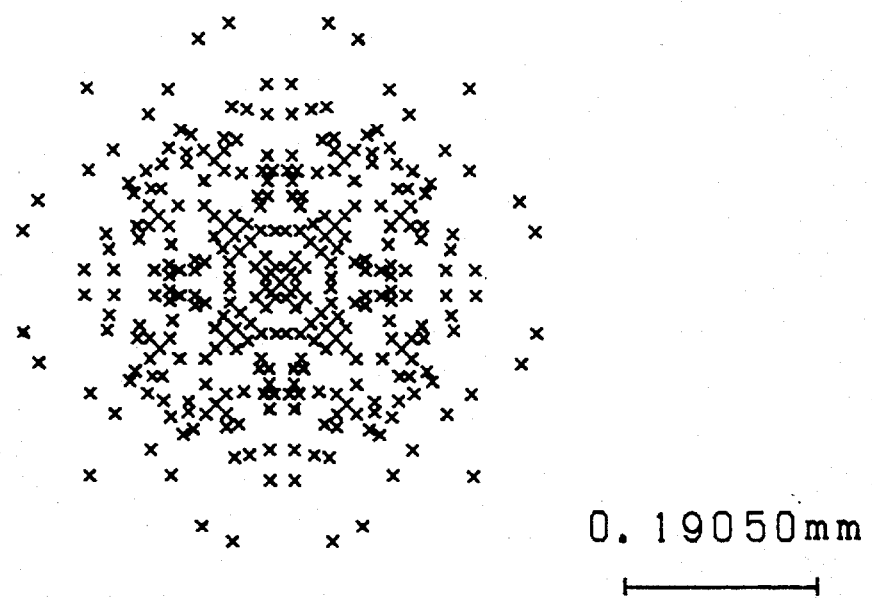
FIG. 23 is a spot diagram for a condenser lens of the invention as viewed on the smaller conjugate side thereof.

FIG. 22 shows a cross sectional view of a condenser lens according to Example 6 of Embodiment 4. Numerical data for Example 6 are shown in Table 12. FIG. 23 shows a spot diagram for wavelength 546.1 nm (e line) on a paraxial image plane on the smaller conjugate side, each mark "x" corresponding to one ray of light. For calculations, about 300 rays were traced. Since the spherical aberration is sufficiently corrected, it can be seen that a spot diameter of about 0.4 mm is obtained despite the large aperture NA=0.908 ($\theta$=65.2°). This means sufficient resolution for objects of 1 to 5 mm in size (arc length); therefore, when rays of light enter from the second surface S2 side, a parallel beam of light 2 with low aberration close to the limit determined by the arc length can be obtained.

Example 7

Figure 24:
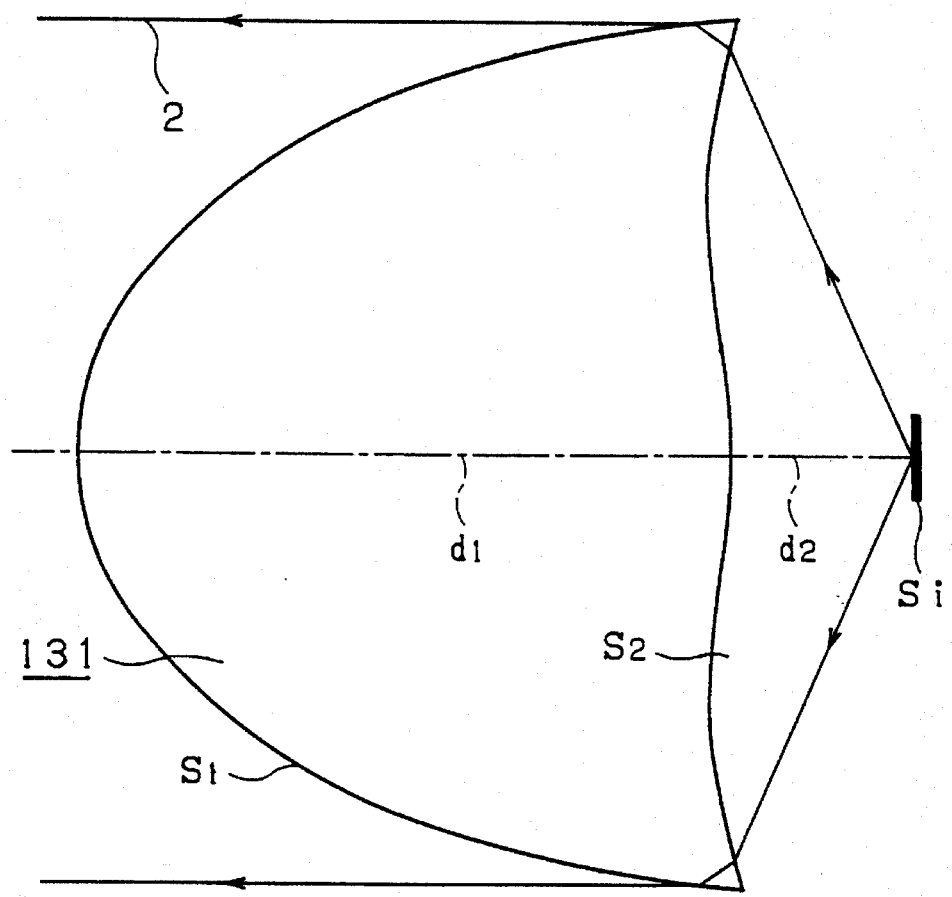
FIG. 24 is a cross sectional view of a condenser lens according to the invention.
Figure 25A:
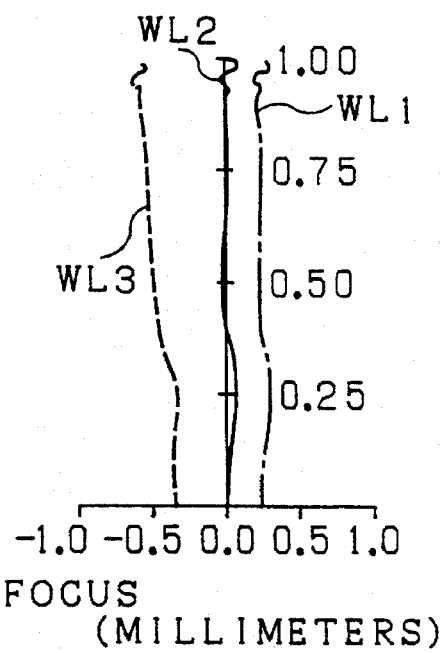
FIG. 25 is a diagram illustrating aberrations of a condenser lens of the invention as viewed on the smaller conjugate side thereof.
Figure 25B:
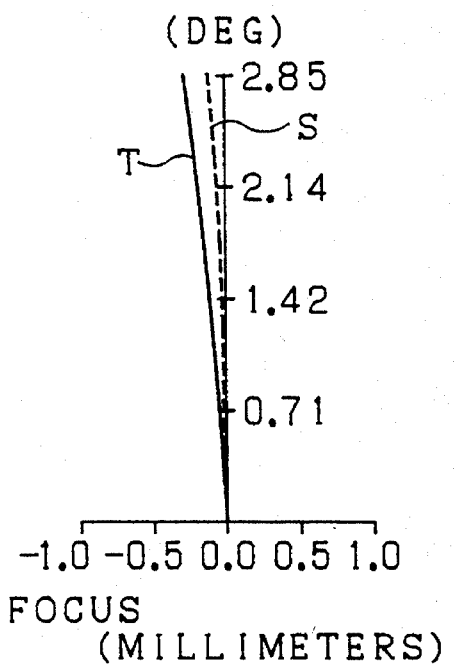
Figure 27A:
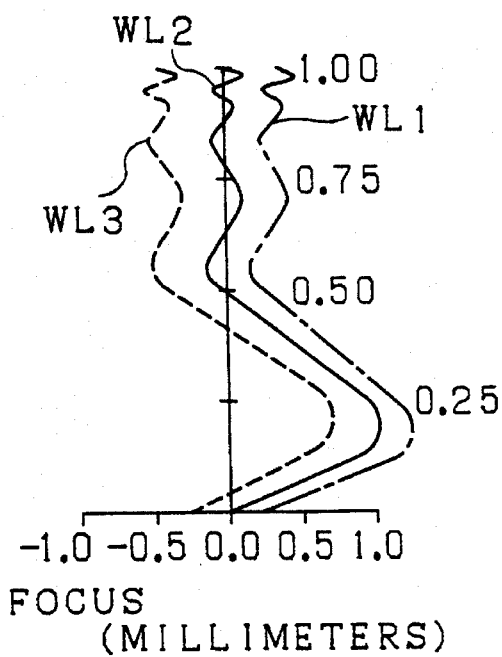
FIG. 27 is a diagram illustrating aberrations of a condenser lens of the invention as viewed on the smaller conjugate side thereof.
Figure 27B:
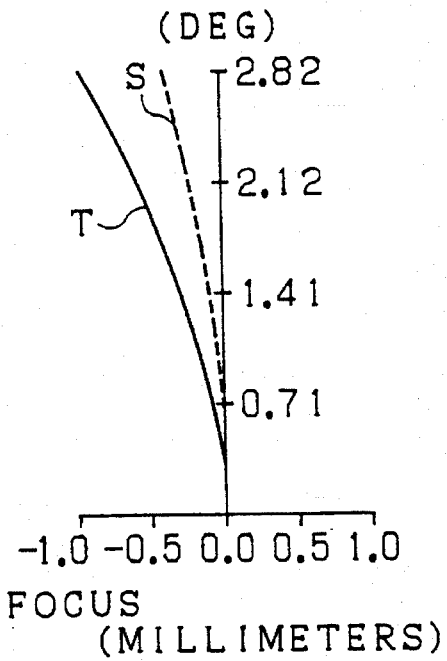
Figure 28A:
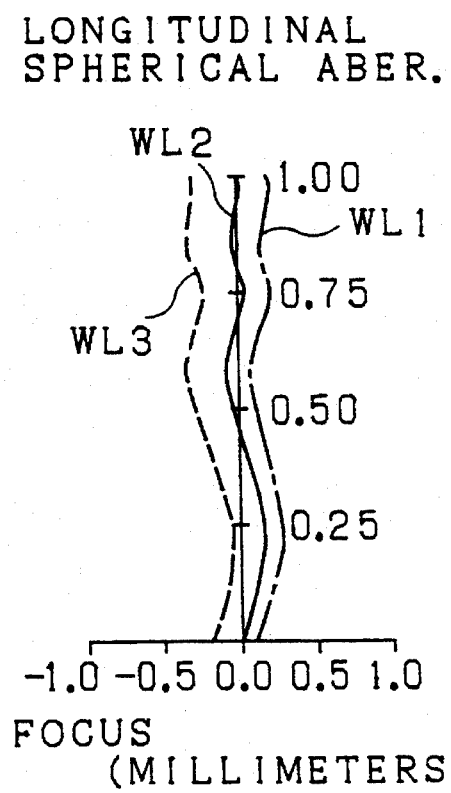
FIG. 28 is a diagram illustrating aberrations of a condenser lens of the invention as viewed on the smaller conjugate side thereof.
Figure 28B:
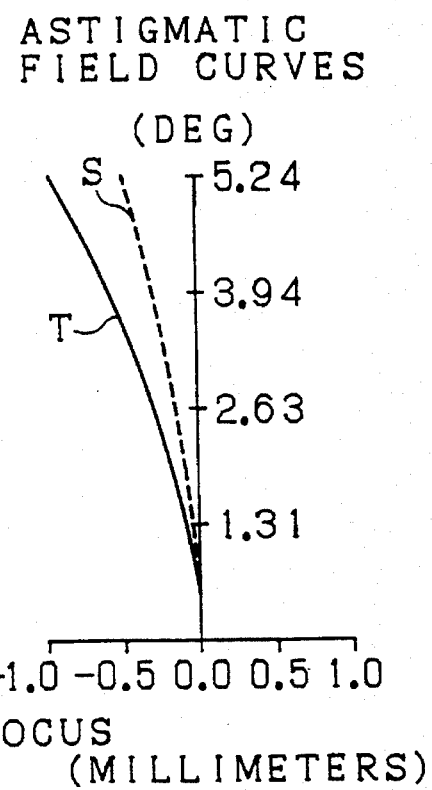
Figure 29A:
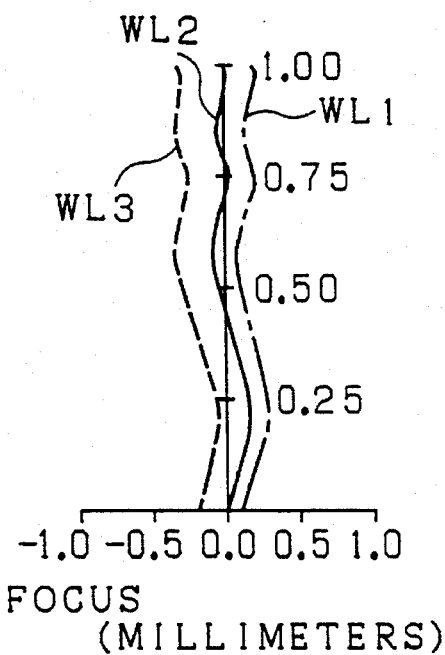
FIG. 29 is a diagram illustrating aberrations of a condenser lens of the invention as viewed on the smaller conjugate side thereof.
Figure 29B:
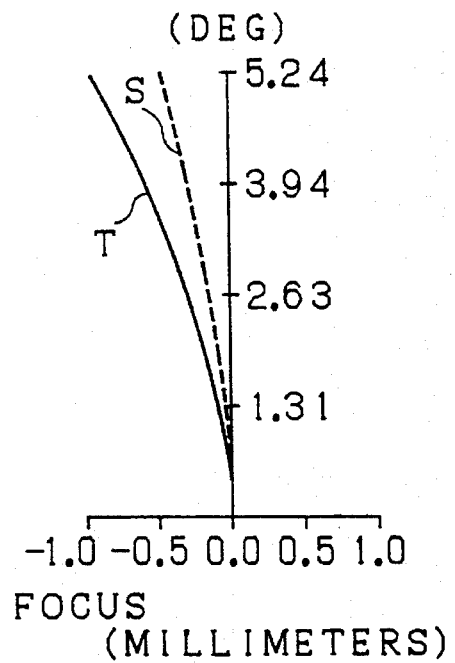
Figure 30A:
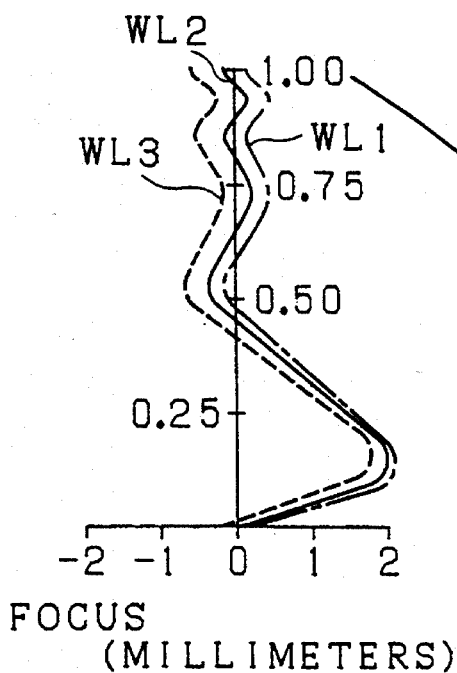
FIG. 30 is a diagram illustrating aberrations of a condenser lens of the invention as viewed on the smaller conjugate side thereof.
Figure 30B:
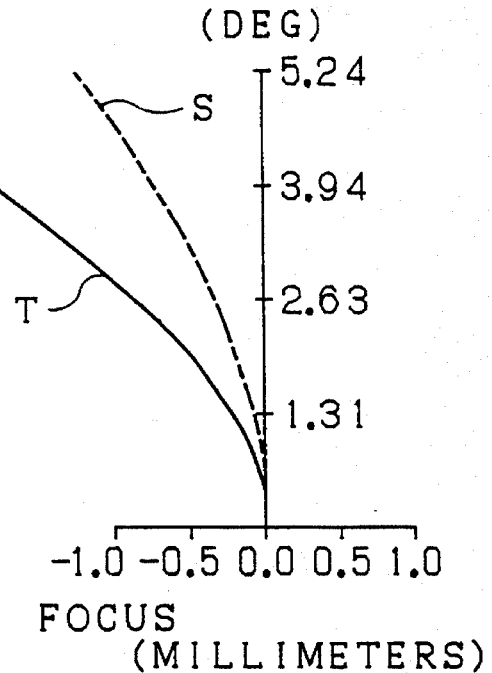
Figure 31A:
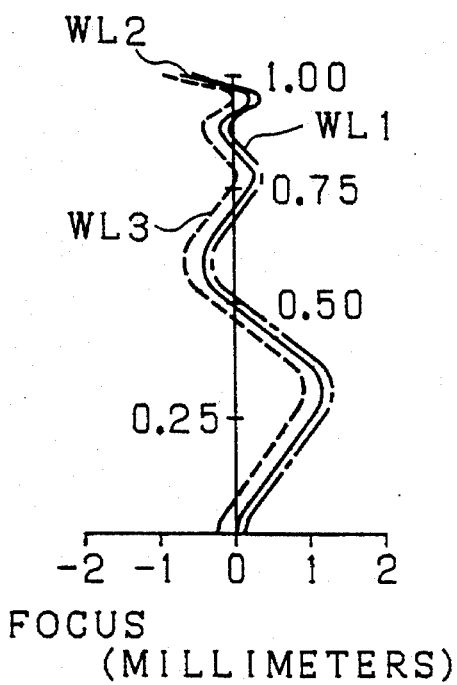
FIG. 31 is a diagram illustrating aberrations of a condenser lens of the invention as viewed on the smaller conjugate side thereof.
Figure 31B:
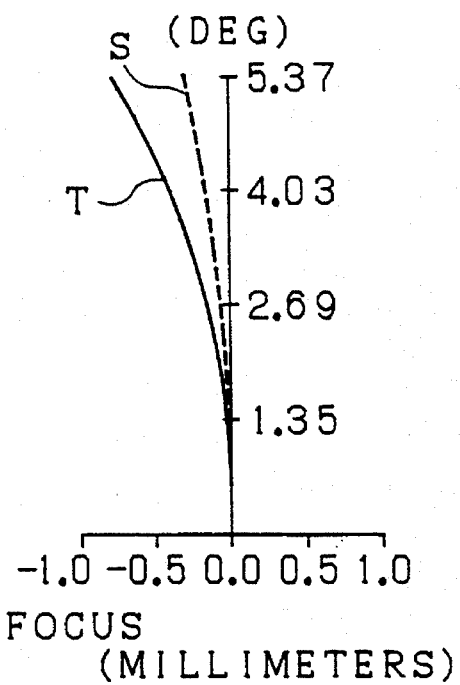
Figure 32A:
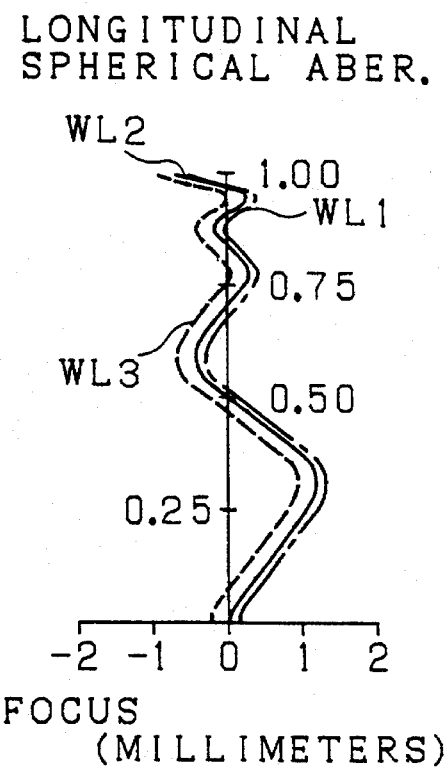
FIG. 32 is a diagram illustrating aberrations of a condenser lens of the invention as viewed on the smaller conjugate side thereof.
Figure 32B:
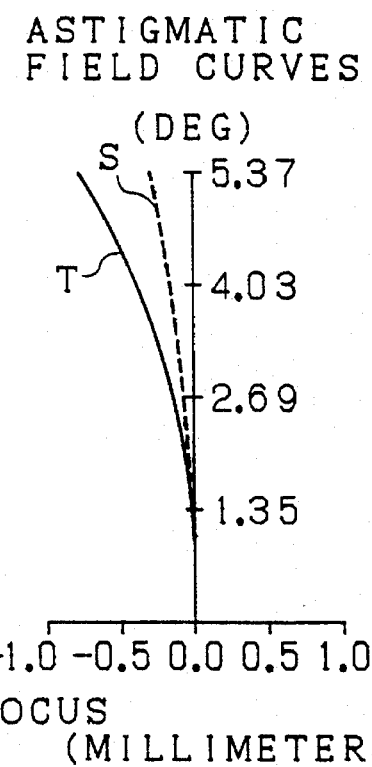
Figure 33A:
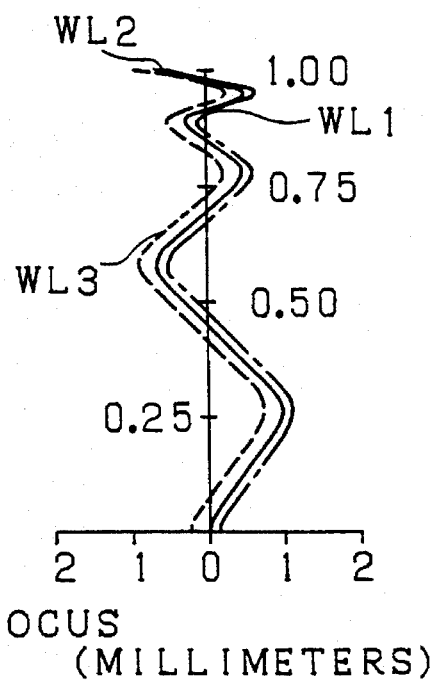
FIG. 33 is a diagram illustrating aberrations of a condenser lens of the invention as viewed on the smaller conjugate side thereof.
Figure 33B:
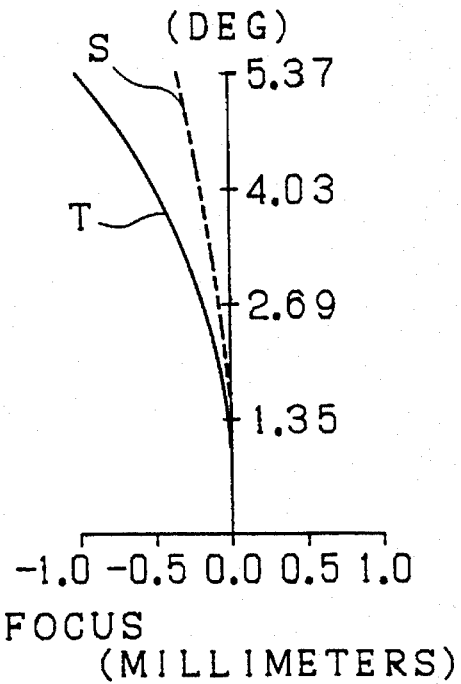

FIG. 24 shows a cross sectional view of a condenser lens according to Example 7 of Embodiment 4. Numerical data for Example 7 are shown in Table 13. In this example, SG2 shows a large positive value as compared with that in any of Examples 1 to 6, which means that the outermost zone of the second surface S2 is projecting toward the image plane side, as shown in FIG. 24.

Example 8

Numerical data for Example 8 of Embodiment 4 are shown in Table 14. The specifications of this example are approximately the same as those of Example 7.

Example 9

Numerical data for Example 9 of Embodiment 4 are shown in Table 15. As can be seen, in this example, a larger work distance WD is obtained than any of Examples 4 to 8 of similar specifications.

FIGS. 25 to 33 are diagrams illustrating aberrations on the paraxial image plane on the smaller conjugate side for Examples 1 to 9, respectively, of Embodiment 4. Each figure shows spherical aberration for three wavelengths (WL1=610 nm, WL2=546.1 nm, WL3=470 nm) and astigmatism for wave-length 546.1 nm (e line). The astigmatism was calculated based on the maximum image height of 2.5 mm, assuming the use of a lamp of 5 mm arc length. The spherical aberration and astigmatism given in FIGS. 25 to 33 show sufficiently satisfactory values for practical use.

As described above, the condenser lens with large aperture according to Embodiment 4 has the following advantage in addition to the advantages (A) to (F) described in connection of Embodiment 1.

(G) Since the lens is formed using a glass material having good heat resistance and a large Abbe number, the lens can be used in combination with a large power discharge lamp without concern of cracking, and furthermore, color deviation of the illumination light can be reduced.

In FIGS. 20, 22 and 24, the flange 133 illustrated in FIG. 18 showing Example 1 is omitted, however, if the flange 133 is disposed at the outer periphery of lens as same as FIG. 18, it is needless to say that it is used as a mount for the lens.

Embodiment 5 (Light source apparatus)

Figure 34:
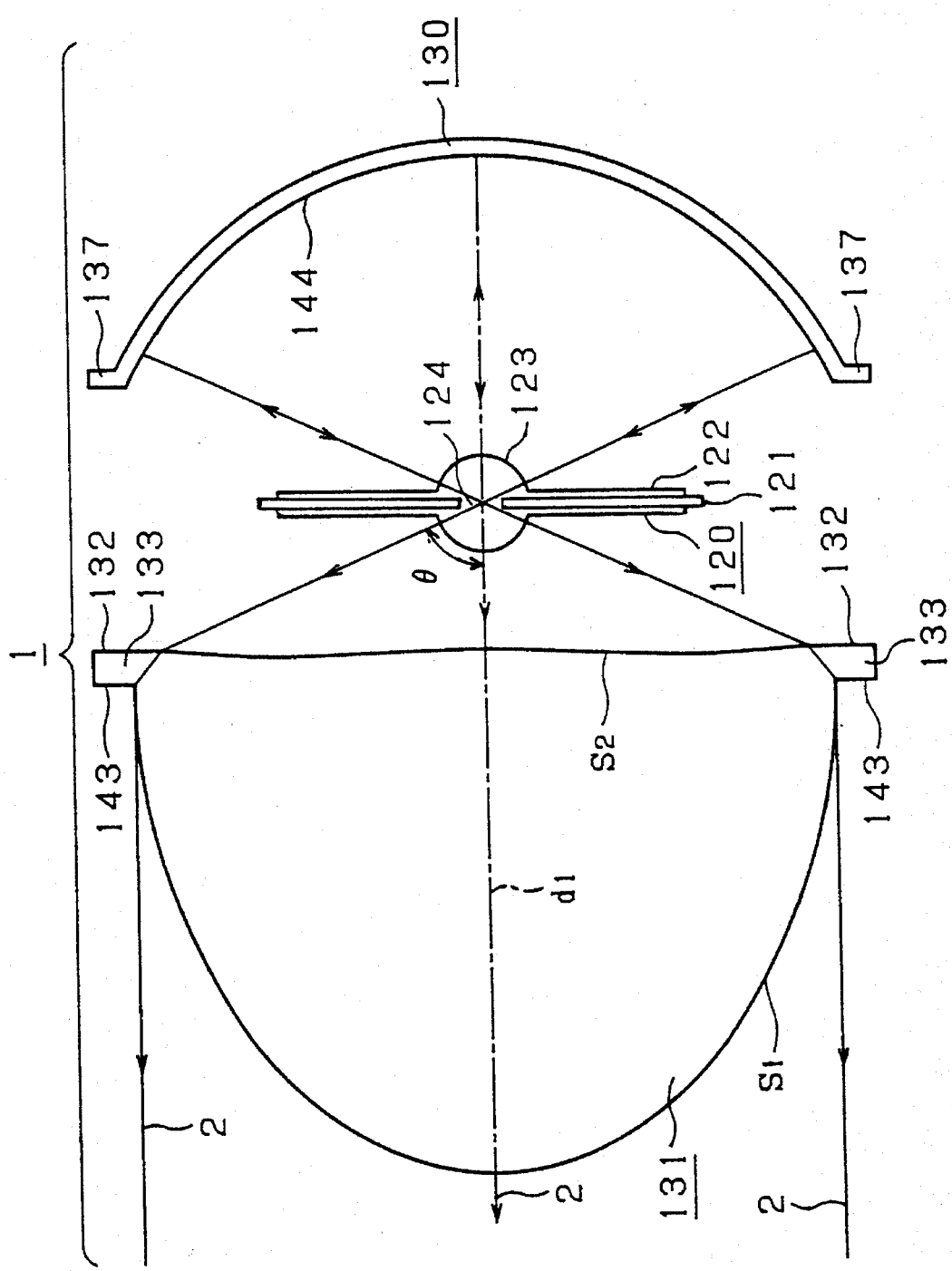
FIG. 34 is a diagram showing the construction of a light source apparatus according to the invention.

Using the condenser lens with large aperture of Embodiment 4, a compact and high-efficiency illumination light source apparatus can be constructed. Embodiment 5 is concerned with such a light source apparatus, the construction of which is shown in FIG. 34. In FIG. 34, the same parts as those shown in FIG. 13 (Embodiment 2) are designated by the same reference numerals, and their explanatory description is omitted herein. In Embodiment 5, as in Embodiment 2, the condenser lens 131 and the spherical mirror 130 are fixed in position by pressing their flanges 133 and 137 on appropriate support plates, etc. Detailed description of their mounting structure is omitted herein.

Furthermore, the operation of this embodiment is the same as that of Embodiment 2 previously described, and therefore, the operational description is not repeated herein.

In Embodiment 5, as in Embodiment 2, the radius of curvature of the concave surface 144, when used in combination with the condenser lens of Embodiment 4, should be made equal to or greater than ½ of the effective diameter D1 of the first surface of the condenser lens 131. Furthermore, as in Embodiment 2, the surfaces S1 and S2 of the condenser lens 131 should be treated, as necessary, with an antireflective coating, an ultraviolet/infrared reflective coating, or an infrared reflective coating. The same example of coating as described for Embodiment 2 also applies to Embodiment 5 when the light source apparatus of Embodiment 5 is used for the liquid-crystal projection display apparatus of FIG. 1.

The light source apparatus of Embodiment 5 provides the exactly same effects as obtained with the apparatus of Embodiment 2.

Embodiment 6 (Projection display apparatus)

Using the light source apparatus of Embodiment 5 (FIG. 34) in place of the prior art light source apparatus 1 for the liquid-crystal projection display apparatus shown in FIG. 1, high-brightness liquid-crystal projection display apparatus can be constructed. The reasons and principles that make it possible to achieve such a high-brightness liquid-crystal protection display apparatus, and an application example, etc. of the light source apparatus are exactly the same as described in the account of Embodiment 3, and therefore, their description is omitted herein.

The projection display apparatus of Embodiment 6 provides the exactly same effects as obtained with the apparatus of Embodiment 3.

Embodiment 7 (Projection display apparatus)

Figure 35:
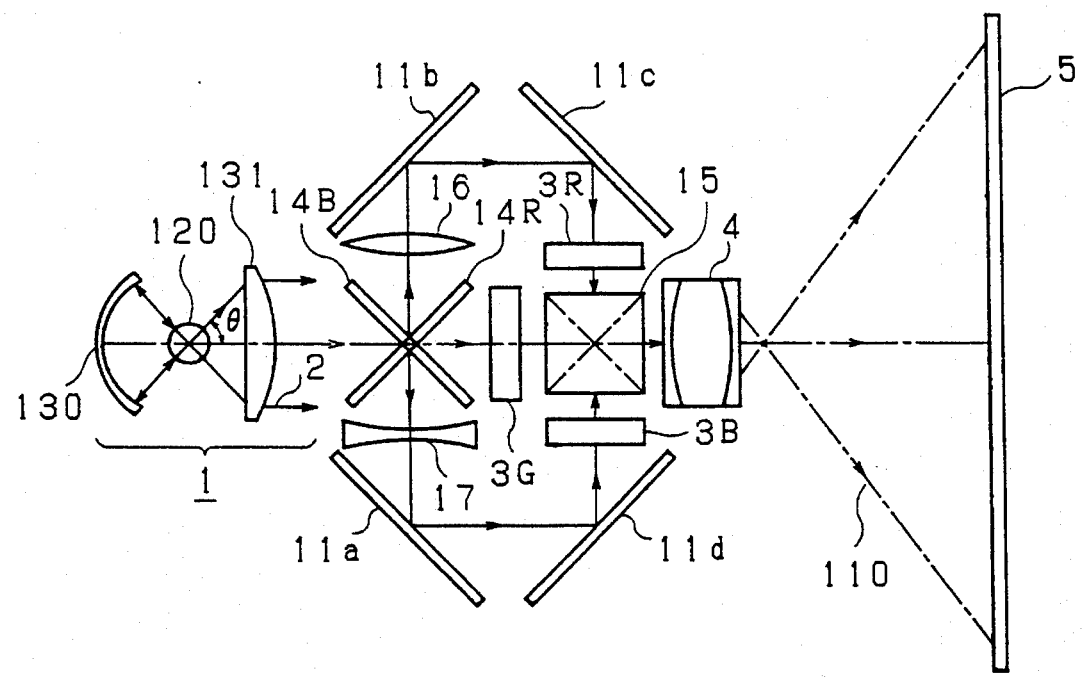
FIG. 35 is a diagram showing the construction of a projection display apparatus according to the invention.

FIG. 35 is a diagram showing the construction of a projection display apparatus according to Embodiment 7. In FIG. 35, the same parts as those shown in FIG. 1 are indicated by the same reference numerals. In the light source apparatus 1 having the lamp 120, spherical mirror 130, and condenser lens 131, when the condenser lens 131 is constructed from a single lens, the degree of collimation of the light beam 2 varies with the light wavelength, as previously described. When the condenser lens 131 is designed to provide the optimum degree of collimation for green light which lies in the central wavelength region in the visible spectrum, blue light on the shorter wavelength side will become a converging light, while on the other hand, red light on the longer wavelength side will become a diverging light, resulting in different degrees of illumination of the three liquid-crystal light valves. In Embodiment 7, after the light is separated by the dichroic mirrors 14B and 14R into the red, green, and blue lights, the diverging red light is passed through a convex lens 16 and the converging blue light passed through a concave lens 17, in order to correct the degree of collimation for the respective lights. One method of reducing the chromatic aberration will be to construct the condenser lens 131 from a material having a low refractive index dispersion (a large Abbe number). However, since materials having a low refractive index dispersion generally have a low refractive index, it is difficult to design a high-converging-efficiency lens having a large converging angle θ. Conversely, a material with a high refractive index would make it easier to design a lens having a large converging angle θ, but such a lens has a large refractive index dispersion (a small Abbe number), yields a large chromatic aberration, and therefore requires the use of high-power compensating lenses 16 and 17.

When the condenser lens described in Example 4 of Embodiment 1 is used in the light source apparatus for the projection display apparatus shown in FIG. 35, there occurs a difference of about 1 mm between the focal lengths for the blue and red lights. The blue light is a converging light that converges at a point located about 1400 mm on the emergent side of the condenser lens, while the red light is a diverging light that diverges from a converging point located about 1400 mm on the incident side of the lens. If the compensating lenses are to be installed at positions 100 mm of travel from the emergent side of the condenser lens 131, the concave lens 17 to be installed in the blue light path should have a focal length of about 1300 mm and the convex lens 16 to be installed in the red light path should have a focal length of about 1500 mm.

Since the compensating lenses are used for correction of monochromatic light, the refractive index and Abbe number of the lens material need not be particularly considered. The lenses may be constructed at low cost using a glass material of BK7 or a plastic material of polymethyl methacrylate (PMMA) or polycarbonate (PC). Furthermore, the lens form need not necessarily be spherical, but for example, Fresnel lenses may be used, in which case the size of the optical system can be reduced.

According to the projection display apparatus of Embodiment 7, the light source apparatus that produces highly efficient emergent light using a single lens is used in combination with lenses for correcting chromatic aberration, to realize a high-brightness projection display apparatus having excellent color uniformity.

Embodiment 8 (Projection display apparatus)

In Embodiment 7, since the color separating means is constructed using two crossed dichroic mirrors 14R and 14B, the above-described projection display apparatus has the problem that a shadow is formed because of the crossed structure, causing unevenness in projected image brightness.

Embodiment 8 hereinafter described uses a linear emission lamp 120 with the direction of its linear emission chosen appropriately relative to the extending direction of the intersection line. The construction of this embodiment will be described below with reference to FIG. 36. The reference numeral 120 indicates the linear emission lamp, which is a discharge lamp such as a metal halide lamp. The numeral 131 designates a condenser lens for collimating the light emitted from the lamp 120, the numerals 14R and 14B indicate dichroic mirrors, and the numeral 3 shows an image display device. For simplicity, the diagram shows only the image display device 3 situated in the path of the light transmitted through the dichroic mirrors 14B and 14R, and image display devices in other light paths, a color combining means, a projection lens, etc. are not shown. The electrode 121 is arranged along x direction so that the direction of linear emission is also in x direction. By arranging the extending direction of the intersection of the dichroic mirrors 14R and 14B in y direction perpendicular to the extending direction of the electrode, the effect of the shadow caused by the intersection can be reduced. The following describes how this can be achieved with reference to FIG. 37.

Figure 36:
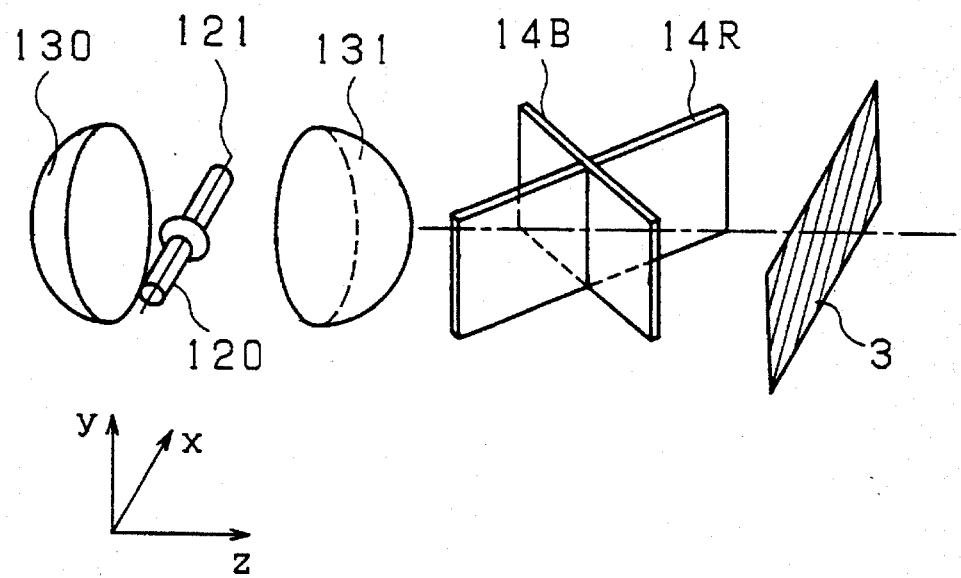
FIG. 36 is a diagram showing the construction of a projection display apparatus according to the invention.
Figure 37:
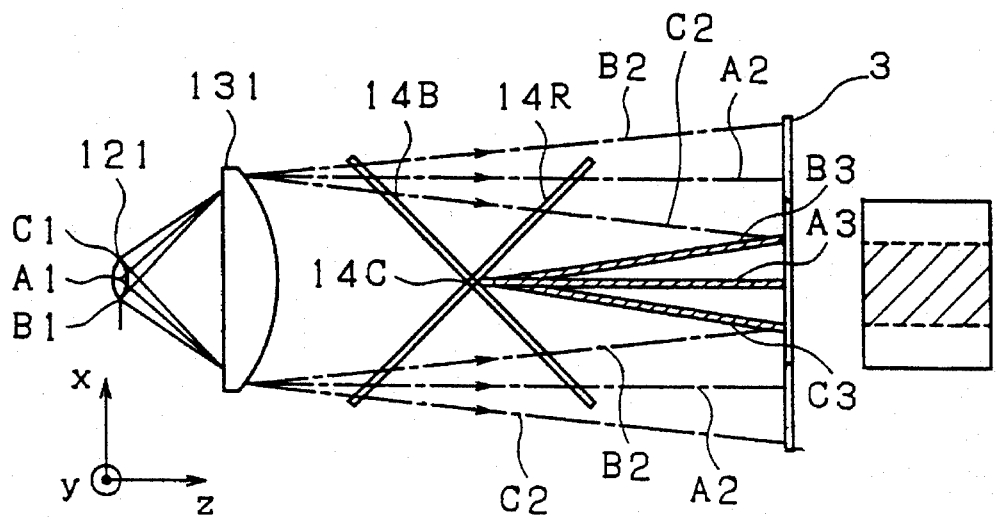
FIG. 37(*a*) is a cross sectional view for explaining the projection display apparatus of the invention.
Figure 37:
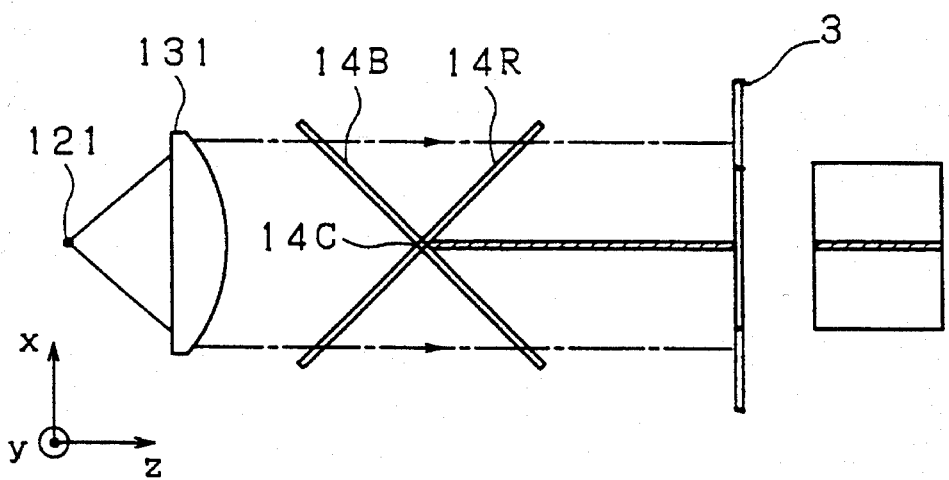

FIG. 37(*a*) shows a cross section taken along the x-z plane in FIG. 36 when the electrode 121 is arranged along x direction and the dichroic mirrors 14R and 14B are arranged with their intersection 14C aligned with y direction perpendicular to the extending direction of the electrode 121. The light emitted from the arc center A1 is collimated by the condenser lens 131 into a beam of light A2 parallel to z direction, and a shadow A3 is formed by the intersection 14C. The light emitted from a portion B1 near the electrode 121 is focused into a parallel beam of light B2 making a certain angle with z-axis, and a shadow as indicated by B3 is formed by the intersection 14C. Likewise, the light emitted from a portion C1 near the electrode 121 produces a shadow as indicated by C3. However, the respective shadows are illuminated with other beams of light, producing a blurred image on the image display device 3.

FIG. 37(*b*) shows a cross section taken along the x-z plane in FIG. 36 when the electrode 121 is arranged along y direction and the dichroic mirrors 14R and 14B are arranged with their intersection 14C aligned with the extending direction of the electrode 121. In the cross section shown, the lamp 120 is substantially a spot light source, so that the emergent light from the condenser lens 131 contains only components that are substantially parallel to z-axis. As a result, a clearly defined shadow of the intersection is projected on the image display device 3. The unevenness in the illumination on the image display device 3 results in unevenness in the projected image brightness.

According to the projection display apparatus of Embodiment 8, the color separating means is constructed using two crossed dichroic mirrors, reducing the optical path length frown the light source to the image display section, and thus achieving a high-brightness projection display apparatus. The linear emission light source is arranged along a direction perpendicular to the extending direction of the intersection of the dichroic mirrors; this arrangement serves to reduce the formation of a shadow due to the intersection and ensures uniform brightness of the projected image.

Embodiment 9 (Light source apparatus)

Figure 38A:
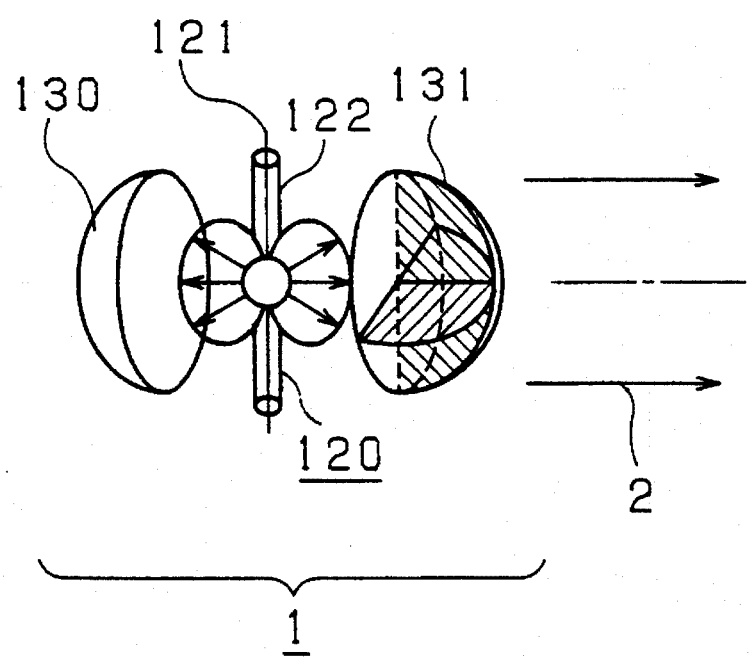
FIG. 38 is a diagram showing the construction of a light source apparatus according to the invention.
Figure 38B:
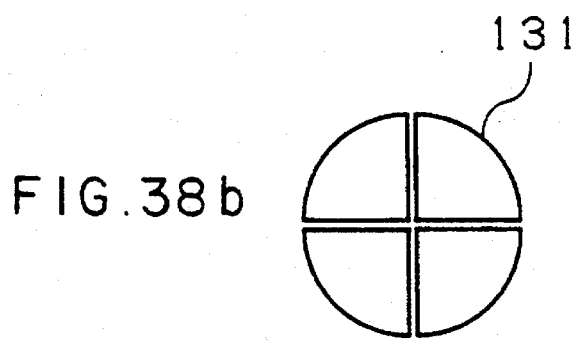

FIG. 38 is a diagram showing the construction of a light source apparatus according to Embodiment 9. Radiant heat from the lamp 120 is absorbed by the condenser lens 131 which becomes hot. Generally, the condenser lens 131 is made of glass. Since the thermal conductivity of glass is low, the condenser lens 131 is not heated uniformly but is the hottest at the incident side, the temperature becoming lower toward the emergent side. The lens is deformed because of the difference of increase in volume between the incident and emergent sides, and finally cracks when the deformation exceeds its limit. According to experiments conducted by the inventors, a crack, once caused in the condenser lens 131, does not develop further since the crack absorbs further deformation. In Embodiment 9, the condenser lens 131 is constructed from two or more separate parts combined together so that deformation caused by thermal expansion can be absorbed by the jointed surfaces between them.

It is desirable that the jointed surfaces be parallel to the optical axis (indicated by the dashed line in FIG. 38). Since incident rays on the jointed surfaces are reflected irregularly, if the jointed surfaces are not parallel to the optical axis, their shadows tend to cause uneven illumination, causing unevenness in the projected image brightness.

For the most effective result, the lens should be split along a plane or planes that pass the lens center, the thickest part of the lens where the difference in thermal expansion is the greatest. FIG. 38 shows a four-piece construction as an example, but the lens may be split into two or three parts, for example, along a plane or planes passing the lens center.

According to the light source apparatus of Embodiment 9, since the condenser lens is constructed from a plurality of separate parts combined together, the deformation of the lens caused by thermal expansion is absorbed by the jointed surfaces, thus preventing the cracking of the lens. Furthermore, since the lens is split along a plane or planes parallel to the optical axis, no shadows are formed by the jointed surfaces, so that projected images of uniform brightness can be obtained. Moreover, the greatest effect can be obtained if the lens is split along a plane or planes passing the lens center where the difference in thermal expansion is the greatest.

Embodiment 10 (Light source apparatus)

Figure 39:
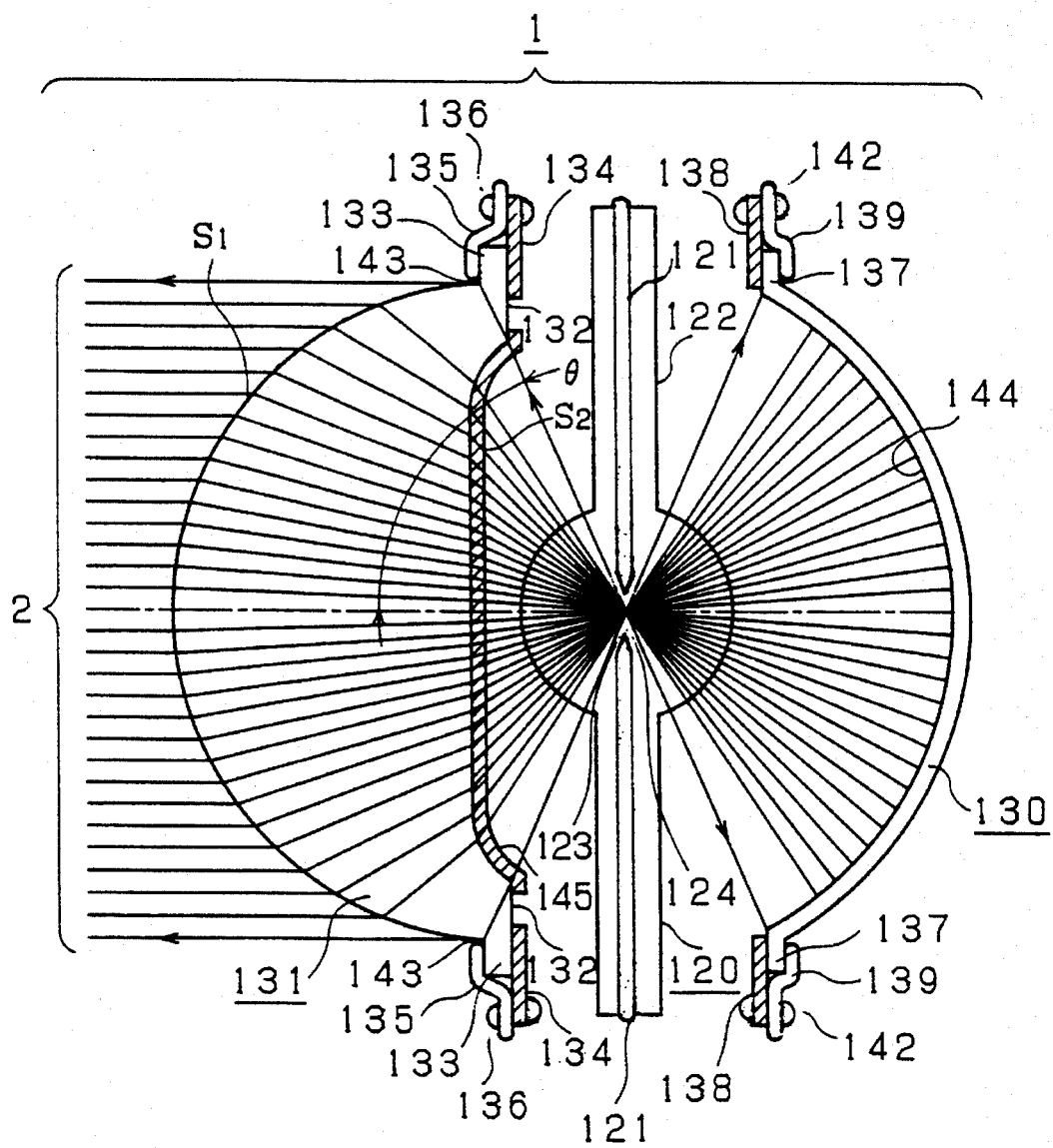
FIG. 39 is a diagram showing the construction of a light source apparatus according to the invention.

FIG. 39 is a diagram showing the construction of a light source apparatus according to Embodiment 10. In FIG. 39, the same reference numerals are used to indicate the same parts as those shown in FIG. 13. The numeral 131 indicates the condenser lens of Embodiment 1 or 4, and 145 designates a filter for removing unwanted spectral components contained in the light radiated from the lamp 120.

The operation of Embodiment 10 is the same as that of Embodiment 2, and therefore, the operational description is not repeated herein.

In Embodiment 10, as in Embodiment 2, the surfaces S1 and S2 of the condenser lens 131 should be treated, as necessary, with an antireflective coating, an ultraviolet/infrared reflective coating, or an infrared reflective coating. In FIG. 39, the filter 145, which consists of an ultraviolet/infrared reflective coating or an infrared reflective coating, is provided on the second surface S2 of the condenser lens 131. Removing infrared radiation (heat radiation) on the incident side of the condenser lens 131 is effective in preventing the cracking of the lens by thermal effects. This effect can be further enhanced if the condenser lens 131 is constructed from a plurality of parts as described in the account of Embodiment 9.

According to the light source apparatus of Embodiment 10, since a coating for reflecting infrared light or both infrared and ultraviolet lights is applied to the incident surface of the condenser lens, unwanted spectral components that cause heat can be removed, and the possibility of the condenser lens cracking due to thermal expansion is reduced. This also serves to minimize the deterioration of the liquid-crystal panels caused by unwanted spectral components.

Embodiment 11 (Polarizing element)

Example 1

Figure 40A:
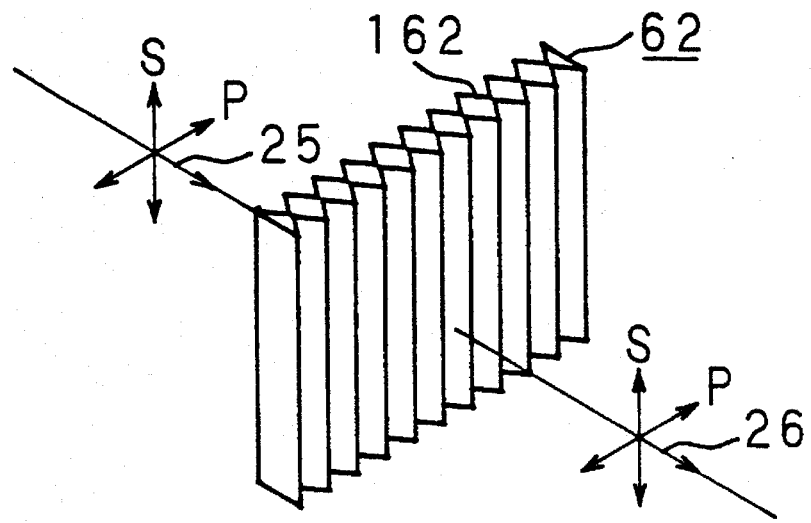
FIG. 40(*a*) is a diagram showing the structure of a polarizing element according to the invention.
Figure 40B:
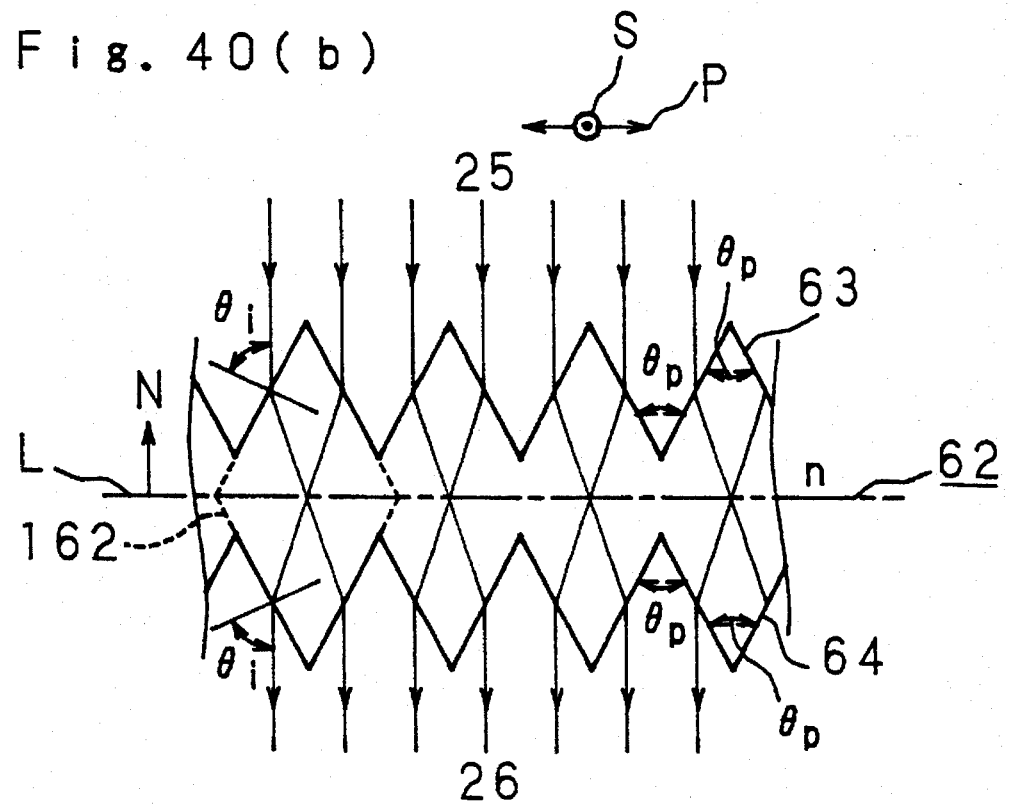

FIG. 40 shows the structure of a polarizing element according to Example 1 of Embodiment 11. The polarizing element 62 consists of a series of columnar elements 162 of rhomboidal cross section which are connected together, forming folded surfaces 63 and 64 on the incident and emergent sides, respectively, each crest (or trough) of one surface being aligned with a crest (or trough) on the other side. The dashed line L in FIG. 40(b) indicates the center line of the polarizing element 62, and N designates the normal to the center line L. The slope θ i of the oblique lines of the incident surface 63 and emergent surface 64 of the polarizing element 62 is set at the angle that allows P-polarized light to pass through with little loss while partially reflecting S-polarized light. In other words, the angle θ i is the angle of the incident and emergent planes with respect to the normal N. The incident and emergent surfaces are identical in shape, and when natural light with randomly oriented polarization enters the polarizing element 62 in parallel to the normal N, most of P-polarized light (with polarization parallel to the plane of FIG. 40(b) and directed right/left) is transmitted while S-polarized light (with polarization vertical to the plane of FIG. 40(b)) is partially reflected by the incident surface 63 and emergent surface 64. Therefore, the emergent light 26 is a partially polarized light containing more of P polarization components.

The angle of incidence at which P-polarized light is 100% transmitted is called the Brewster angle, as previously mentioned. The Brewster angle at the interface between an air layer and a substrate layer of refractive index n is given by Expression (15) below.

$$\theta i = \theta B = \tan^{-1} n \tag{15}$$

Figure 41:
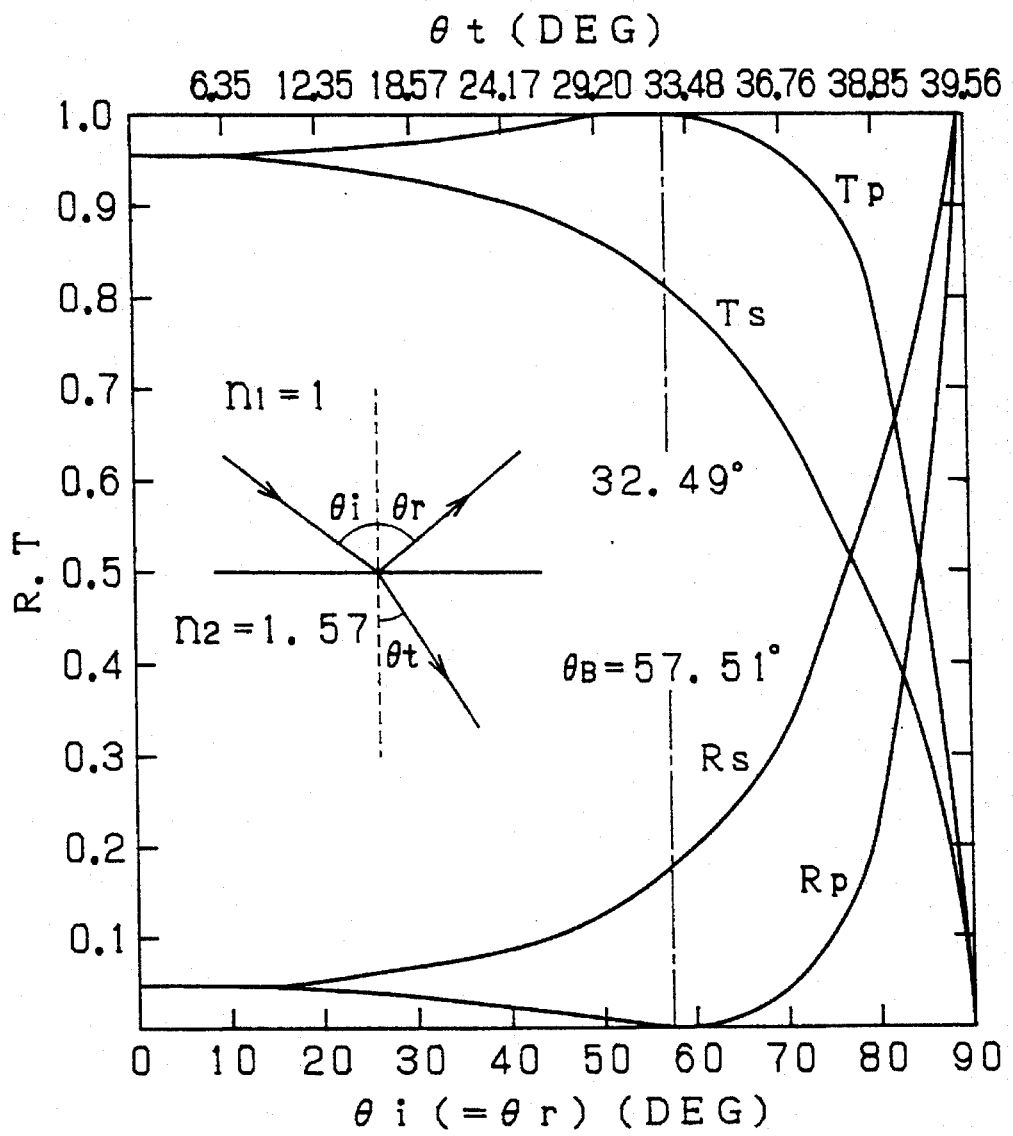
FIG. 41 is a graph plotting transmittance and reflection factor against the angle of incidence on a transparent substrate.

FIG. 41 is a graph plotting the transmittance T and reflection factor R for P-polarized and S-polarized lights against the angle of incidence on a transparent substrate of n=1.57. As-shown, when the angle of incidence is set at the Brewster angle, θB=57.51°, P-polarized light is 100% transmitted, but about 18% of S-polarized light is reflected by the interface.

Figure 42:
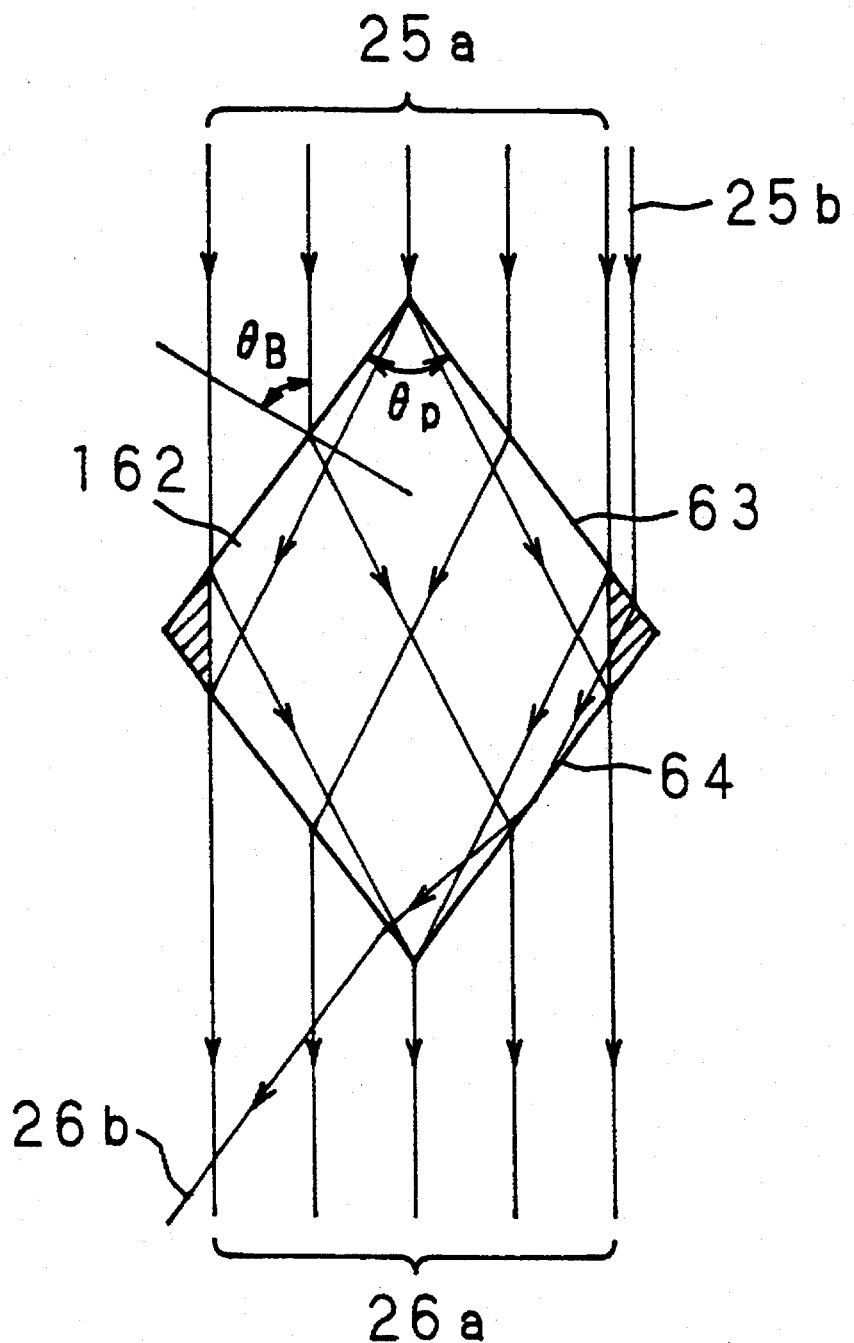
FIG. 42 is a diagram for explaining light rays passing through a columnar element, a component element of the polarizing element.

FIG. 42 is a diagram showing a beam of light passing through the rhomboidal columnar element 162, a component element of the polarizing element 62. To achieve the Brewster angle, the vertex angle θ P of the rhombus is set as given by Expression (16) below.

$$\theta P = \pi - 2\theta B \tag{16}$$

A beam of light 25a incident on the rhomboidal component element 162 is refracted by the incident surface 63 and emergent surface 64 and emerges as an emergent beam of light 26a. An incident beam of light 25b outside the beam of light 25a is transmitted through the component element 162 as shown by 26b which is an unwanted beam of light 26b. The areas indicated by oblique hatching in FIG. 42 are invalid areas as a polarizing element. The rhomboidal component elements are connected with each other by overlapping the oblique hatching areas from one element to the next. This arrangement serves to eliminate loss of light in the polarizing element 62.

Figure 43A:
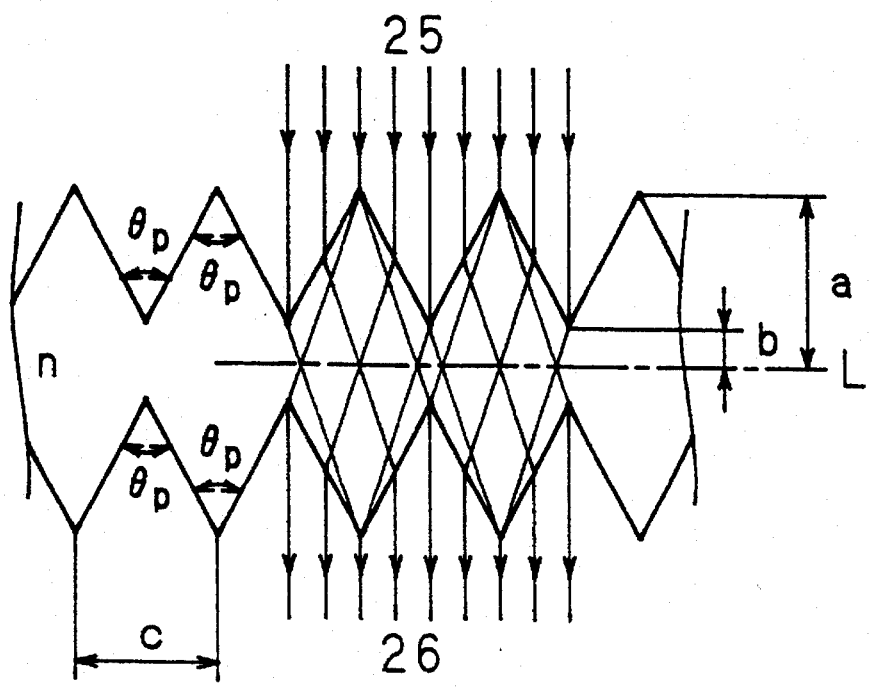
FIG. 43(*a*) is a diagram for explaining light rays passing through the polarizing element.

Next, we will describe the optimum designing of the cross sectional shape of the polarizing element 62 shown in FIG. 40(b). As shown in FIG. 43(a), when the maximum thickness, measured from the center line L, is denoted as a, the minimum thickness as b, the folding cycle of the incident surface as c, the retractive index of the material as n, and the Brewster angle determined by Expression (15) as θB, P-polarized light passes through the polarizing element without any loss if the relationship given by Expression (17) below is satisfied.

$$a : b : c = 1 : 1 + 2\cos(2\theta B) : -(4/n)\cos(2\theta B). \tag{17}$$

Figure 43B:
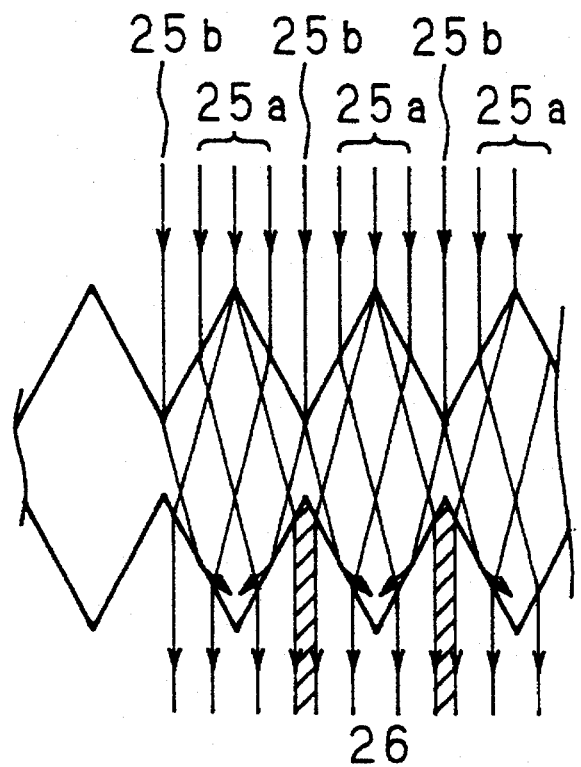

If Expression (17) is not satisfied, for example, if the thickness b is smaller than the value that satisfies Expression (17), areas will be created, as indicated by oblique hatching in FIG. 43(b), which do not transmit light; as a result, stripe-like shadows will be formed, and also, rays of light, such as those indicated at 25b, will be lost.

Figure 44:
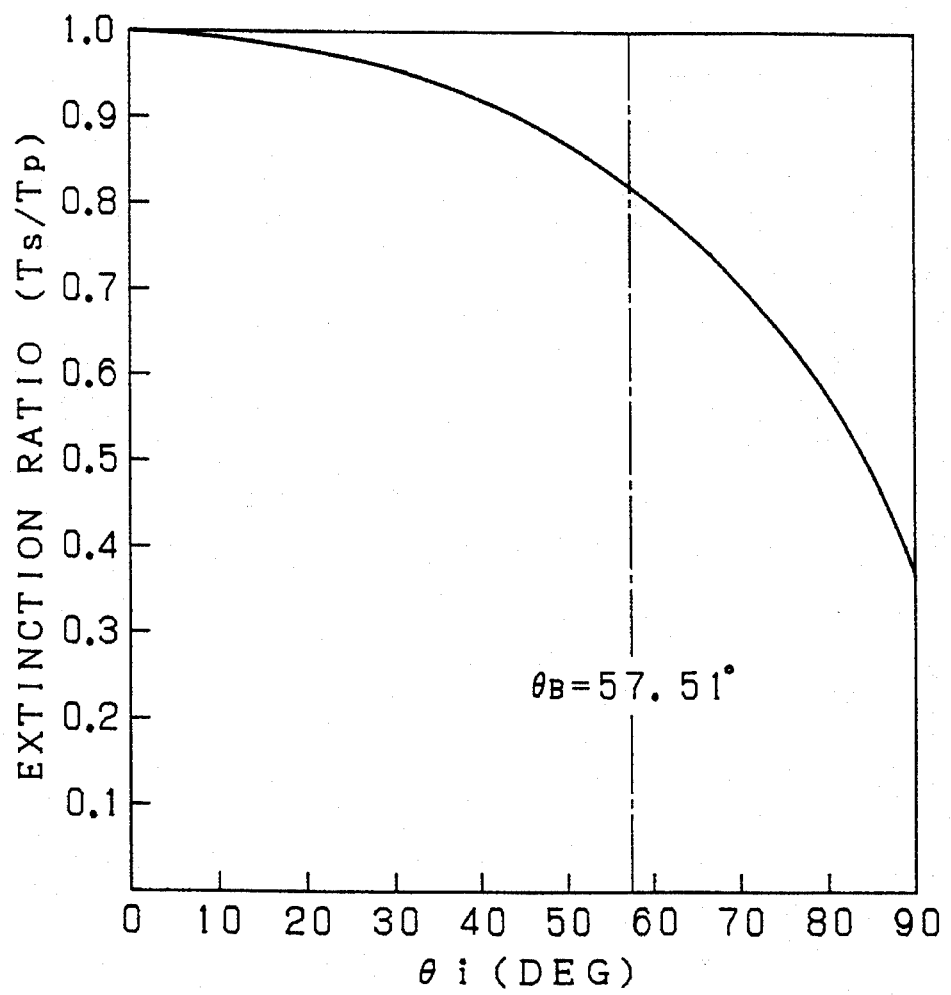
FIG. 44 is a graph plotting the extinction ratio against the angle of incidence on a transparent substrate.

In Example 1 described above, the angle of incidence θ i is set at the Brewster angle θ B, but it will be appreciated that setting the angle of incidence θ i slightly larger than the Brewster angle can increase the extinction ratio for S-polarized light. FIG. 44 is a graph plotting the transmission ratio (extinction ratio) for P-polarized and S-polarized lights against the angle of incidence on a substrate of n=1.57. For example, when the angle of incidence is set at 70°, the transmittance for P-polarized light drops 4% compared with that shown in FIG. 41, but the extinction ratio is improved by 15%. In this case, θ P is changed to 40° from the value 64.98° that was set to give the Brewster angle. Since θ P is greater than 0° as a matter of course, θ P should be set within the range defined by 0<θP≦π−2θB.

The polarizing element 62 may be made of any appropriate material as long as it is transparent to the desired light wavelength. Glass or plastic materials meet such a requirement for light in the visible spectrum. From the viewpoint of heat resistance, it will be advantageous to form the polarizer from a molded or polished glass material. On the other hand, plastic materials have the advantage that the material can be molded easily into any complicated shape. Plastic materials that have good transparency and a low absorption loss factor for light in the visible spectrum and that provide excellent optical properties include polymethyl methacrylate (PMMA), polystyrene (PS), polycarbonate (PC), etc. In cases where heat resistance is a condition because of the use of a high-intensity light source, thermoplastic resin "ARTON" (manufactured by Japan Synthetic Rubber, deflection temperature under load: 164° C.) and high heat resistant polycarbonate "Apec HT" (manufactured by Bayer, deflection temperature under load: 141 to 215° C.) are among the materials that meet such condition.

Plastic materials absorb radiation in the ultraviolet region significantly, and therefore become hot when exposed to high-intensity light rich in ultraviolet components. When a known ultraviolet/infrared cut-off filter is placed on the lamp side rather than on the incident surface, 63, side, of the polarizing element 62, thereby blocking infrared light as well as ultraviolet light, temperature rise in the material can be reduced and the thermal deformation and deterioration of the polarizing element 62 can be prevented.

Also, the polarizing element may be forcibly cooled using a known fan that delivers air for cooling. If such a fan is used in addition to the above-mentioned ultraviolet/infrared cut-off filter, the cooling effect can be further enhanced.

Example 2

Figure 45:
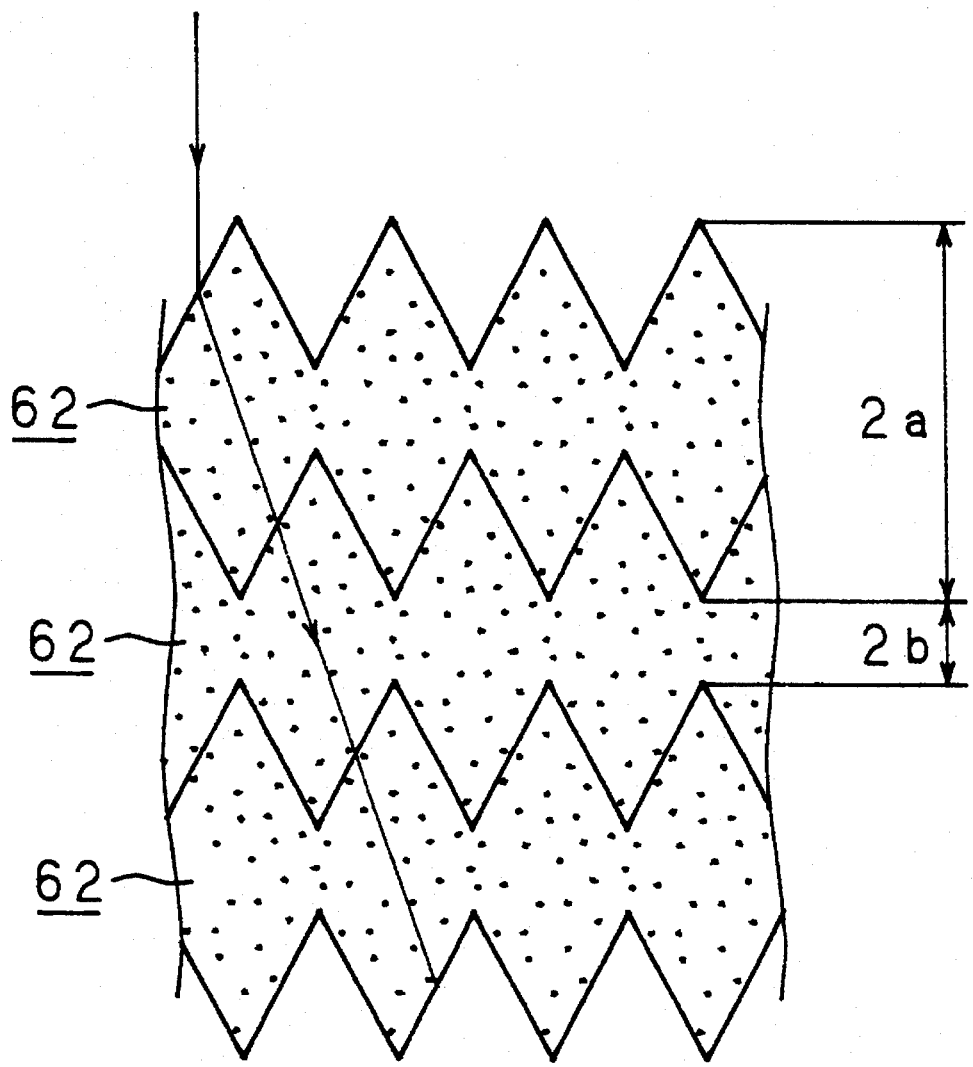
FIG. 45 is a diagram showing the structure of a polarizing element according to the invention.

FIG. 45 is a cross sectional view of a polarizing element according to Example 2 of Embodiment 11. The polarizing element of this example consists of three layers of polarizing elements stacked atop one another, each layer consisting of the same polarizing element 62 as shown in FIG. 40(*b*). This construction serves to increase the elimination ratio for unwanted polarization components (S-polarized light).

Figure 46:
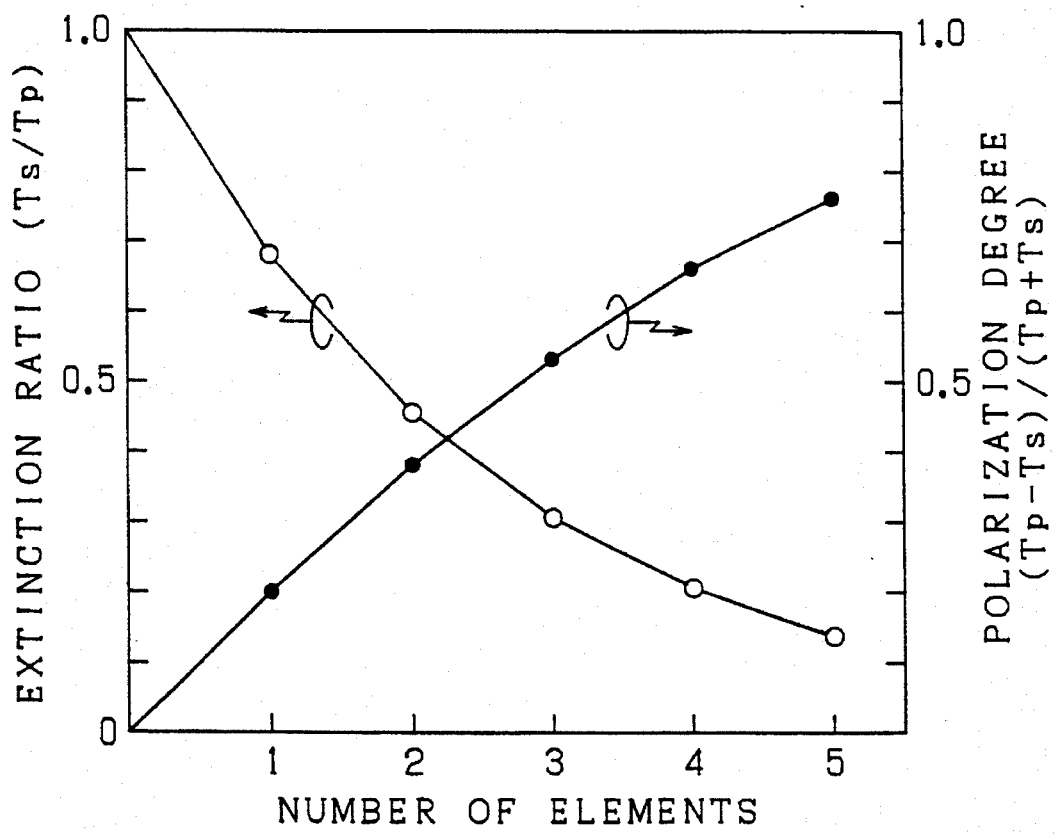
FIG. 46 is a graph showing the relationship between the number of polarizing element layers and the polarization degree.

FIG. 46 is a graph pertaining to Example 2 and showing the ratios of intensities between P-polarized and S-polarized lights in terms of the extinction ratio and the degree of polarization, the incident light being natural light. Components of S-polarized light are removed by two surfaces, i.e., the incident and emergent surfaces, as the light passes through each polarizing element 62; therefore, if five polarizing elements, each shown in Example 1 (refractive index of substrate n=1.57, angle of incidence θ =57.51°), are stacked atop one another, the intensity of S-polarized light is reduced to 15% or less as compared with that of P-polarized light. The number of polarizing elements to be stacked may be selected according to the purpose, making reference to the extinction ratio shown in FIG. 46.

Figure 3:
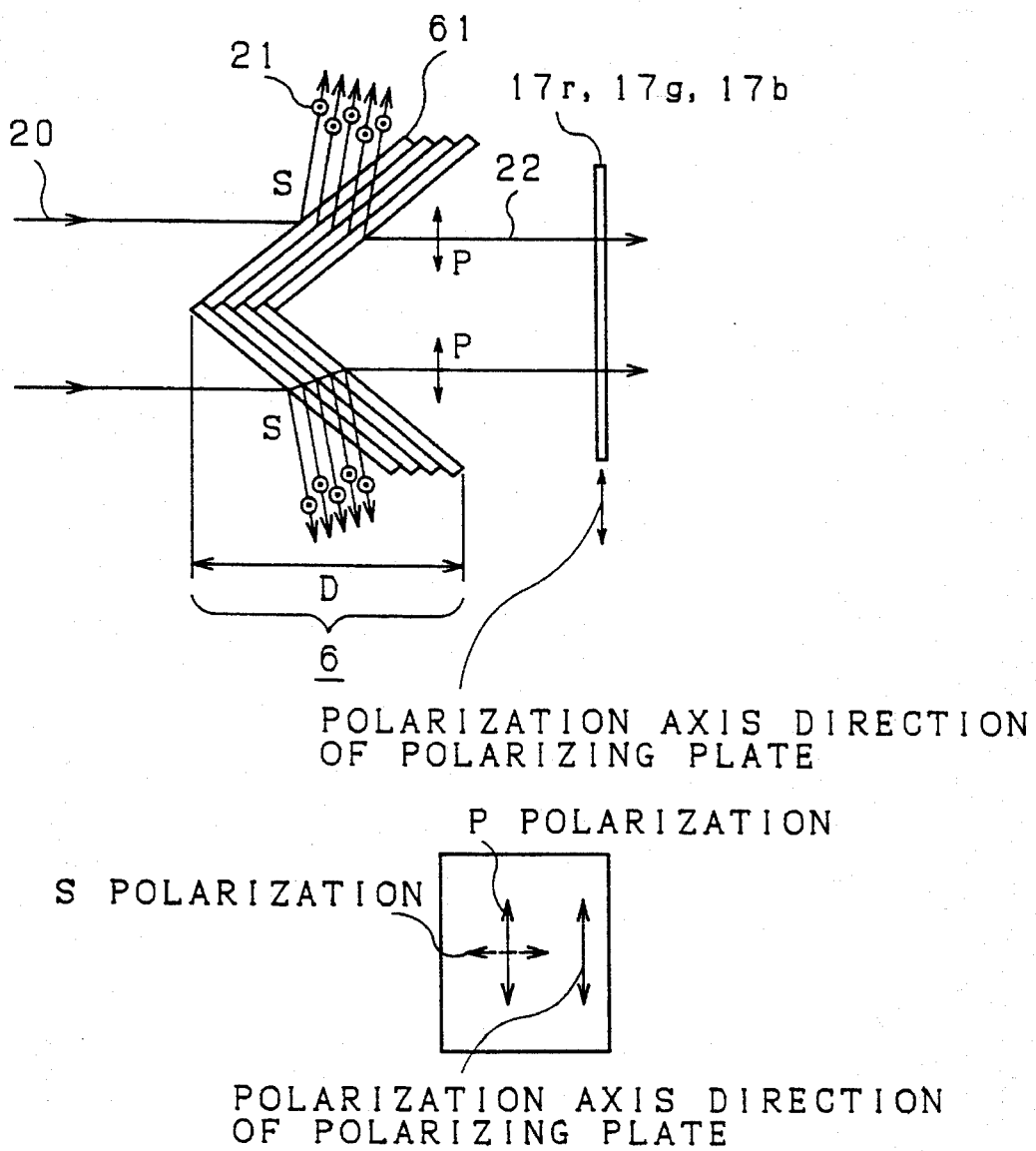
FIG. 3 is a diagram showing the structure of a prior art polarizing element.

When the thickness a of the optical element shown in Example 1 is set at 1 mm, the thickness b is given as 0.15 mm from Expression (17). Even when five such elements are stacked, the total thickness of the layered construction is only 6.6 mm. On the other hand, in FIG. 3 showing the prior art construction, if the width of the liquid-crystal light valve (or the illumination beam width) is assumed to be 40 mm, the depth D of the polarizing element 62 becomes 30.8 mm or more. From this, it can be seen that the polarizer construction of Example 2 can achieve a drastic reduction in the thickness. Furthermore, the thickness of the polarizer construction of Example 2 is independent of the width of the liquid-crystal light valve (or the illumination beam width). On the other hand, the polarizing element of the prior art increases in depth D as the width of the liquid-crystal light valve (or the illumination beam width) increases.

Example 3

Figure 47:
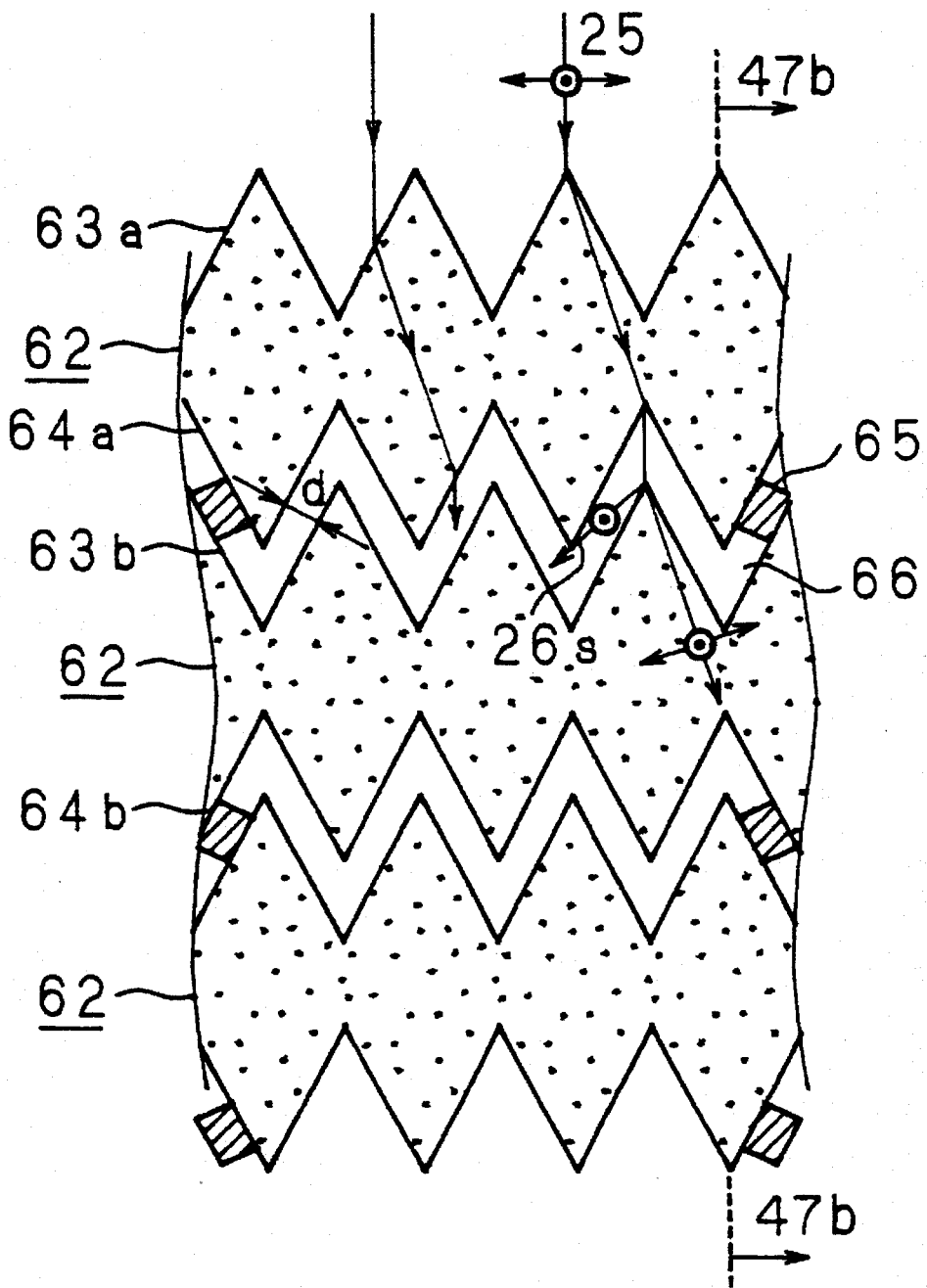
FIGS. 47(*a*) is a diagram showing the structure of a polarizing element according to the invention.
Figure 47B:
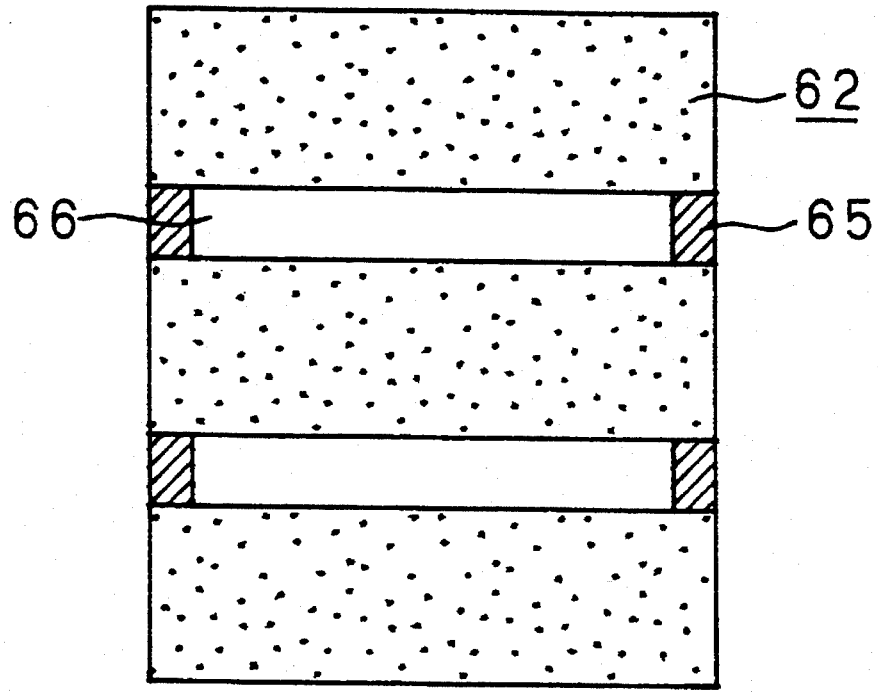

FIG. 47 shows cross sectional views illustrating Example 3 of Embodiment 11. As in Example 2, the construction consists of a plurality of polarizing elements 62 stacked atop one another, but in Example 3, spacers 65 are inserted at positions that do not block light paths, so that the polarizing elements are separated from each other by an air layer 66. If two polarizing elements 62 are placed close to each other, removed components of S-polarized light will be reflected back and forth between the two polarizing elements 62, causing some components to pass through and thus decreasing the degree of polarization. Furthermore, if the thickness of the air layer 66 is of the order of wavelength, the air layer 66 acts as an interference film, causing color tinging and color variation in the transmitted light. As shown in FIG. 47, to prevent S-polarized light 26*s* reflected and separated by the incident surface 63*b* from being reflected back by the emergent surface 64*a*, the spacers 65 to be inserted should be such as to provide a gap d of 0.32 mm or more when the polarizing elements 62 (thickness a=1 mm) of Example 2 are used.

Example 4

Figure 48:
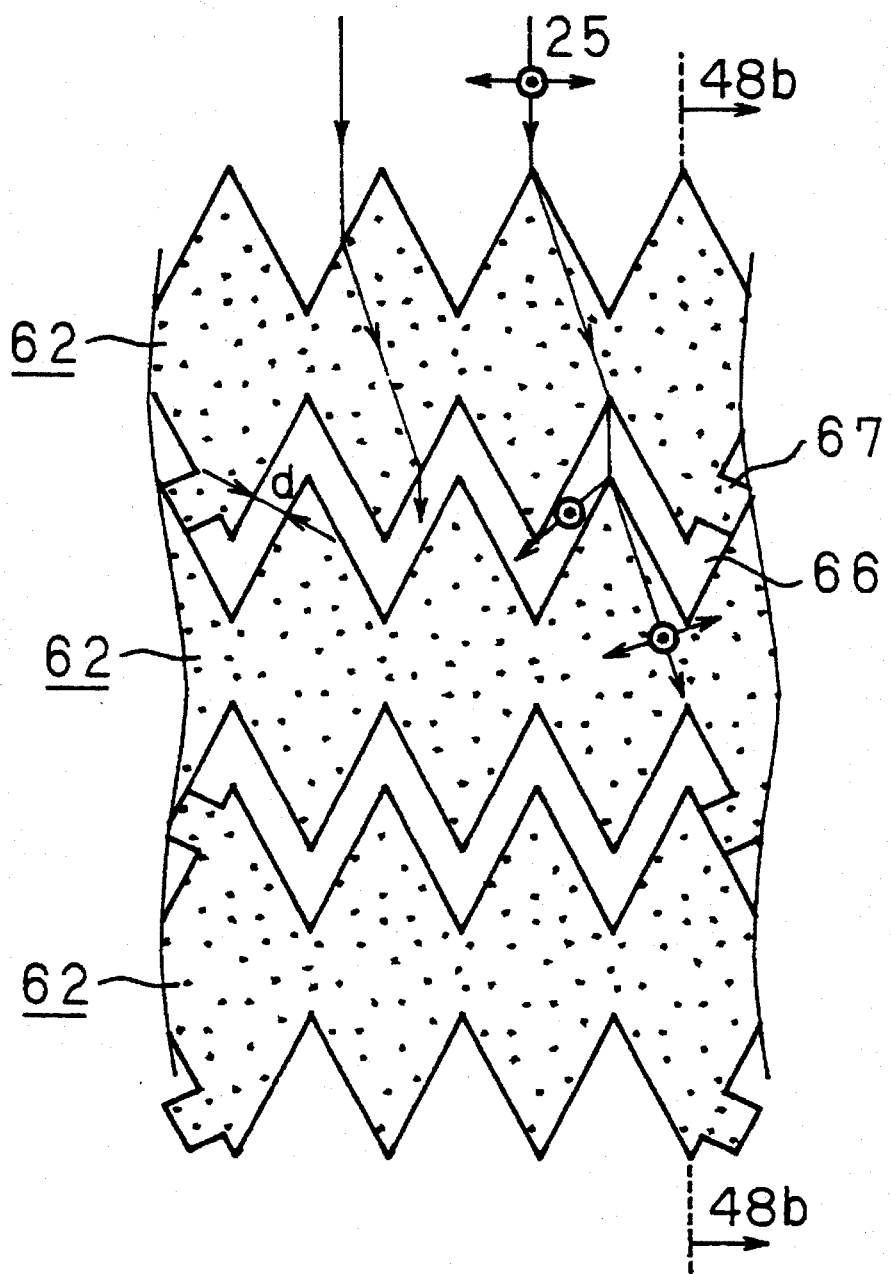
FIGS. 48(*a*) is a diagram showing the structure of a polarizing element according to the invention.
Figure 48B:
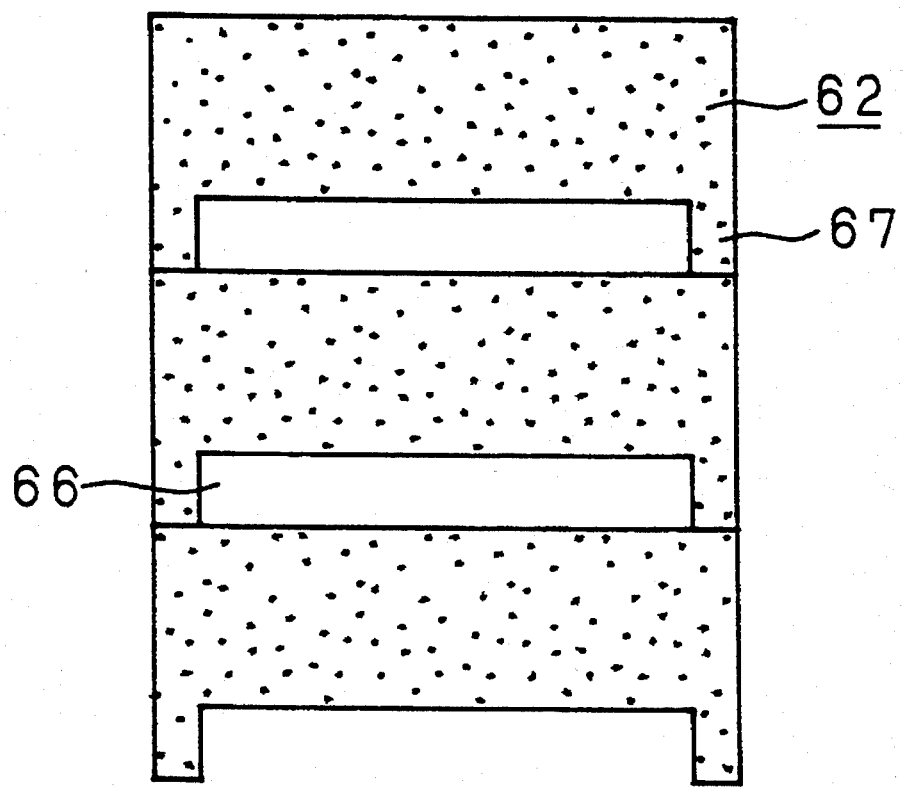

FIG. 48 shows cross sectional views illustrating Example 4 of Embodiment 11. In this example, spacers provided with projections 67 are formed integrally with the polarizing elements 62 at selected positions thereof, as contrasted with Example 3 in which separate spacers 65 are used. If plastic materials are used, the spacers 67 can be easily formed integrally with the polarizing elements 62.

Examples 3 and 4 also provide the effect that the polarizing elements can be efficiently cooled using a known fan or the like and impelling air through the air layers 66.

According to Embodiment 11, the construction is such that the front and back surfaces are formed in periodic wavelike folds, each fold forming such an angle as to allow transmission of P-polarized light with little loss. This construction serves to reduce the thickness of the optical element for converting natural light into polarized light. Furthermore, by setting the vertex angle θ P so as to make the angles of incidence and emergence equal to the Brewster angle, P-polarized light can be transmitted through the interface between elements without any loss. Furthermore, by designing the element thickness and the folding cycle at optimum values in accordance with Expression (17), P-polarized light can be transmitted through the polarizing elements without any loss. Moreover, when θ P is set at a value smaller than the value given by Expression (16), to make the angles of incidence and emergence greater than the Brewster angle, the extinction ratio can be increased although the transmittance for P-polarized light slightly drops.

Using plastic materials, polarizing elements of complicated shape can be produced in a relatively easy and inexpensive manner as compared with glass or other materials. In applications where polarizing elements made of plastic are used for polarizing high-intensity white light, an ultraviolet/infrared cut-off filter is installed which has the effect of reducing the possibility of the polarizing elements being deformed and deteriorated due to heat. The possibility of such deformation and deterioration can be further reduced by employing forced cooling using air, etc. This embodiment has the further advantage that since the thickness per polarizing element is drastically reduced, the polarizing elements can be stacked in multiple layers to construct a polarizing element combination whose thickness is still small. Furthermore, by inserting spacers between the polarizing element layers to secure an air layer therebetween, multiple reflections of S-polarized light between the polarizing element layers can be prevented, thereby increasing the extinction ratio. If air is impelled through the air layers to cool the polarizing elements, the problem of thermal deformation of the polarizing elements can be alleviated. Moreover, by forming the spacers integrally with the polarizing elements, the number of fabrication steps for the polarizing elements can be reduced.

Embodiment 12 (Polarizing element)

Figure 49:
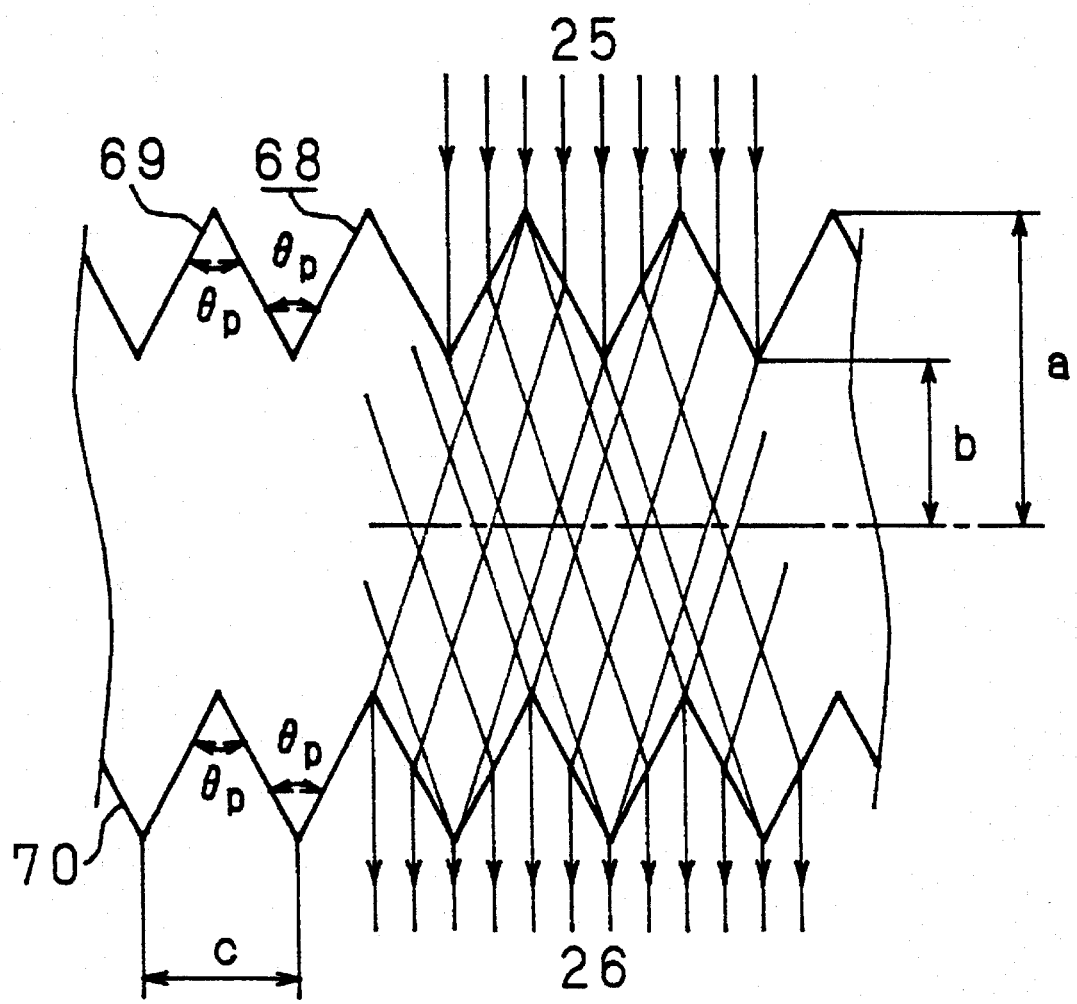
FIG. 49 is a diagram showing the structure of a polarizing element according to the invention.

FIG. 49 is a cross sectional view of a polarizing element according to Embodiment 12. The structure of the polarizing element 68 is such that each crest (or trough) of the folded surface 69 on the incident side is aligned with a trough (or crest) of the folded surface 70 on the emergent side. The entire structure therefore has a triangular-wavelike cross section with uniform layer thickness, providing strong mechanical strength.

In order for the incident plane to form the Brewster angle θ B, the angle θ P between the incident plane 69 and the emergent plane 70 should satisfy Expression (18) below.

$$\theta P = \pi - 2\theta B \qquad (18)$$

When the maximum thickness, measured from the center, is denoted as a, the minimum thickness as b, and the folding cycle of the incident surface as c, P-polarized light passes through the polarizing element without any loss if the relationship given by Expression (19) below is satisfied.

$$a:b:c=1:\{2+3\cos(2\theta B)\}/\{2+\cos(2\theta B)\}:-\{4\cos(2\theta B)\}/[n\{2+\cos(2\theta B)\}] \quad (19)$$

Descriptions of Examples 1 to 4 of Embodiment 11, such as setting the angle of incidence greater than the Brewster angle to increase the extinction ratio, selecting materials for the polarizing element 68, constructing multilayered polarizing element structure, using spacers, etc., also apply to Embodiment 12.

According to Embodiment 12, the polarizing element has a triangular-wavelike cross section with uniform polarizing element thickness so that the structure has great mechanical strength. Furthermore, as in Embodiment 11, by setting the angles of incidence and emergence on the polarizing element at the Brewster angle, P-polarized light is allowed to pass through the interface between elements without any loss. Moreover, by designing the element thickness and the folding cycle at optimum values, P-polarized light can be transmitted through the polarizing elements without any loss.

Embodiment 13 (Projection display apparatus)

Figure 2:
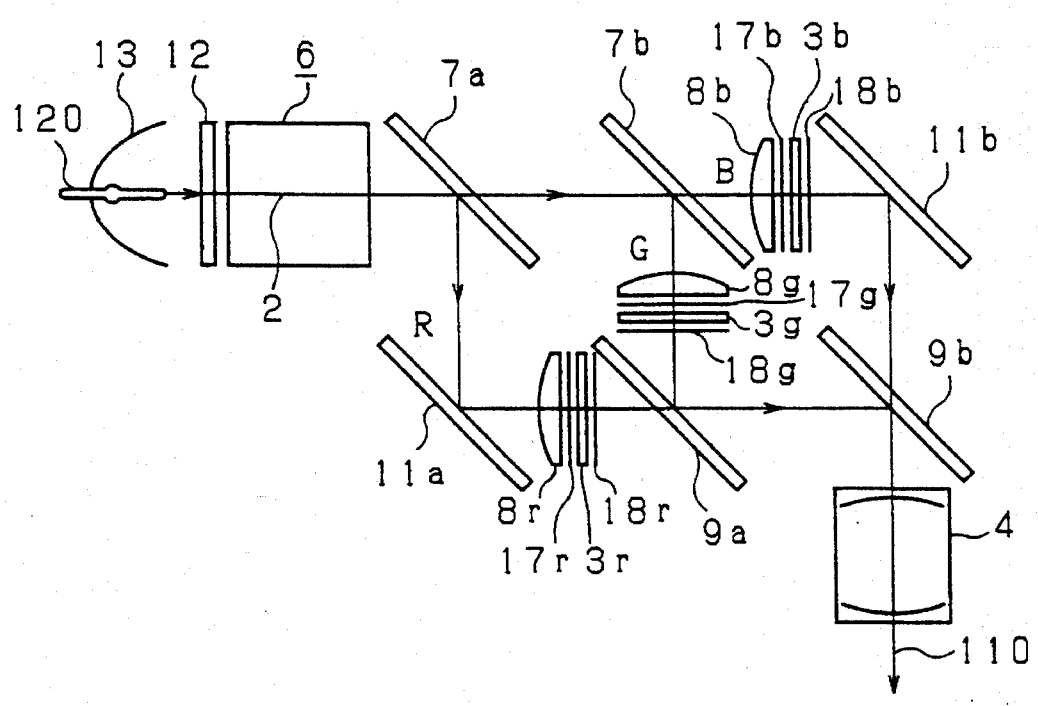
FIG. 2 is a diagram showing the construction of another prior art projection display apparatus.
Figure 50:
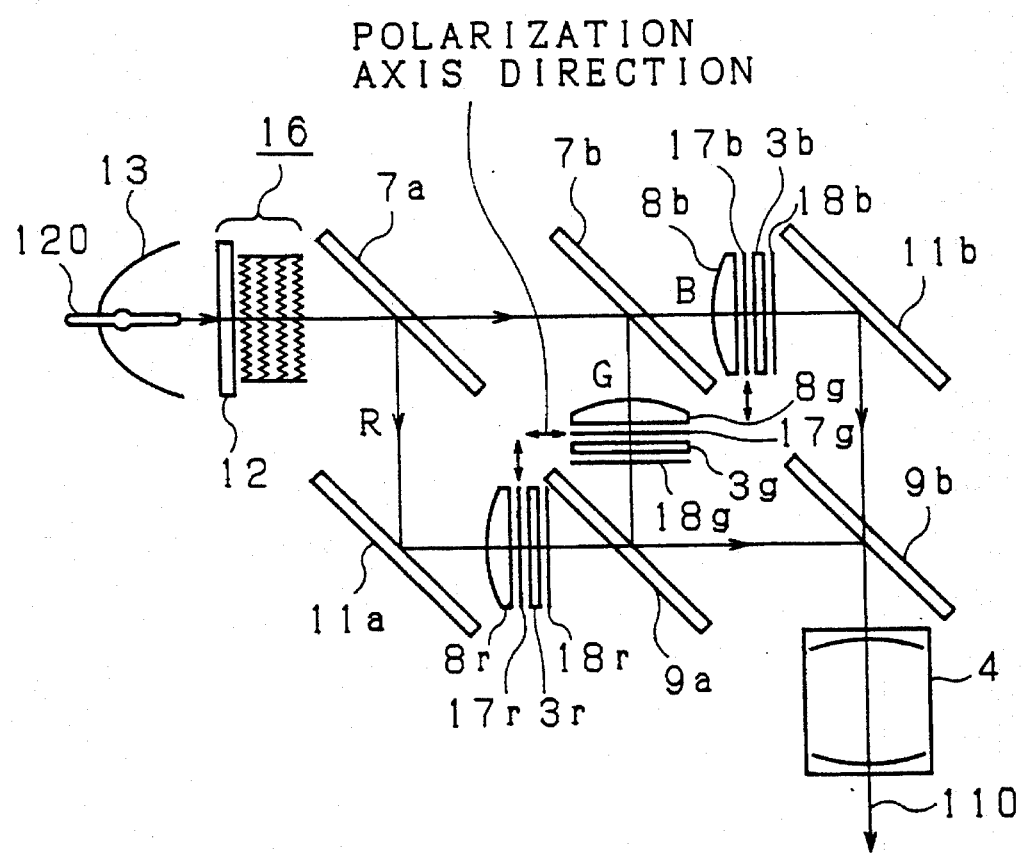
FIG. 50 is a diagram showing an optical system of a projection display apparatus according to the invention.

FIG. 50 is a diagram showing an optical system in a projection display apparatus of Embodiment 13 using the polarizing element of Embodiment 11 or 12. If the polarizing element 6 used in the prior art apparatus (FIG. 2) is replaced by the polarizing element 62 or 68 of Embodiment 11 or 12 or by the polarizing element 16 formed from multiple layers of such polarizing elements, the size of the entire apparatus can be reduced since the light source 120 can be installed closer to the liquid-crystal light valves, and furthermore, a high-brightness projection display apparatus can be achieved since the illuminance of the liquid-crystal light valves can be increased. The only difference between the embodiment of FIG. 50 and the prior art construction of FIG. 2 is that the polarizing element 6 of FIG. 2 is replaced by the polarizing element 16; other component parts and the operation of the apparatus are the same as those of the prior art, and therefore, their descriptions are omitted herein. FIG. 50 shows a three-layered structure as an example of the polarizing element 16, but it will be appreciated that as the number of layers is increased, the extinction ratio (the degree of polarization) improves and the heat problem of the incident side polarizing plates 17r, 17g, and 17b on the liquid-crystal light valves 3r, 3g, and 3b is eased accordingly.

According to Embodiment 13, the polarizing element of Embodiment 11 or 12 is used in a projection display apparatus using liquid-crystal light valves, whereby the heat problem of the polarizing element on the incident side of each liquid-crystal light valve is eased, which also serves to prevent degradation of image quality due to deterioration or deformation of the polarizing element. Furthermore, since the polarizing element is thin, the light source can be installed closer to the liquid-crystal light valves to increase the projected image brightness.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

EMBODIMENT 1 (EXAMPLE 1)

$f = 26.61 \quad NA = 0.917 \quad \beta = 0 \quad WD = 9.70$
$D1 = 49.27 \quad D2 = 44.34$
$r1/nf = 0.4320 \quad r2/nf = -20.41 \quad \Delta 2 = 3.462$
$d1/f = 0.9094 \quad \Delta 2/f = 0.1301$

| m | ri | di | ni | vi |
|---|---|---|---|---|
| 1 | 20.08544 | 24.20 | 1.74706 | 27.8 |
| 2 | −949.05921 | 12.90 | | |

<Polynomial Deformation Terms>

| | 1st surface | 2nd surface |
|---|---|---|
| K | −0.340219 | 1228.441377 |
| A4 | 0.178894E-06 | 0.914153E-05 |
| A6 | −0.197295E-07 | 0.109802E-07 |
| A8 | 0.317991E-10 | 0.175878E-10 |
| A10 | −0.288943E-13 | −0.350440E-13 |

TABLE 2

EMBODIMENT 1 (EXAMPLE 2)

$f = 26.11 \quad NA = 0.924 \quad \beta = 0 \quad WD = 9.32$
$D1 = 49.27 \quad D2 = 44.29$
$r1/nf = 0.4367 \quad r2/nf = -20.63 \quad \Delta 2 = 3.446$
$d1/f = 0.9268 \quad \Delta 2/f = 0.1320$

| m | ri | di | ni | vi |
|---|---|---|---|---|
| 1 | 20.08544 | 24.20 | 1.76168 | 27.5 |
| 2 | −949.05921 | 12.51 | | |

<Polynomial Deformation Terms>

| | 1st surface | 2nd surface |
|---|---|---|
| K | −0.340219 | 1228.441377 |
| A4 | 0.178894E-06 | 0.914153E-05 |
| A6 | −0.197295E-07 | 0.109802E-07 |
| A8 | 0.317991E-10 | 0.175878E-10 |
| A10 | −0.288943E-13 | −0.350440E-13 |

TABLE 3

EMBODIMENT 1 (EXAMPLE 3)

$f = 25.84 \quad NA = 0.924 \quad \beta = 0 \quad WD = 9.12$
$D1 = 49.04 \quad D2 = 43.62$
$r1/nf = 0.4386 \quad r2/nf = -23.04 \quad \Delta 2 = 3.445$
$d1/f = 0.9327 \quad \Delta 2/f = 0.1333$

| m | ri | di | ni | vi |
|---|---|---|---|---|
| 1 | 20.04429 | 24.10 | 1.76858 | 26.6 |
| 2 | −1052.82510 | 12.34 | | |

<Polynomial Deformation Terms>

| | 1st surface | 2nd surface |
|---|---|---|
| K | −0.337067 | 1505.792668 |
| A4 | 0.174050E-07 | 0.100111E-04 |
| A6 | −0.196155E-07 | 0.117458E-07 |

TABLE 3-continued

EMBODIMENT 1
(EXAMPLE 3)

| | | |
|---|---|---|
| A8 | 0.317802E-10 | 0.175378E-10 |
| A10 | −0.292536E-13 | −0.379518E-13 |

TABLE 4

EMBODIMENT 1
(EXAMPLE 4)

$f = 23.98$   $NA = 0.937$   $\beta = 0$   $WD = 8.11$
$D1 = 48.22$   $D2 = 43.13$
$r1/nf = 0.4447$   $r2/nf = 25.57$   $\Delta 2 = 2.728$
$d1/f = 0.9696$   $\Delta 2/f = 0.1138$

| m | ri | di | ni | vi |
|---|---|---|---|---|
| 1 | 19.32801 | 23.25 | 1.81264 | 25.5 |
| 2 | 1111.37614 | 11.04 | | |

<Polynomial Deformation Terms>

| | 1st surface | 2nd surface |
|---|---|---|
| K | −0.373162 | 1987.392541 |
| A4 | 0.884265E-06 | 0.964944E-05 |
| A6 | −0.161358E-07 | 0.733417E-08 |
| A8 | 0.832560E-11 | 0.702200E-11 |
| A10 | −0.102808E-14 | −0.227056E-13 |

TABLE 5

EMBODIMENT 1
(EXAMPLE 5)

$f = 23.92$   $NA = 0.939$   $\beta = 0$   $WD = 8.68$
$D1 = 48.28$   $D2 = 45.01$
$r1/nf = 0.4476$   $r2/nf = 137.14$   $\Delta 2 = 2.950$
$d1/f = 0.9264$   $\Delta 2/f = 0.1233$

| m | ri | di | ni | vi |
|---|---|---|---|---|
| 1 | 19.40508 | 22.16 | 1.81264 | 25.5 |
| 2 | 5946.18213 | 11.67 | | |

<Polynomial Deformation Terms>

| | 1st surface | 2nd surface |
|---|---|---|
| K | −0.37283 | 1302.388909 |
| A4 | 0.312395E-06 | 0.903283E-05 |
| A6 | −0.162790E-07 | 0.704027E-08 |
| A8 | 0.918434E-11 | 0.698166E-11 |
| A10 | 0.201289E-14 | −0.222122E-13 |

TABLE 6

EMBODIMENT 1
(EXAMPLE 6)

$f = 23.97$   $NA = 0.938$   $\beta = 0$   $WD = 8.72$
$D1 = 48.28$   $D2 = 45.01$
$r1/nf = 0.4471$   $r2/nf = 136.99$   $\Delta 2 = 2.950$
$d1/f = 0.9245$   $\Delta 2/f = 0.1231$

TABLE 6-continued

EMBODIMENT 1
(EXAMPLE 6)

| m | ri | di | ni | vi |
|---|---|---|---|---|
| 1 | 19.40508 | 22.16 | 1.81081 | 40.7 |
| 2 | 5946.18213 | 11.71 | | |

<Polynomial Deformation Terms>

| | 1st surface | 2nd surface |
|---|---|---|
| K | −0.37283 | 1302.388909 |
| A4 | 0.312395E-06 | 0.903283E-05 |
| A6 | −0.162790E-07 | 0.704027E-08 |
| A8 | 0.918434E-11 | 0.698166E-11 |
| A10 | 0.201289E-14 | −0.222122E-13 |

TABLE 7

EMBODIMENT 4
(EXAMPLE 1)

$f = 50.29$   $NA = 0.917$   $\beta = 0$   $WD = 18.0$
$D1 = 92.3$   $D2 = 84.6$   $SG2 = -0.342$
$r1/nf = 0.455$   $r2/nf = -0.394$   $SG2/f = -0.007$

| m | ri | di | ni | vi |
|---|---|---|---|---|
| 1 | 33.70426 | 67.25 | 1.47439 | 66.6 |
| 2 | −29.22089 | 18.00 | | |

<Polynomial Deformation Terms>

| | 1st surface | 2nd surface |
|---|---|---|
| K | −0.466251 | −24.108959 |
| A4 | 0.571806E-06 | 0.562262E-05 |
| A6 | −0.496779E-09 | −0.368196E-08 |
| A8 | 0.174690E-12 | 0.141795E-11 |
| A10 | −0.226709E-16 | −0.226534E-15 |

TABLE 8

EMBODIMENT 4
(EXAMPLE 2)

$f = 50.68$   $NA = 0.917$   $\beta = 0$   $WD = 18.0$
$D1 = 93.0$   $D2 = 86.0$   $SG2 = -0.656$
$r1/nf = 0.450$   $r2/nf = -0.400$   $SG2/f = -0.013$

| m | ri | di | ni | vi |
|---|---|---|---|---|
| 1 | 33.65662 | 67.45 | 1.47439 | 66.6 |
| 2 | −29.89508 | 18.00 | | |

<Polynomial Deformation Terms>

| | 1st surface | 2nd surface |
|---|---|---|
| K | −0.48052 | −54.275555 |
| A4 | 0.141339E-05 | 0.434909E-05 |
| A6 | −0.910607E-09 | −0.356230E-08 |
| A8 | 0.334276E-12 | 0.151797E-11 |
| A10 | −0.810360E-17 | −0.249391E-15 |

TABLE 9

**EMBODIMENT 4
(EXAMPLE 3)**

f = 50.69  NA = 0.916  β = 0  WD = 18.0
D1 = 93.0  D2 = 86.0  SG2 = −0.796
r1/nf = 0.450  r2/nf = −0.402  SG2/f = −0.016

| m | ri | di | ni | vi |
|---|---|---|---|---|
| 1 | 33.60588 | 67.35 | 1.47439 | 66.6 |
| 2 | −30.01322 | 18.00 | | |

<Polynomial Deformation Terms>

| | 1st surface | 2nd surface |
|---|---|---|
| K | −0.506181 | −110.198876 |
| A4 | 0.189999E-05 | 0.386796E-05 |
| A6 | −0.569252E-09 | −0.359486E-08 |
| A8 | −0.197403E-12 | 0.152995E-11 |
| A10 | 0.242419E-15 | −0.246557E-15 |

TABLE 10

**EMBODIMENT 4
(EXAMPLE 4)**

f = 27.25  NA = 0.917  β = 0  WD = 10.0
D1 = 50.0  D2 = 45.7  SG2 = 0.220
r1/nf = 0.466  r2/nf = −0.388  SG2/f = 0.008

| m | ri | di | ni | vi |
|---|---|---|---|---|
| 1 | 18.73636 | 36.43 | 1.47439 | 66.6 |
| 2 | −15.60677 | 10.20 | | |

<Polynomial Deformation Terms>

| | 1st surface | 2nd surface |
|---|---|---|
| K | −0.438318 | −39.696015 |
| A4 | 0.827198E-05 | 0.320409E-04 |
| A6 | −0.196445E-07 | −0.710177E-07 |
| A8 | 0.204258E-10 | 0.886882E-10 |
| A10 | −0.266759E-14 | −0.438318E-13 |

TABLE 11

**EMBODIMENT 4
(EXAMPLE 5)**

f = 27.25  NA = 0.917  β = 0  WD = 10.0
D1 = 50.0  D2 = 45.7  SG2 = 0.222
r1/nf = 0.466  r2/nf = −0.388  SG2/f = 0.008

| m | ri | di | ni | vi |
|---|---|---|---|---|
| 1 | 18.73570 | 36.43 | 1.47439 | 66.6 |
| 2 | −15.60793 | 10.20 | | |

<Polynomial Deformation Terms>

| | 1st surface | 2nd surface |
|---|---|---|
| K | −0.43836 | −41.400191 |
| A4 | 0.846815E-05 | 0.318009E-04 |
| A6 | −0.194597E-07 | −0.710713E-07 |
| A8 | 0.191126E-10 | 0.886606E-10 |
| A10 | −0.777042E-15 | −0.435201E-13 |

TABLE 12

**EMBODIMENT 4
(EXAMPLE 6)**

f = 27.25  NA = 0.908  β = 0  WD = 10.7
D1 = 50.0  D2 = 46.0  SG2 = 0.290
r1/nf = 0.477  r2/nf = −0.399  SG2/f = 0.011

| m | ri | di | ni | vi |
|---|---|---|---|---|
| 1 | 19.15895 | 35.51 | 1.47439 | 66.6 |
| 2 | −16.04335 | 11.00 | | |

<Polynomial Deformation Terms>

| | 1st surface | 2nd surface |
|---|---|---|
| K | −0.591232 | −874.054943 |
| A4 | 0.304813E-04 | 0.205548E-04 |
| A6 | −0.507880E-07 | −0.656635E-07 |
| A8 | 0.645958E-11 | 0.860952E-10 |
| A10 | 0.123781E-12 | −0.416011E-13 |

TABLE 13

**EMBODIMENT 4
(EXAMPLE 7)**

f = 26.61  NA = 0.908  β = 0  WD = 10.8
D1 = 48.8  D2 = 44.3  SG2/f = 1.883
r1/nf = 0.539  r2/nf = −0.381  SG2/f = 0.071

| m | ri | di | ni | vi |
|---|---|---|---|---|
| 1 | 21.15450 | 34.37 | 1.47439 | 66.6 |
| 2 | −14.94005 | 12.70 | | |

<Polynomial Deformation Terms>

| | 1st surface | 2nd surface |
|---|---|---|
| K | −0.249131 | −26.796249 |
| A4 | −0.155300E-05 | 0.114155E-03 |
| A6 | 0.106724E-06 | −0.372148E-06 |
| A8 | −0.341686E-09 | 0.492260E-09 |
| A10 | 0.359974E-12 | −0.223112E-12 |

TABLE 14

**EMBODIMENT 4
(EXAMPLE 8)**

f = 26.61  NA = 0.908  β = 0  WD = 10.8
D1 = 48.8  D2 = 44.1  SG2 = 1.857
r1/nf = 0.539  r2/nf = −0.381  SG2/f = 0.070

| m | ri | di | ni | vi |
|---|---|---|---|---|
| 1 | 21.15456 | 34.37 | 1.47439 | 66.6 |
| 2 | −14.93995 | 12.70 | | |

<Polynomial Deformation Terms>

| | 1st surface | 2nd surface |
|---|---|---|
| K | −0.249136 | −26.787534 |
| A4 | −0.155675E-05 | 0.114151E-03 |
| A6 | 0.106717E-06 | −0.372153E-06 |
| A8 | −0.341697E-09 | 0.492253E-09 |
| A10 | 0.359955E-12 | −0.223123E-12 |

TABLE 15

EMBODIMENT 4 (EXAMPLE 9)

f = 26.61  NA = 0.908  β = 0  WD = 11.0
D1 = 48.8  D2 = 44.7  SG2 = 1.692
r1/nf = 0.534  r2/nf = −0.386  SG2/f = 0.064

| m | ri | di | ni | vi |
|---|---|---|---|---|
| 1 | 20.95887 | 34.05 | 1.47439 | 66.6 |
| 2 | −15.14925 | 12.70 | | |

<Polynomial Deformation Terms>

| | 1st surface | 2nd surface |
|---|---|---|
| K | −0.271027 | −30.603213 |
| A4 | 0.896559E−06 | 0.110438E−03 |
| A6 | 0.126916E−06 | −0.362170E−06 |
| A8 | −0.457773E−09 | 0.487458E−09 |
| A10 | 0.510300E−12 | −0.239276E−12 |

What is claimed is:

1. A light source apparatus comprising:
   a discharge lamp;
   a spherical mirror; and
   a condenser lens consisting of a bi-aspherical single lens having a first surface of convex form facing the larger conjugate side and a second surface facing the smaller conjugate side and whose outermost circular zone is formed concave, said condenser lens satisfying the following conditions $0.42 < r1/nf < 0.45$ $18 < |r2/nf|$ $-0.39 < K1 < -0.25$ $0.11 < A2/f < 0.14$ where f:
   f: focal length of the whole lens system
   n: refractive index of the lens
   r1: radius off center curvature of the first surface
   r2: radius of center curvature of the second surface
   K1: conic constant of the first surface
   A2: axial difference between the aspherical face of the outermost circular zone within the effective diameter of the second surface and a reference spherical face having the radius of center curvature of r2, wherein the direction in which the outermost circular zone of the second surface is curving toward the smaller conjugate side is taken as positive, and
   wherein the center of curvature of said spherical mirror and the focal point on the second surface side of said condenser lens are substantially coincident with each other, the center of emission of said discharge lamp being located at the coinciding point.

2. A light source apparatus according to claim 1, wherein said discharge lamp is a xenon discharge lamp having a pair of discharge electrodes, a positive electrode and a negative electrode, and the discharge tip of the negative electrode of the xenon lamp is situated at the coinciding point.

3. A light source apparatus according to claim 1, wherein the numerical aperture (NA) of said condenser lens is 0.9 or larger.

4. A light source apparatus according to claim 2, wherein the numerical aperture (NA) of said condenser lens is 0.9 or larger.

5. A light source apparatus according to claim 1, wherein the first surface of said condenser lens is treated with an antireflective coating of single layer, and the second surface is treated with an infrared/ultraviolet reflective or infrared reflective coating consisting of multiple optical layers.

6. A light source apparatus according to claim 2, wherein the first surface of said condenser lens is treated with an antireflective coating of single layer, and the second surface is treated with an infrared/ultraviolet reflective or infrared reflective coating consisting of multiple optical layers.

7. A light source apparatus according to claim 1, wherein when the radius of curvature of said spherical mirror is denoted as r and the diameter of a light beam emergent from the first surface of said condenser lens is denoted as D1, the following relationship is satisfied $r \geq D1/2$.

8. A light source apparatus according to claim 2, wherein when the radius of curvature of said spherical mirror is denoted as r and the diameter of a light beam emergent from the first surface of said condenser lens is denoted as D1, the following relationship is satisfied $r \geq D1/2$.

9. A light source apparatus comprising:
   a discharge lamp;
   a spherical mirror; and
   a condenser lens consisting of bi-aspherical single lens having a first surface of convex form facing the larger conjugate side and a second surface facing the smaller conjugate side and whose outermost circular zone is formed concave, said condenser lens satisfying the following conditions $0.4 < r1/nf < 0.6$ $-0.5 < r2/nf < -0.3$ $-0.6 < K1 < -0.2$ $-0.1 < SG2/f < 0.1$ where
   f: focal length of the whole lens system
   n: refractive index of the lens
   r1: radius of center curvature of the first surface
   r2: radius of center curvature of the second surface
   K1: conic constant of the first surface
   SG2: axial difference of the aspherical face of the outermost circular zone within the effective diameter of the second surface with respect to the center of the second surface, wherein the direction in which the outermost circular zone of the second surface is curving toward the smaller conjugate side is taken as positive, and
   wherein the center of curvature of said spherical mirror and focal point on the second surface side of said condenser lens are substantially coincident with each other, the center of emission of said discharge lamp being located at the coinciding point.

10. A light source apparatus according to claim 9, wherein said discharge lamp is a xenon discharge lamp having a pair of discharge electrodes, a positive electrode and a negative electrode, and the discharge tip of the negative electrode of the xenon lamp is situated at the coinciding point.

11. A light source apparatus according to claim 9, wherein the numerical aperture (NA) of said condenser lens is 0.9 or larger.

12. A light source apparatus according to claim 10, wherein the numerical aperture (NA) of said condenser lens is 0.9 or larger.

13. A light source apparatus according to claim 1, wherein the first surface of said condenser lens is treated with an antireflective coating of single layer, and the second surface is treated with an infrared/ultraviolet reflective or infrared reflective coating consisting of multiple optical layers.

14. A light source apparatus according to claim 2, wherein the first surface of said condenser lens is treated with an antireflective coating of single layer, and the second surface is treated with an infrared/ultraviolet reflective or infrared reflective coating consisting of multiple optical layers.

15. A light source apparatus according to claim 1, wherein when the radius of curvature of said spherical mirror is denoted as r and the diameter of a light beam emergent from the first surface of said condenser lens is denoted as D1, the following relationship is satisfied $$r \geq D1/2.$$

16. A light source apparatus according to claim 10, wherein when the radius of curvature of said spherical mirror is denoted as r and the diameter of a light beam emergent from the first surface of said condenser lens is denoted as D1, the following relationship is satisfied $$r \geq D1/2.$$

17. A light source apparatus comprising:

a light source for emitting light;

a condenser lens assembly having an optical axis and formed of plural lens portions separated from each other by joints provided parallel to the optical axis, said plural lens portions collectively forming a desired continuous single condenser lens profile, substantial portions of the light emitted from said light source passing through a single one of said lens portions, said joints producing discontinuities in the condenser lens assembly to absorb thermal expansion and prevent cracking of the lens.

18. The apparatus of claim 17 wherein said lens assembly is formed of said plural lens portions to avoid use of a single lens susceptible to thermal stress cracking.

19. The apparatus of claim 17 wherein the light emitted by said light source is transmitted by said condenser lens generally along an optical axis;

said condenser lens assembly being divided into condenser lens portions by one or more separating planes extending parallel to said optical axis.

20. The apparatus of claim 19 wherein the one or more separating planes are partially defined by said optical axis.

21. The light source apparatus of claim 17 wherein said light source is a linear emission lamp.

22. The light source apparatus of claim 21 wherein said linear emission lamp is oriented so that maximum emission is along said optical axis.

23. The light source apparatus of claim 22 further comprising a spherical reflector disposed opposite said light source from said condenser lens assembly.

24. The light source apparatus of claim 23 wherein said lamp is a discharge lamp.

* * * * *